US007890509B1

(12) United States Patent
Pearcy et al.

(10) Patent No.: US 7,890,509 B1
(45) Date of Patent: Feb. 15, 2011

(54) PARCEL DATA ACQUISITION AND PROCESSING

(75) Inventors: Brett T. Pearcy, Austin, TX (US); Matthew E. Karli, Austin, TX (US); Charles P. Reynolds, Austin, TX (US); Hugo A. Tagle, Austin, TX (US); David R. Maltby, II, Austin, TX (US); Michael J. Clark, Cedar Park, TX (US); Balakrishna M. Yadavalli, Austin, TX (US)

(73) Assignee: First American Real Estate Solutions LLC, Westlake, TX (US)

( * ) Notice: Subject to any disclaimer, the term of this patent is extended or adjusted under 35 U.S.C. 154(b) by 316 days.

(21) Appl. No.: 11/999,319

(22) Filed: Dec. 4, 2007

Related U.S. Application Data

(60) Provisional application No. 60/872,831, filed on Dec. 5, 2006.

(51) Int. Cl.
*G06F 7/00* (2006.01)
*G06F 17/30* (2006.01)
(52) U.S. Cl. ............... 707/736; 707/740; 707/754; 707/756; 702/5
(58) Field of Classification Search .......... 707/101
See application file for complete search history.

(56) References Cited

U.S. PATENT DOCUMENTS

| 4,766,539 | A | 8/1988 | Fox |
| 4,831,526 | A | 5/1989 | Luchs et al. |
| 4,876,648 | A | 10/1989 | Lloyd |
| 4,885,706 | A | 12/1989 | Pate et al. |
| 4,975,840 | A | 12/1990 | DeTore et al. |
| 5,546,107 | A | 8/1996 | Deretsky et al. |
| 5,559,707 | A | 9/1996 | DeLorme et al. |
| 5,796,634 | A | 8/1998 | Craport et al. |
| 5,839,113 | A | 11/1998 | Federau et al. |
| 5,848,373 | A | 12/1998 | DeLorme et al. |
| 5,873,066 | A | 2/1999 | Underwood et al. |
| 5,913,210 | A | 6/1999 | Call |
| 5,946,687 | A | 8/1999 | Gehani et al. |

(Continued)

OTHER PUBLICATIONS

GIS Data Conversion Methods, by Montgomery at al., Publisher: Wiley (Aug. 1993), ISBN-10: 0471329835 , p. 105-108,110.*

(Continued)

*Primary Examiner*—Jay A Morrison
(74) *Attorney, Agent, or Firm*—Oblon, Spivak, McClelland, Maier & Neustadt, L.L.P.

(57) ABSTRACT

In some embodiments, scripts may be used to perform parcel data acquisition, conversion, and clean-up/repair in an automated manner and/or through graphical user interfaces. The scripts may be used, for example, to repair geometries of new parcel data, convert multi-part parcel geometries to single part parcel geometries (explode), eliminate duplicate parcel geometries, append columns, create feature classes, and append feature classes. These scripts may be executed in a predetermined manner to increase efficiency. In some embodiments, different combinations of attributes may be appended to stored parcel data. In some embodiments, a tracking application may be used to track information about sources of data. In some embodiments, a tracking application may be used to track which system users are assigned to specific tasks (e.g., in a data acquisition project).

29 Claims, 41 Drawing Sheets

U.S. PATENT DOCUMENTS

| | | | |
|---|---|---|---|
| 5,953,722 A | 9/1999 | Lampert et al. | |
| 5,968,109 A | 10/1999 | Israni et al. | |
| 6,101,496 A | 8/2000 | Esposito | |
| 6,115,669 A | 9/2000 | Watanabe et al. | |
| 6,118,404 A | 9/2000 | Fernekes et al. | |
| 6,119,065 A | 9/2000 | Shimada et al. | |
| 6,163,770 A | 12/2000 | Gamble et al. | |
| 6,263,343 B1 | 7/2001 | Hirono | |
| 6,308,177 B1 | 10/2001 | Israni et al. | |
| 6,467,994 B1 | 10/2002 | Ankeny et al. | |
| 6,498,982 B2 | 12/2002 | Bellesfield et al. | |
| 6,529,824 B1 | 3/2003 | Obradovich et al. | |
| 6,539,080 B1 | 3/2003 | Bruce et al. | |
| 6,591,270 B1 | 7/2003 | White | |
| 6,631,326 B1 | 10/2003 | Howard et al. | |
| 6,678,615 B2 | 1/2004 | Howard et al. | |
| 6,684,219 B1 | 1/2004 | Shaw et al. | |
| 6,711,554 B1 | 3/2004 | Salzmann et al. | |
| 6,829,690 B1 | 12/2004 | Ashby | |
| 6,836,270 B2 | 12/2004 | Du | |
| 6,842,698 B2 | 1/2005 | Howard et al. | |
| 6,889,141 B2 | 5/2005 | Li et al. | |
| 6,934,634 B1 | 8/2005 | Ge | |
| 6,947,842 B2 | 9/2005 | Smith et al. | |
| 6,950,519 B2 | 9/2005 | Rhoads | |
| 7,038,681 B2 | 5/2006 | Scott et al. | |
| 7,042,470 B2 | 5/2006 | Rhoads et al. | |
| 7,054,741 B2 | 5/2006 | Harrison et al. | |
| 7,061,510 B2 | 6/2006 | Rhoads | |
| 7,082,443 B1 | 7/2006 | Ashby | |
| 7,085,650 B2 | 8/2006 | Anderson | |
| 7,092,957 B2 | 8/2006 | Klein | |
| 7,099,492 B2 | 8/2006 | Rhoads | |
| 7,099,882 B2 | 8/2006 | McDonough | |
| 7,114,050 B2 | 9/2006 | Ashby | |
| 7,117,199 B2 | 10/2006 | Frank et al. | |
| 7,127,107 B2 | 10/2006 | Kubota et al. | |
| 7,142,217 B2 | 11/2006 | Howard et al. | |
| 7,161,604 B2 | 1/2007 | Higgins et al. | |
| 7,167,187 B2 | 1/2007 | Scott et al. | |
| 7,184,572 B2 | 2/2007 | Rhoads et al. | |
| 7,190,377 B2 | 3/2007 | Scott et al. | |
| 7,197,160 B2 | 3/2007 | Rhoads et al. | |
| 7,254,249 B2 | 8/2007 | Rhoads et al. | |
| 7,383,125 B2 | 6/2008 | de Silva et al. | |
| 7,617,047 B2 * | 11/2009 | Sakamoto et al. | 701/211 |
| 2001/0028348 A1 | 10/2001 | Higgins et al. | |
| 2001/0032050 A1 | 10/2001 | Howard et al. | |
| 2001/0033292 A1 | 10/2001 | Scott et al. | |
| 2001/0034579 A1 | 10/2001 | Howard et al. | |
| 2001/0047326 A1 | 11/2001 | Broadbent et al. | |
| 2002/0035432 A1 | 3/2002 | Kubica et al. | |
| 2002/0145617 A1 | 10/2002 | Kennard et al. | |
| 2002/0147613 A1 | 10/2002 | Kennard et al. | |
| 2003/0052896 A1 | 3/2003 | Higgins et al. | |
| 2003/0074358 A1 * | 4/2003 | Sarbaz et al. | 707/10 |
| 2004/0019517 A1 | 1/2004 | Sennott | |
| 2004/0034666 A1 | 2/2004 | Chen | |
| 2004/0046774 A1 | 3/2004 | Rhoads et al. | |
| 2004/0128170 A1 | 7/2004 | MacKethan et al. | |
| 2004/0138817 A1 | 7/2004 | Zoken et al. | |
| 2004/0172264 A1 | 9/2004 | Fletcher et al. | |
| 2004/0199410 A1 | 10/2004 | Feyen et al. | |
| 2004/0263514 A1 | 12/2004 | Jin et al. | |
| 2005/0034074 A1 | 2/2005 | Munson et al. | |
| 2005/0075911 A1 | 4/2005 | Craven | |
| 2005/0091193 A1 | 4/2005 | Frank et al. | |
| 2005/0091209 A1 | 4/2005 | Frank et al. | |
| 2005/0100220 A1 | 5/2005 | Keaton et al. | |
| 2005/0119824 A1 | 6/2005 | Rasmussen et al. | |
| 2005/0149561 A1 * | 7/2005 | Hodnett et al. | 707/104.1 |
| 2005/0159882 A1 | 7/2005 | Howard et al. | |
| 2005/0177529 A1 | 8/2005 | Howard et al. | |
| 2005/0203768 A1 | 9/2005 | Florance et al. | |
| 2005/0203778 A1 | 9/2005 | Chen et al. | |
| 2005/0209867 A1 | 9/2005 | Diesch et al. | |
| 2005/0273346 A1 | 12/2005 | Frost | |
| 2005/0283503 A1 | 12/2005 | Hancock et al. | |
| 2005/0288957 A1 | 12/2005 | Eraker et al. | |
| 2005/0288958 A1 | 12/2005 | Eraker et al. | |
| 2006/0036588 A1 | 2/2006 | Frank et al. | |
| 2006/0041375 A1 | 2/2006 | Witmer et al. | |
| 2006/0041573 A1 | 2/2006 | Miller et al. | |
| 2006/0045351 A1 | 3/2006 | Jin et al. | |
| 2006/0072783 A1 | 4/2006 | Rhoads | |
| 2006/0075422 A1 | 4/2006 | Choi et al. | |
| 2006/0100912 A1 | 5/2006 | Kumar et al. | |
| 2006/0125828 A1 | 6/2006 | Harrison et al. | |
| 2006/0126959 A1 | 6/2006 | Padwick et al. | |
| 2006/0235897 A1 * | 10/2006 | O'Hara | 707/200 |
| 2006/0242108 A1 * | 10/2006 | Cuspard et al. | 707/1 |
| 2006/0262963 A1 | 11/2006 | Navulur et al. | |
| 2006/0265350 A1 | 11/2006 | Klein | |
| 2007/0124328 A1 | 5/2007 | Klein | |
| 2007/0257235 A1 | 11/2007 | Park et al. | |
| 2007/0260401 A1 * | 11/2007 | Sydor et al. | 702/1 |
| 2007/0261517 A1 | 11/2007 | Lee et al. | |
| 2008/0055096 A1 | 3/2008 | Aylward | |
| 2008/0133462 A1 | 6/2008 | Aylward et al. | |

OTHER PUBLICATIONS

"The Elkhorn Slough Historic Habitats Project", by Eric Van Dyke, 24th Annual ESRI User Conference, Aug. 9-13, 2004.*

* cited by examiner

FIG. 9b

Add applicable tasks

GIS Project Summary

Select an Action: [Add Task ▼] [Go]  — 953

Project Information

| | | | |
|---|---|---|---|
| Project ID: | 0610G003 | Status: | NEW |
| Name: | P48479_PARCEL | | |
| Frequency: | | Assigned To: | |
| Effective Date: | | Due Date: | |
| Delivery Date: | | | |
| Created Date: | 10/11/06 | Created By: | |

Notes: Receive and verify data for load to SDE

| | | | |
|---|---|---|---|
| Point Type: | PARCEL | Parcel Object Count: | |
| Address Data: | true | APN Data: | 2967 | From Research: | false |
| Address Count: | | APN Count: | 2967 | Received Date: | |
| | | Owner Name: | true |
| | | Owner Name Count: | |

Create Project
Task Types
Search Project
Search Task

GIS Project Summary

Select an Action: [View Task ▼] [Go] — 971

After adding tasks, 'View Tasks' may be selected.

Create Project
Task Types
Search Project
Search Task

Project Information

| | | | |
|---|---|---|---|
| Project ID: | 0610G003 | Status: | NEW |
| Name: | P48479_PARCEL | | |
| Frequency: | | Assigned To: | 2967 | From Research: | false |
| Effective Date: | | Due Date: | | Received Date: | |
| Delivery Date: | | | | | |
| Created Date: | 10/11/06 | Created By: | 2967 | | |
| Notes: | Receive and verify data for load to SDE | | | | |
| Point Type: | PARCEL | Parcel Object Count: | | | |
| Address Data: | true | APN Data: | true | Owner Name: | true |
| Address Count: | | APN Count: | | Owner Name Count: | |

970

Edit GIS Task

Name:
ID: 1070396
Project ID: 0610G003
Project Name: P48479_PARCEL — 1103
Status: IN PROGRESS — 1105
Task Type: P010 Order Data
Assigned To: 2967 — 1107
Special Instructions:

1109

Notes:
Wrote Map Check for data 10/01 ($10) .I

1111

Submit  Cancel

Create Project
Task Types
Search Project
Search Task

Edit GIS Task

Name:
ID: 1070396
Project ID: 0610G003
Project Name: P48479_PARCEL — 1103
Status: NEW
Task Type: P030 – Data to GIS — 1105
Assigned To: 2967 — 1107
Special Instructions:

1109

Notes:
Resource ID: 41669
R:\CD_mig\ST\FIPS\48479\Vector

1111

[Submit] [Cancel]

Create Project
Task Types
Search Project
Search Task

Add Resource

Application View: [PARCEL ▼] — 1301
Extent Type: [COUNTY ▼] — 1303
Media/Format: [SDE ▼] — 1305
URL: [www.generalmapco.com] — 1307
Company Label: [General Map Co.] — 1309

☑ Parcel — 1311
☐ Legal — 1313
☐ Aerial — 1315
☐ Street — 1317
☐ Contact — 1319

[Add resource] — 1321

Edit Resource

View Type:
PARCEL ▼ —1401

ID: 16419  Extent: COUNTY ▼ —1403  Media/Format: SDE ▼ —1405   Rel #: 0 View All —1407

☐ Concealed —1409
☑ Parcel —1419   ☐ Legal —1411   ☐ Aerial —1413   ☐ Street —1415   ☐ Contact —1417
   ☐ Secure (https) —1423   ☐ Leased —1425

URL: www.generalmapco.com —1421

Subscription ($): 0.0 —1427   Frequency: ▼ —1429   Received Date: —1431

Company/Office/Department Label: General Map Co. —1432

Phone1: —1433
Phone2: —1435
Fax: —1437
Email: —1439
Addr1: —1441
Addr2: —1443
City: —1445   State: —1447   Zip: —1449
Supply Info: —1451
Provided Info: —1453
Availability: —1455
Comments:
1457

Create Date: 11/28/06 —1461   Created By: 2019 —1463   Edit Date: —1465   Edited By: —1467

[save resource] —1459

Edit Resource

View Type:
PARCEL ▼ —1401

ID: Extent: —1403 Media/Format: —1405
16419 COUNTY ▼ SDE ▼ Rel #: 0 View All
—1409 —1407
☐ Concealed
—1413 —1415 —1417
☑ Parcel ☐ Legal ☐ Aerial ☐ Street ☐ Contact —1423 —1425
URL: —1419 —1411 —1421 ☐ Secure (https) ☐ Leased
www.generalmapco.com.

Subscription ($): Frequency: Received Date:
0.0 —1427 ▼ —1431
—1429
Company/Office/Department Label:
General Map Co. —1432
Phone1: 123-123-1234 —1433
Phone2: —1435
Fax: —1437
Email: name@email.com. —1439
Addr1: 1234 Business Rd. —1441
Addr2: —1443 —1447
City: 1445— General City State: ST Zip: 99999 —1449
Supply Info: —1451
Provided Info: —1453
Availability: —1455
Comments:

1457

Create Date: Created By: Edit Date: Edited By: save resource
11/28/06 2019 —1465 —1467 —1459
—1461 —1463

*FIG. 15*

County Resource Relationships

Resource ID: 1641<u>9</u> Media/Format: SDE Extent: COUNTY Rel #: 0

State:
State - 01 ▼

Counties:
▼

| Name | FIPS | County | Year | Accesss | Notes | Priority | Created |
|------|------|--------|------|---------|-------|----------|---------|

Nothing found to display

*FIG. 16a*

County Resource Relationships

Resource ID: 1641<u>9</u> Media/Format: SDE Extent: COUNTY Rel #: 0

State:
State - 21 ▼

Counties:
County - 21111 ▼

<u>Add Relationship</u>

| Name | FIPS | County | Year | Accesss | Notes | Priority | Created |
|------|------|--------|------|---------|-------|----------|---------|

Nothing found to display

*FIG. 16b*

Add County Relationship

| Field | Value |
|---|---|
| Resource ID: | 16419 —1701 |
| FIPS Code: | 21111 —1703 |
| Media/Format: | SDE —1705 |
| Extent: | COUNTY —1707 |
| Priority: | ☐ —1709 |
| Access Type: | BOTH ▾ —1711 |
| Search By: | [_____] —1713 |
| Year: | [____] —1715 |
| Rsrch Notes: | [_____] —1717 |
| Availability Status: | [ ▾] —1719 |
| GIS Project ID: | [____] —1721 |
| Purchase Cost: | [____] —1723 |
| Lease Cost: | [____] —1725 |
| Setup Cost: | [____] —1727 |
| Update Cost: | [____] —1729 |

1731 — Can Modify: ☐   1733 — Known Agreement: ☐   1735 — Can Resale: ☐

Has Address: ☐   1737 — Has Owner Name: ☐   1739 — Held From Rsrch: ☐ —1741

Parcel Notes:

[ 1742 ]

1743 [Submit]   1745 [Cancel]

*FIG. 17*

Add County Relationship

| Field | Value |
|---|---|
| Resource ID: | 16419 —1701 |
| FIPS Code: | 21111 —1703 |
| Media/Format: | SDE —1705 |
| Extent: | COUNTY —1707 |
| Priority: | ☐ —1709 |
| Access Type: | BOTH ▾ —1711 |
| Search By: | Address —1713 |
| Year: | 2006 —1715 |
| Rsrch Notes: | —1717 |
| Availability Status: | AVAILABLE ▾ —1719 |
| GIS Project ID: | —1721 |
| Purchase Cost: | 100.00 —1723 |
| Lease Cost: | —1725 |
| Setup Cost: | —1727 |
| Update Cost: | 100.00 —1729 |

Can Modify: ☑ —1731  Known Agreement: ☑ —1733  Can Resale: ☑ —1735

Has Address: ☑ —1737  Has Owner Name: ☐ —1739  Held From Rsrch: ☐ —1741

Parcel Notes:
```
This data is updated every 6 months

1742
```

[Submit] —1743  [Cancel] —1745

*FIG. 18*

County Resource Relationships

Resource ID: 16419 Media/Format: SDE Extent: COUNTY Rel #: 0
             ‾1605           ‾1607          ‾1609         ‾1611

State:
[State - 21 ▼]  ‾1615

Counties:
[County - 21111 ▼]  ‾1617

Add Relationship

| | Name | FIPS | | County | Year | Accesss | Notes | Priority | Created |
|---|---|---|---|---|---|---|---|---|---|
| edit | State | 21111 | remove | County | 2006 | BOTH | | false | 11/28/2006 |

FIG. 19

Parcel Inventory

| | | |
|---|---|---|
| State: | ANY ▾ | —2001 |
| County: | ▾ —2003 | |
| Address: | ☐—2005 | |
| Owner: | ☐—2007 | |
| Media: | ANY ▾ —2009 | |
| Data Status: | ▾ —2011 | |

[Submit]—2013  [Reset]—2015

*FIG. 20a*

Parcel Inventory

| | | |
|---|---|---|
| State: | State - 21 ▾ | |
| County: | County - 21111 ▾ | —2001 |
| Address: | ☐—2005 | —2003 |
| Owner: | ☐—2007 | |
| Media: | SDE ▾ —2009 | |
| Data Status: | AVAILABLE ▾ —2011 | |

[Submit]—2013  [Reset]—2015

*FIG. 20b*

Parcel Inventory Search Results search again

One item found.
1

| ID | State | Media | Coverage | Company | Vintage | Purchase Cost | GIS Project ID | Object # |
|---|---|---|---|---|---|---|---|---|
| 51358 | ST | SDE | County - 2111 | General Map Co. | 2006 | 100 | | |

*FIG. 21*

Parcel Resource Detail

Relationship ID: 51358  Resource ID: 16419  App View: PARCEL
URL: www.generalmapco.com.
Phone 1: 123-123-1234  Phone 2:  Fax:
E-Mail: name@email.com.
Address 1: 1234 Business Rd.
Address 2:
City State Zip: General City  TX  99999
Availability Status: AVAILABLE  Vintage: 2006

Purchase ($): 100  GIS Project ID:
Lease ($):  Setup ($):  Update ($): 100

Can Modify: Yes  Known Agreement: Yes  Can Resale: Yes
Has Address: Yes  Has Owner Name: No  Held From Rsrch: No
Search By:

Address

Parcel Notes:

This data is updated every 6 months

Created Date: 11/28/06  Edit Date:  Edit User ID:
[Close]

State: [State - 01 ▼]  County: [_____]
Keyword: [XX/####] [Search]  Community: N/A ☐ Nationwide  ☐ Off Site  [Load Resources]
☐ Contacts P=Parcel : L=Legal : A=Aerial : S=Street : F=Free Site : C=Contact : Denotes New Resource : Denotes Preferred Resource

| Panels | Company | F | Search By | Notes | ID |
|--------|---------|---|-----------|-------|-----|

Nothing found to display

FIG. 24

State: [State - 48 ▼]  County: [County - 48453]
Keyword: [XX/####] [Search]  Community: [_____ ▼]

☐ Nationwide  ☐ Off Site  [Load Resources]
☐ Contacts

P=Parcel : L=Legal : A=Aerial : S=Street : F=Free Site : C=Contact : Denotes New Resource : Denotes Preferred Resource

| P | L | A | S | C | Media | Coverage | Panels | Company | F | Year | Search By | Notes | ID |
|---|---|---|---|---|-------|----------|--------|---------|---|------|-----------|-------|-----|
| P | L | A |   |   | WEB | City Municipality - 481048 | panel(s) | GeneralMapCo | F | | Address, Name, Legal Description | | 155 |
| P |   |   | S |   | WEB | Countyname - 48453 | comms(s) | GeneralMapCo | F | | APN, Owner, Address | Select Property Profile to Search records user pswd | 8017 |
| P |   |   | S |   | WEB | Countyname - 48453 | comms(s) | GeneralMapCo | F | | | user: user1; pwd: user2 | 1901 |
| P | L |   |   |   | WEB | Countyname - 48453 | comms(s) | InfoCo | F | | Account Number, Owner Name, Address | Great Site | 2000 |
| P | L |   |   |   | WEB | Countyname - 48453 | comms(s) | CLERK OF COURT | F | | Owner Name, Book/Page, Document Type | | 803 |

SDE Status Monitor 2505

Extent Type / COUNTY ▾  2507

2501a, 2503a, 2503b

| Employee | N/A | UNKNOWN | UNAVAILABLE | AVAILABLE | ORDERED | RECEIVED | VALIDATED | IN PROGRESS | STAGED | LOADED | Emp Total |
|---|---|---|---|---|---|---|---|---|---|---|---|
| 1236 – Employee 9 | 0 | 0 | 0 | 0 | 0 | 1 | 0 | 2 | 0 | 0 | 3 |
| 1960 – Employee 10 | 0 | 0 | 4 | 50 | 0 | 0 | 0 | 0 | 0 | 14 | 68 |
| 2019 – Employee 11 | 0 | 0 | 128 | 215 | 1 | 21 | 0 | 0 | 0 | 16 | 381 |
| 2212 – Employee 12 | 0 | 6 | 46 | 18 | 23 | 0 | 0 | 0 | 0 | 0 | 93 |
| 2323 – Employee 13 | 0 | 0 | 0 | 222 | 0 | 0 | 0 | 0 | 0 | 66 | 288 |
| 2553 – Employee 14 | 0 | 9 | 45 | 12 | 5 | 3 | 0 | 0 | 0 | 0 | 74 |
| 2653 – Employee 15 | 0 | 7 | 37 | 11 | 2 | 1 | 0 | 0 | 0 | 0 | 58 |
| 2666 – Employee 16 | 0 | 0 | 0 | 0 | 0 | 0 | 0 | 1 | 0 | 0 | 1 |
| 2967 – Employee 17 | 0 | 0 | 0 | 1 | 2 | 5 | 1 | 0 | 0 | 3 | 12 |
| 2972 – Employee 18 | 0 | 0 | 0 | 1 | 0 | 0 | 0 | 0 | 0 | 0 | 1 |
| 2992 – Employee 19 | 0 | 0 | 0 | 0 | 0 | 0 | 3 | 0 | 0 | 0 | 3 |
| 3035 – Employee 20 | 0 | 0 | 0 | 0 | 0 | 0 | 0 | 2 | 3 | 0 | 5 |
| 3095 – Employee 21 | 0 | 0 | 0 | 0 | 0 | 1 | 0 | 0 | 0 | 0 | 1 |
| 3105 – Employee 22 | 0 | 8 | 32 | 6 | 7 | 0 | 0 | 0 | 0 | 0 | 53 |
| 3182 – Employee 23 | 0 | 13 | 26 | 5 | 3 | 1 | 0 | 0 | 0 | 0 | 48 |
| 3239 – Employee 24 | 0 | 10 | 14 | 5 | 4 | 0 | 0 | 0 | 0 | 0 | 33 |
| 3261 – Employee 25 | 0 | 3 | 30 | 13 | 18 | 0 | 0 | 0 | 0 | 0 | 64 |
| 0000 – UNASSIGNED | 0 | 3 | 1275 | 135 | 0 | 0 | 297 | 0 | 0 | 944 | 2654 |
| Status Total | 0 | 59 | 1637 | 694 | 65 | 32 | 302 | 5 | 3 | 1043 | 3840 |

*FIG. 25a*

SDE Status Monitor

Extent Type: 2505
Community ▼

| Employee | N/A | UNKNOWN | UNAVAILABLE | AVAILABLE | ORDERED | RECEIVED | VALIDATED | IN PROGRESS | STAGED | LOADED | Emp Total |
|---|---|---|---|---|---|---|---|---|---|---|---|
| 1960 – Employee 26 | 0 | 0 | 2 | 12 | 0 | 0 | 0 | 0 | 0 | 0 | 14 |
| 2019 – Employee 27 | 1 | 1 | 212 | 90 | 0 | 0 | 0 | 0 | 0 | 26 | 330 |
| 2212 – Employee 28 | 0 | 6 | 14 | 4 | 2 | 0 | 0 | 0 | 0 | 0 | 26 |
| 2323 – Employee 29 | 0 | 0 | 1 | 4 | 0 | 0 | 0 | 0 | 0 | 0 | 5 |
| 2553 – Employee 30 | 0 | 50 | 14 | 3 | 2 | 2 | 0 | 0 | 0 | 0 | 71 |
| 2653 – Employee 31 | 0 | 10 | 24 | 1 | 0 | 0 | 0 | 0 | 0 | 0 | 35 |
| 2967 – Employee 32 | 0 | 0 | 1 | 9 | 0 | 1 | 0 | 0 | 0 | 1 | 12 |
| 2992 – Employee 33 | 0 | 0 | 0 | 0 | 0 | 0 | 0 | 0 | 0 | 0 | 1 |
| 3105 – Employee 34 | 0 | 3 | 4 | 2 | 3 | 1 | 0 | 0 | 0 | 0 | 13 |
| 3182 – Employee 35 | 0 | 30 | 17 | 4 | 15 | 1 | 0 | 0 | 0 | 0 | 67 |
| 3239 – Employee 36 | 0 | 23 | 5 | 0 | 0 | 0 | 0 | 0 | 0 | 0 | 28 |
| 3261 – Employee 37 | 0 | 10 | 22 | 21 | 5 | 1 | 0 | 0 | 0 | 0 | 59 |
| 0000 – UNASSIGNED | 5 | 184 | 981 | 217 | 0 | 1 | 708 | 0 | 0 | 339 | 2435 |
| Status Total | 6 | 317 | 1297 | 367 | 27 | 7 | 708 | 0 | 1 | 366 | 3096 |

FIG. 25b

┌─────────────────────────────────────────────────────────────┐
| Resource Summary                                        |
|                                                             |
| Select an Action: ─ 2613                                    |
| [View Realtionships ▲] [Go]                                 |
|                                        2615 ─       2617 ─  |
| ─────────────────────────────────────────────────────────── |
| main information                   rsrc results  search again |
| Rsrc ID: 16634            Data Set: BOTH                    |
| Extent: COUNTY            Media: SDE                        |
| Parcel: Yes    Legal: No  Aerial: No   Street: No  Contact: No |
| URL:                                                        |
| Secure: No         ─ 2603  Concealed: No                    |
| ─────────────────────────────────────────────────────────── |
| provider information                                    |
| Company: Company 1                                          |
| FTP Site:          ╲ 2605                                   |
| Login ID:           ─ 2607  Login Psswrd:                   |
| Contact Name: Doe, John      Job Title:                     |
| Phone1: 999-999-9998    Phone2:           Fax: 999.999.9999 |
| E-Mail:                                                     |
| Address1: COUNTY ASSESSOR'S OFFICE                          |
| Address2: 201 Main Street, ROOM 999  City: Anycity  State: ST  Zip: 99999 |
| Supply Info:                                                |
| Provided Info:                                              |
| Availability:                                               |
| ─────────────────────────────────────────────────────────── |
| other information                                       |
| Comments:                                                   |
| ┌───────────────────────────────────────────────────────┐▲  |
| │     2609 ─                        2611 ─              │   |
| └───────────────────────────────────────────────────────┘▼  |
| Created Date: 11/08/06 08:08    Created By: 3029            |
| Edit Date: 03/29/07 10:57       Edited By: 2967             |
└─────────────────────────────────────────────────────────────┘

*FIG. 26*

Rsrc-Rltnshp Summary search again 3 items found, displaying all items.
1

| Rsrc ID | Rltnshp ID | State | FIPS | Coverage | Company | Status | Owner | Media | Extent | WF | Hsng # | Vol # | Man # | Year | Location |
|---|---|---|---|---|---|---|---|---|---|---|---|---|---|---|---|
| 16634 | 51663 | OK | 40027 | AnyCounty | Company 1 | OBSOLETE | | SDE | COUNTY | | 94485 | 6069 | 756 | | BOTH |
| 16634 | 96745 | OK | 40027 | AnyCounty | Company 1 | LOADED | | SDE | COUNTY | 4 | 94485 | 6069 | 756 | 2007 | BOTH |
| 60359 | 102782 | OK | 40027 | AnyCounty | COUNTY RECORDS... | OBSOLETE | | SDE | COUNTY | | 94485 | 6069 | 756 | | BOTH |

*FIG. 27*

Relationship Summary

Select an Action: ┌ 2803
[Edit Realationships ▼] [Go]

┌ 2805

| main information | | rltnshp rslts / rsrc rslts | rsrc smmry | search again |
|---|---|---|---|---|
| Rltnshp ID: 96745  ⎿ 2813 | | Status: LOADED | | Emp ID: |
| County: AnyCounty - 40027 | | | | |
| Prchs $: 1000 | Leased $: | Setup $: | | Update $: |
| Available Dt: 03/23/07 | Ordered Dt: 03/29/07 | Received Dt: 04/17/07 | | Loaded Dt: 08/20/07 |
| Frequency: | Vintage Dt: 04/13/07 | Amount Paid: 1000 | | WF Priority: 4 | parcel information  ⎿ 2809    ⎿ 2807

| Address: Yes | Owner Name: Yes | APN: Yes | Easement: No |
|---|---|---|---|
| Housing Units#: 95959 ⎿ 2815 | | Order Volume#: 6096 | Manual Volume: 756 |
| Data projection: | | Notes: *Ask for CAMA data as well.* | |

┌ 2817 gis information

Object #: 94951  APN #: 94951
Address #: 88708  Owner #: 0    ┌ 2819

Notes: *Geodatabase format – please populate search by criteria once* research information

| URL Ext: | Location: BOTH | Priority: No |
|---|---|---|
| Search By: | Notes: | |
| *APN (R9999999), Address (13809 Main Street)* | | | legal information ┌ 2821

| Has Agreement: No | Can Modify: Yes | Can Resale: Yes | Can Use: No |
|---|---|---|---|
| Review: | | Verbal Confirmation: Yes | ┌ 2899 |
| Notes:  ┌ 2811 | | Credit Statement: | |
| *no agreement per John Doe* | | | | other information ┌ 2823

Created Date: 03/23/07 11:45    Created By: 2967
Edit Date: 08/24/07 04:12    Edited By: 2967

*FIG. 28*

Rsrc-Rltnshp Summary search again  CSV 215 items found, displaying 1 to 100.
[First/Prev] 1, 2, 3 [Next/Last]

| Rsrc ID | Rltnshp ID | State | FIPS | Coverage | Company | Status | Owner | Media | Extent | WF | Hsng # | Vol # | Man # |
|---|---|---|---|---|---|---|---|---|---|---|---|---|---|
| 24640 | 62539 | MI | 96969 | County 1 | COUNTY GIS | AVAILABLE | Employee 9 | SDE | COUNTY | 1 | 939238 | 56706 | 1600 |
| 32319 | 71499 | OR | 91959 | County 2 | METRO | AVAILABLE | Employee 9 | SDE | COUNTY | 1 | 903086 | 34137 | 1411 |
| 27001 | 65080 | TN | 97939 | County 3 | 97939 - ... | AVAILABLE | Employee 9 | SDE | COUNTY | 1 | 970516 | 19693 | 1611 |
| 26227 | 64306 | MN | 97929 | County 4 | 97929 - ... | AVAILABLE | Employee 9 | SDE | COUNTY | 1 | 913126 | 17047 | 483 |
| 25842 | 63921 | KS | 90999 | County 5 | AIMS | AVAILABLE | Employee 9 | SDE | COUNTY | 1 | 907249 | 20989 | 1123 |
| 26634 | 64713 | NY | 96969 | County 6 | County B | AVAILABLE | Employee 9 | SDE | COUNTY | 1 | 900736 | 9852 | 1014 |
| 32319 | 71500 | OR | 91969 | County 7 | METRO | AVAILABLE | Employee 9 | SDE | COUNTY | 1 | 996957 | 23559 | 1742 |
| 26594 | 64673 | NJ | 94939 | County 8 | 94939 - ... | AVAILABLE | Employee 9 | SDE | COUNTY | 1 | 995112 | 24076 | 1191 |
| 26904 | 64983 | SC | 95949 | County 9 | 95949 - ... | AVAILABLE | Employee 9 | SDE | COUNTY | 1 | 978686 | 20056 | 1494 |
| 27762 | 65841 | NV | 92939 | County 10 | 92939 - ... | AVAILABLE | Employee 9 | SDE | COUNTY | 1 | 968342 | 20207 | 1483 |
| 26880 | 64959 | PA | 92929 | County 11 | 92929 - ... | AVAILABLE | Employee 9 | SDE | COUNTY | 1 | 965007 | 7676 | 1331 |
| 27729 | 65808 | IN | 98909 | County 12 | GIS | AVAILABLE | Employee 9 | SDE | COUNTY | 1 | 949351 | 8342 | 529 |
| 26907 | 64986 | SC | 95959 | County 13 | GIS | AVAILABLE | Employee 9 | SDE | COUNTY | 1 | 947207 | 23168 | 4132 |

*FIG. 29*

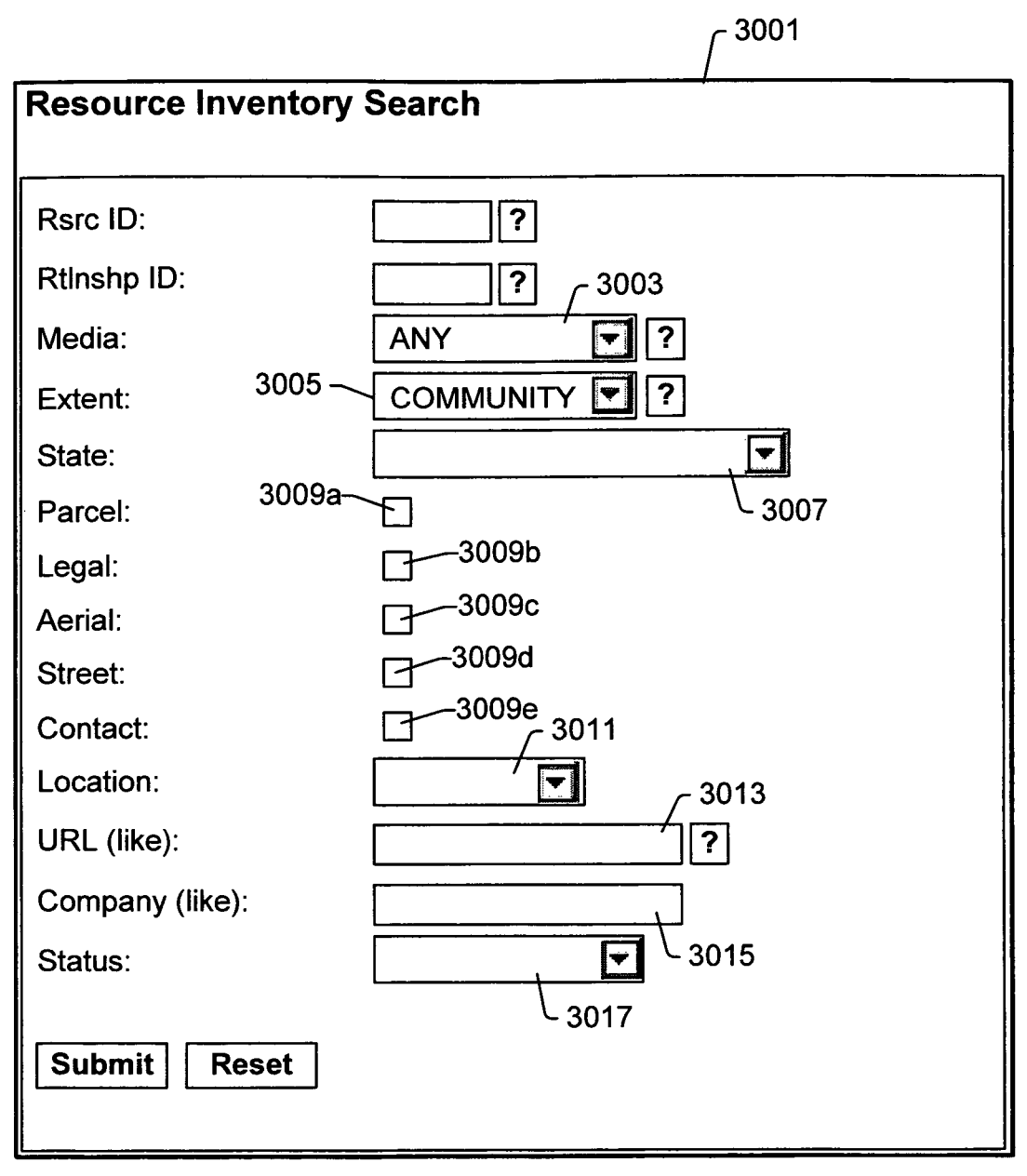

Resource Inventory Search — 3001

- Rsrc ID:
- RtInshp ID: — 3003
- Media: ANY
- Extent: 3005 — COMMUNITY
- State: — 3007
- Parcel: 3009a
- Legal: — 3009b
- Aerial: — 3009c
- Street: — 3009d
- Contact: — 3009e
- Location: — 3011
- URL (like): — 3013
- Company (like): — 3015
- Status: — 3017

Submit   Reset

*FIG. 30*

PARCEL DATA ACQUISITION AND PROCESSING

PRIORITY CLAIM

This application claims benefit of priority of U.S. Provisional Patent Application Ser. No. 60/872,831 titled "PARCEL DATA ACQUISITION AND PROCESSING", filed on Dec. 5, 2006, whose inventors are Brett T. Pearcy, Matthew E. Karli, Charles P. Reynolds, Hugo A. Tagle, Eric Scott Little, Michael T. Swartz, Scott A. Giberson, which is hereby incorporated by reference in its entirety as though fully and completely set forth herein.

BACKGROUND

1. Field of the Invention

The present invention relates generally to data and, more specifically, to parcel data processing and acquisition.

2. Description of the Related Art

Several market sectors may have an interest in data for specific parcels. Entities such as banks, insurance companies, real estate agents, government agencies, and utility providers may need parcel specific data. For example, real estate agents may need a parcel valuation to use in considering an offer for a specific parcel. As another example, a bank may need to know whether a parcel they are providing a mortgage for is in a high-risk flood zone. Because of the wide range of sources of information for parcels, it may be difficult for companies to locate information for a particular property without consulting several sources of data.

SUMMARY

In some embodiments, scripts may be used to perform data standardization and/or normalization of parcel data from different sources into a common format database or collection of databases. For example, data may be collected from sources (e.g., external) and scripts may be used to convert the data, clean-up/repair data, and track data during the acquisition process. Scripts may perform these functions in an automated manner or may execute with manual assistance from a system user (e.g., through a graphical user interface). The scripts may be used, for example, to repair geometries of new data, convert multi-part parcel geometries to single part parcel geometries (explode), eliminate duplicate parcel geometries, append columns, calculate attribute values, create feature classes, and append feature classes. These scripts may also be executed in a predetermined manner to increase efficiency. For example, the explode script may be executed before the eliminate duplicate geometries script to avoid duplicate geometries that may be created as a result of the explode script. The scripts may be designed for and may be dependent on the source of the parcel data. These scripts may be written in a scripting language and executed in an Environmental Systems Research Institute's (ESRI's) modeling environment. Other environments are also contemplated.

In some embodiments, multiple scripts may be performed at approximately the same time. For example, a system executing the scripts may multi-thread the scripts. In some embodiments, the scripts may be recursive scripts. In some embodiments, as the scripts execute, a log file may be generated with information about the execution of the scripts (including exceptions, errors, values outside established parameters, etc.).

In some embodiments, different combinations of attributes may be appended to acquired parcel data. For example, the Assessor's Parcel Number (APN), Tax identification (ID) number, and situs information (such as mailing address, state, zip code, owner's name, flood zone, elevation of insurable property, etc.) may be stored for associated parcel data (e.g., for an associated parcel description). Attributes may also provide links to other data. For example, while an APN may be stored with a parcel description, it may also provide a link to additional data about the parcel in a different database.

In some embodiments, a tracking application may be used to track sources of data for the common format database including data that is already in-house, data that can be acquired from a source at low cost, data that can be acquired from a source at high cost, and data that is not available. The tracking application may be used to keep track of the changing status of the data sources (e.g., data sources may become newly available or more expensive). The tracking application may also track the type and state of the data available and/or being added to the common format database (e.g., whether the data from a particular source will require a lot of work to repair, etc.). The tracking application may also track potential sources of attribute data (e.g., for attributes not stored in the system).

In some embodiments, a tracking application may be used to track information about parcel projects. For example, the tracking application may track which system users are assigned to specific tasks. In some embodiments, the tracking application may be used to assign data acquisition/preparation tasks, etc. The tracking application may also be used to view the current assignments, to change/edit assignments, etc.

In some embodiments, tracking application data may be stored as one or more relationships assigned to parcel data. For example, a relationship may indicate a contact source for the data and another relationship associated with the parcel data may indicate the identity of a system user assigned to process the parcel data.

BRIEF DESCRIPTION OF THE DRAWINGS

A better understanding of the present invention may be obtained when the following detailed description is considered in conjunction with the following drawings, in which:

FIG. 9b illustrates a panel for adding tasks to the project, according to an embodiment.

FIG. 9c illustrates a panel for viewing tasks of the project, according to an embodiment.

FIGS. 11 and 12 illustrate panels for editing details for a task, according to an embodiment.

FIG. 13 illustrates a panel for adding a resource, according to an embodiment.

FIGS. 14-15 illustrate panels for editing the resource, according to an embodiment.

FIGS. 16a-b illustrate panels for county resource relationships, according to an embodiment.

FIGS. 17-18 illustrate panels for adding a county relationship, according to an embodiment.

FIG. 19 illustrates a panel for listing a county resource relationship, according to an embodiment.

FIGS. 20a-b illustrate panels for parcel inventory searches, according to an embodiment.

FIG. 21 illustrates a panel for parcel inventory search results, according to an embodiment.

FIG. 22 illustrates a panel of parcel resource detail, according to an embodiment.

FIG. 23 illustrates a resource inventory search panel, according to an embodiment.

FIG. 24 illustrates a second resource inventory results panel, according to an embodiment.

FIGS. 25a-b illustrate a workflow interface for management of parcel data, according to an embodiment.

FIG. 26 illustrates a resource summary interface, according to an embodiment.

FIG. 27 illustrates a resource relationship summary for a county, according to an embodiment.

FIG. 28 illustrates an edit relationship summary interface for a resource, according to an embodiment.

FIG. 29 illustrates a resource relationship summary for an individual, according to an embodiment.

FIG. 30 illustrates a resource inventory search interface, according to an embodiment.

Figure 1:
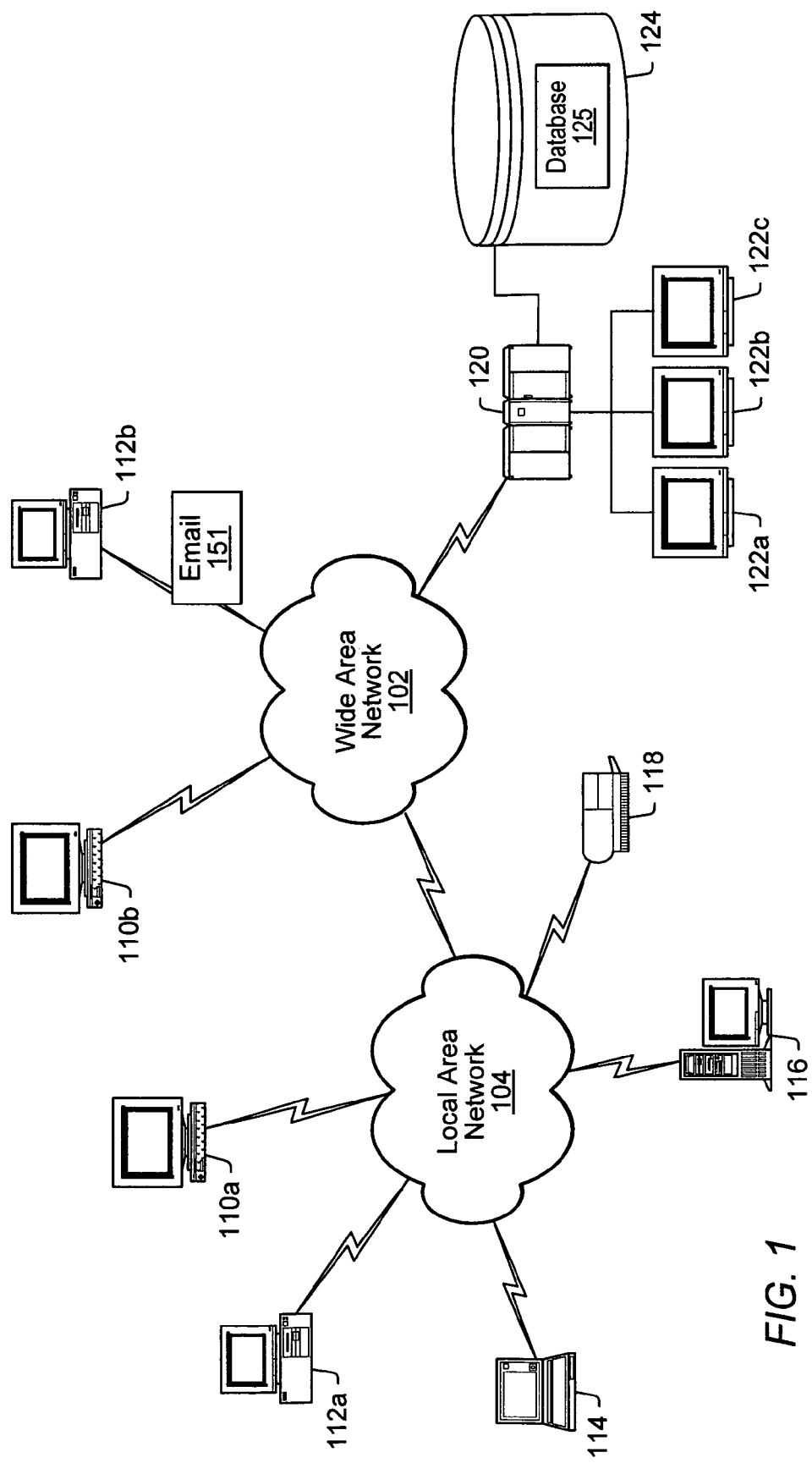
FIG. 1 illustrates an embodiment of a wide area network (WAN) and a local area network (LAN).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

FIG. 1 illustrates an embodiment of a WAN 102 and a LAN 104. WAN 102 may be a network that spans a relatively large geographical area. The Internet is an example of a WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more LANs 104 may be coupled to WAN 102. LAN 104 may be a network that spans a relatively small area. Typically, LAN 104 may be confined to a single building or group of buildings. Each node (i.e., individual computer system or device) on LAN 104 may have its own Central Processing Unit (CPU) with which it may execute programs. Each node may also be able to access data and devices anywhere on LAN 104. LAN 104, thus, may allow many system users to share devices (e.g., printers) and data stored on file servers. LAN 104 may be characterized by a variety of types of topology (i.e., the geometric arrangement of devices on the network); of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices. For example, LAN 104 may include one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data (e.g., a database 125) stored in the storage device or file server 124 coupled to or included in mainframe computer system 120. In some embodiments, the database 125 may be stored in other mediums.

WAN 102 may also include computer systems connected to WAN 102 individually and not through LAN 104. For example, workstation 110b and personal computer 112b may be connected to WAN 102. For example, WAN 102 may include computer systems that may be geographically remote and connected to each other through the Internet.

Figure 2A:
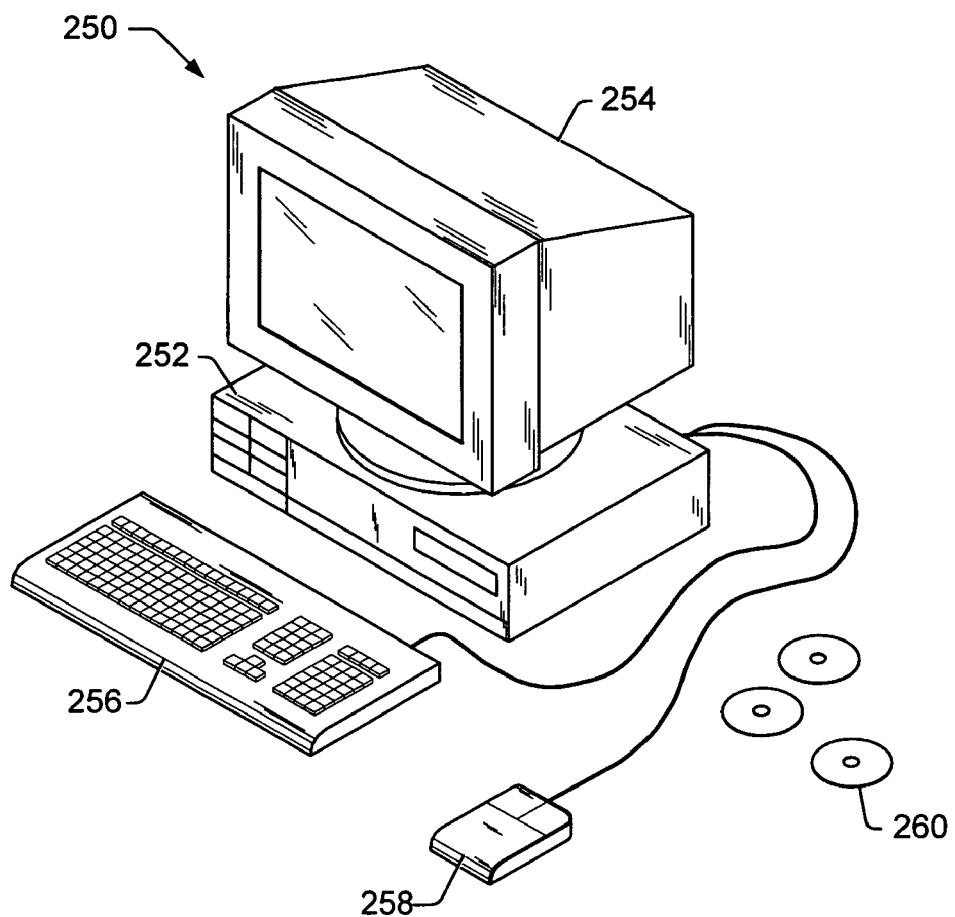
FIGS. 2a-b illustrate an embodiment of computer system that may be suitable for implementing various embodiments of a system and method for parcel data acquisition and tracking.
Figure 2B:
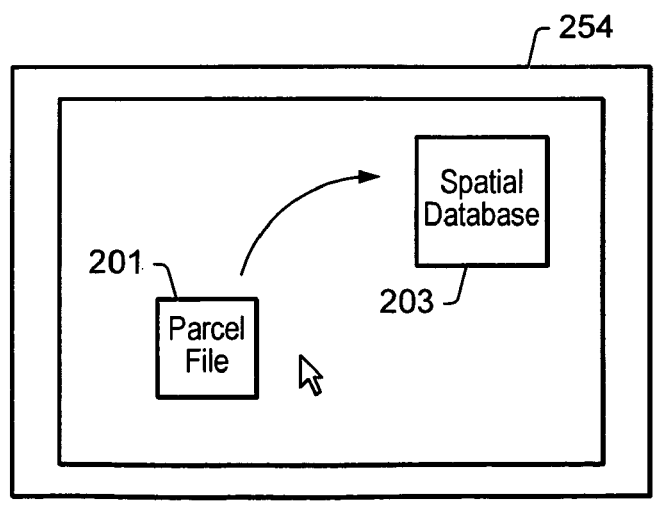

FIGS. 2a-b illustrates an embodiment of computer system 250 that may be suitable for implementing various embodiments of a system and method for parcel data acquisition and tracking. Each computer system 250 typically includes components such as CPU 252 with an associated memory medium such as Compact Disc Read-Only Memories (CD-ROMs) 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for parcel data acquisition and tracking.

Computer system 250 may include a memory medium on which computer programs according to various embodiments may be stored. The term "memory medium" is intended to include an installation medium, e.g., floppy disks or CD-ROMs 260, a computer system memory such as Dynamic Random Access Memory (DRAM), Static Random Access Memory (SRAM), Extended Data Out Random Access Memory (EDO RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant (PDA), television system or other device. In general, the term "computer system" may refer to any device having a processor that executes instructions from a memory medium.

The memory medium may store a software program or programs operable to implement a method for parcel data acquisition and tracking. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

In some embodiments, data (e.g., parcel data 300) for different geographical areas may be combined into a common format database 125 (or collection of databases) using a common format. In some embodiments, parcel data 300 stored in the common format database 125 may be stored as a parcel layer that includes parcel descriptions (e.g., boundary coordinates) and linked attribute data for several parcels. In some embodiments, parcel data 300 for different regions in the United States may be combined into a national digital parcel layer. Other countries are also contemplated. In addition, different parcel layer sizes are also possible. For example, the regions of a state may be collected into a statewide parcel layer. The parcel layer may encompass data for the entire region or may be incomplete. For example, some of the regions in the parcel layer may not have parcel data 300 or may not provide their parcel data 300 for general use. The combined data in the common format database 125 may be accessed by different entities for different reasons. For example, a bank may access the combined data to determine a flood zone type for a parcel of land (e.g., to determine whether to extend a loan for its purchase). Other access reasons are also contemplated. For example, the parcel data may be accessed for location based services (e.g., navigation systems, online mapping, telematics, cell phone services), flood risk assessment tasks, etc.

In some embodiments, parcel data 300 may be collected from various sources to place into the common format database 125. In some embodiments, acquired data may be formatted into spatial parcel data files to be automatically loaded into a spatially enabled database through a spatial database interface (SDI) 511. Scripts may assist in the formatting and loading of the data. In some embodiments, the data originating from these various sources may be collected and formatted for placing in the common format database 125. For example, the common format database 125 may be a spatially enabled database accessed through an SDI 511 (see FIG. 5). In some embodiments, the common format database 125 may be a Spatial Database Engine (SDE) (e.g., hosted on a Microsoft SQL Server™ (Structured Query Language Server)) or an Oracle™ database (which may have a spatial database option). Other database types and other server types are also contemplated. Various entities, including individual communities and companies, may also be sources of data on various regions. In addition, different types of data may be collected from different sources. For example, data from one source may include scanned paper maps while data from another source may include lists of current parcel owners. The different types of data may be acquired into a common format database 125 for later retrieval. In addition, because the data is stored together, it may be easier to retrieve different types of data (e.g., to analyze a particular parcel) for parcels in different regions. Data may be stored in a database 125 managed by a database application. Applications accessing the data in the database 125 may interface with the database application managing the database 125. In some embodiments, data may be stored in a database 125 and the database 125 may be accessed directly by applications accessing the data (e.g., the application accessing the data may include programming instructions allowing the application to directly access the database 125 without requiring an intermediary database application). Other database and database access is also contemplated. In some embodiments, SDE data may include a separate layer of indices built on top of the data in the SDE database (which may require a separate application to interface with the SDE database) while in an Oracle™ database, the indices may be built into the database (allowing more types of applications to directly access the Oracle™ database without an intermediary database application). Other database configurations are also contemplated. While many different formats may be used, including those described herein, it is to be understood that other formats for the common format database 125 are also contemplated. Placing parcel data from several different sources into a common format for the common format database 125 may allow easier access of the data (e.g., by system users and/or applications). The parcel data in the common format database may be used for location based services (e.g., navigation systems, online mapping, telematics, cell phone services), flood risk assessment tasks, etc. Other uses for the parcel data are also contemplated.

In some embodiments, scripts may be used to acquire data from different sources and used to put the data into a common format for storage in the common format database 125. For example, scripts may be used to perform parcel data acquisition, conversion, and clean-up/repair. Scripts may allow data processing in an automated manner or may assist a system user in manual processing (e.g., through a graphical user interface). A graphical user interface may also be used to set-up and assist scripts in automated processing. In some embodiments, scripts may be prepared and executed in an ESRI modeling environment. In some embodiments, scripts may use predefined ESRI functions and/or new functions. Scripts may be written in, for example, Visual Basic (V-Basic) or Python. Other programming languages and environments are also contemplated. The scripts may be designed for and may be dependent on a source of the parcel data 300 (e.g., different sources of data may have different qualities of data). As the scripts execute, a log file 701 may be generated with information about the execution of the scripts (including exceptions, errors, values outside established parameters, etc.).

In some embodiment, scripts may be used, for example, to convert parcel data 300 from shape-files 703 (see FIG. 7) into a common format for storage in a common format database 125. Shape-files 703 may include files received from outside sources. Shape-files 703 may include various levels of data. For example, some shape-files 703 may only include parcel geometry (e.g., data points, such as parcel description coordinates, for a polygon defining parcels) while other shape-files 703 may provide parcel geometry and several related attributes. Coordinates may include latitude/longitude coordinates or other coordinate types. Shape-files 703 may also include designators to indicate where coordinates begin and end for a geometry (e.g., the coordinates for a geometry may be placed on the same line or may be surrounded on either side by a geometry indicator (such as an asterisk or backslash). Other shape-file formats are also contemplated. Part of the conversion may include converting parcel data 300 from raster format to vector format (e.g., by digitizing the raster image). Raster formats may include, for example, Joint Photographic Experts Group (JPEG) and Graphic Interchange Format (GIF) files. Other raster formats are also contemplated. The scripts may also convert other digital data formats into a standardized data format. The scripts may also be used to georeference parcel data maps 400. For example, a parcel data map 400 may be placed over a geographic coordinate map (e.g., physically or digitally) and the parcel data map 400 may be moved and/or resized (e.g., through script execution and/or system user interaction) to fit the parcels (e.g., parcel 401) on the parcel data map 400 with their correct coordinates. In some embodiments, coordinates may be assigned to relevant portions of the overlaid parcel data map 400.

Figure 3:
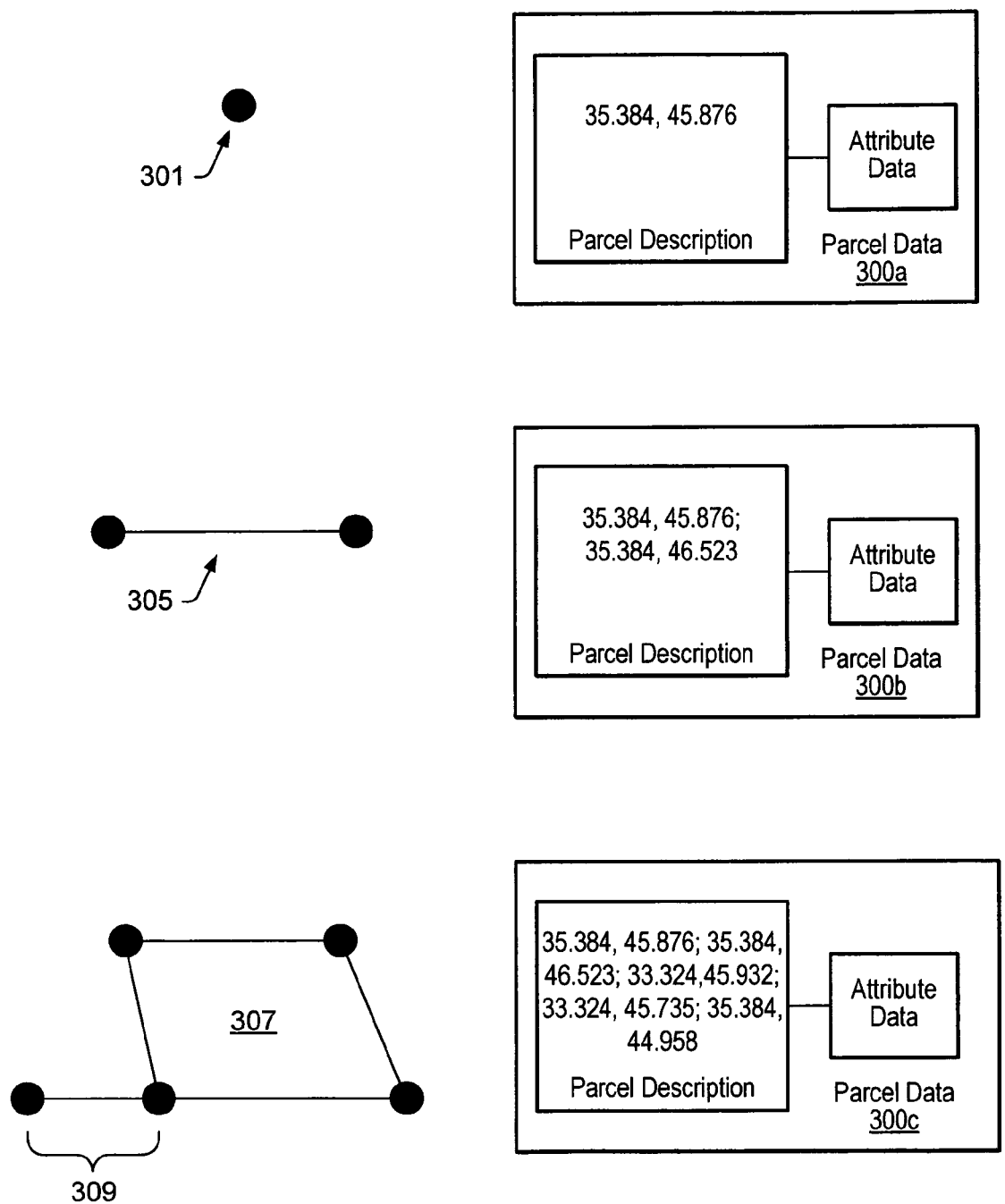
FIG. 3 illustrates geometric elements for geometry repair, according to an embodiment.

As seen in FIG. 3, in some embodiments, scripts may be used to clean-up/repair geometries of received (i.e., original) parcel data 300 (which may include latitude/longitude coordinate data points for a parcel geometry (or another format for the geometry coordinates)) for storage of the data in the common format database 125 (other parcel data 300 and parcel data formats are also contemplated). For example, parcel data 300a,b with incorrect geometries (such as one and/or two point polygons) may be repaired. The one-point polygon 301 and two-point polygon 305 may be correctly joined with other points to form a polygon or may be eliminated. Polygon 307 with a dangle 309 may also be corrected (e.g., to remove the dangle 309). In some embodiments, correction may include removing the coordinates for the extra dangle 309 from the parcel data 300c (e.g., the script may analyze the parcel data 300 to determine which coordinates define an enclosed polygon and which coordinates are extra). Other corrections are also contemplated.

In some embodiments, the scripts may be used to convert multi-part parcel geometries of the original data to single part parcel geometries (explode). In some embodiments, a multi-part parcel feature may include two or more polygons with similar or equal attributes combined together in a single geometry describing the parcel (e.g., two sets of coordinates defining polygon 307 may be included where only one set is needed). Exploding these multi-part features may result in independent entries for the polygons previously combined in the multi-part parcel feature (exploding may include analyzing the polygons for overlap and/or duplication). Eliminating these multi-part features may decrease parcel feature complexity and may facilitate geometry comparison among polygons. For example, the excess polygons may be eliminated leaving one polygon for the parcel feature.

In some embodiments, the scripts may be used to eliminate duplicate parcel geometries of the original data. In some data sets, a parcel may have at least two polygons (a first polygon and at least one duplicate of the first polygon) associated with the same attributes. For example, time-share property descriptions may have multiple owners for the same parcel of land. Although the APN and the parcel boundaries for the parcel of land of the time-share may be the same, the original data may have duplicate polygons for the owners. Upon review, if these duplicate polygons are not necessary (e.g., contain attributes not needed in the database 125), a script may be used to compare the geometries and find and eliminate the extra polygons. The script may use one or more logical tests (e.g., in a series) to determine which one of the polygons should be kept and which should be eliminated (because they are duplicates).

Figure 5:
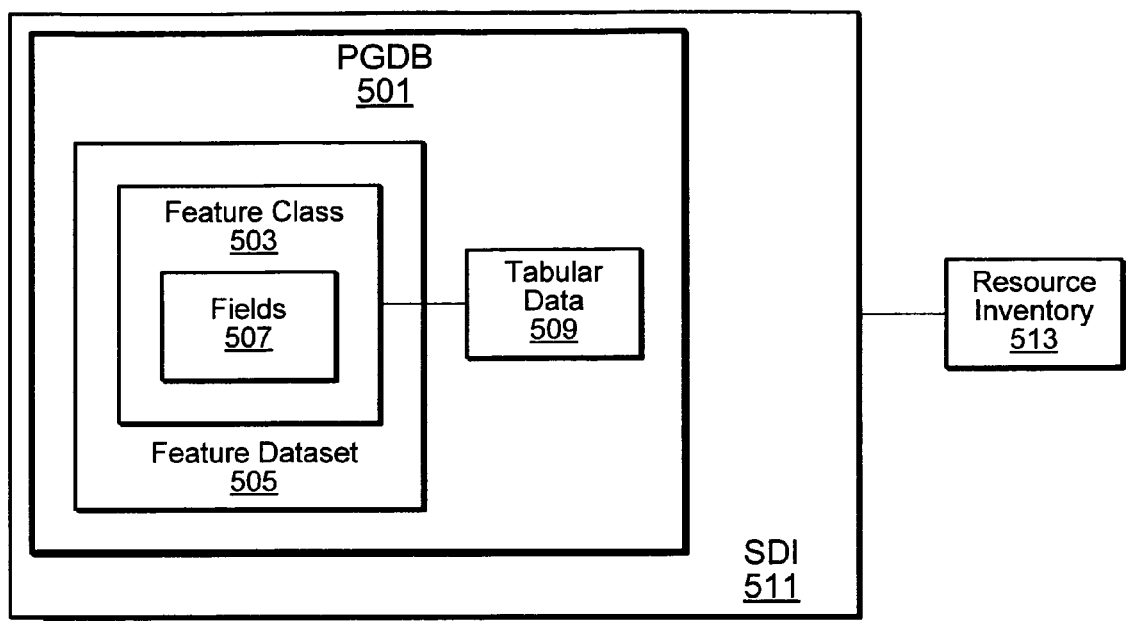
FIG. 5 illustrates a personal geodatabase, according to an embodiment.

In some embodiments, as seen in FIG. 5, a common format may include using PGDBs 501 in the database 125 (e.g., created and/or accessed through SDI 511) that stores geographic information using standard relational database architecture. Other formats are also contemplated. The PGDB 501 may include both a feature class 503 and tabular data 509 (e.g., tabular attributes, columns, etc.) linked to the feature class 503.

The feature class 503 may include a description of a geographic object (e.g., a polygon or street). The feature class 503 may include several fields 507 (including an object identifier, shape coordinates (e.g., a table of rows indicating the coordinates of the shape), a shape area, and a shape length). Other fields 507 may also be stored with the feature class 503. Feature classes 503 may also be used to store centerline coordinates for streets (which may not have a corresponding shape area). In addition to feature classes 503, the PGDB 501 may store related attributes in tabular form (e.g., tabular data 509).

In some embodiments, the scripts may be used to integrate parcel geometries. In some embodiments, integration may be performed after individual feature geometries of the polygons have been repaired. An Integrate script (e.g., integrate parcel geometries script) used in ESRI may analyze the relationship of the features in a feature class 503 (e.g., for a parcel geometry). For example, the script may examine the location of the nodes of a polygon in relation to other nodes of other polygons in the same feature class. If two nodes are determined to be within a predefined threshold (cluster tolerance) then one of the nodes may be eliminated. For example, if two adjacent polygons both have a boundary (as defined by one or more nodes) and the distance between these boundaries is less than the cluster tolerance, then the two boundaries may become coincident through the integration script. The integration procedure may be used to clean-up data and remove nodes that may not be needed. Also, small gaps and slivers in the geometry between polygons may be eliminated to improve the aesthetics of the parcel features (e.g., as shown on a resulting parcel map 400).

In some embodiments, the scripts may be used to append columns. An append, columns script may be used to create columns (for the parcel data 300) that have the same name as a corresponding column in an SDI feature class. These columns may then be used to temporarily store the relevant data to be transferred to the database 125. Another reason to create (i.e., append) columns is to hold intermediate data used in some scripts. For example the DUPES and DUPENUM fields may be used in the script that eliminates duplicate data.

In some embodiments, the scripts may be used to create feature classes and/or append feature classes. In some embodiments, the scripts may use data that was originally stored in shape-files 703. Because PGDB size limitations may be limited, (for example, less than two Gigabytes in some embodiments) separate PGDBs may be created during the processing. For example, the script may eliminate multi-part features from the original parcel data 300 and output the resulting feature class to a temporary PGDB. By creating a temporary PGDB, the original data may be usable, as it was acquired, for other processing. In addition, further processing may be performed on the temporary PGDB. In some embodiments, another PGDB may be created to contain the final output. The final PGDB may include a feature class that emulates the structure and settings that define the master parcels table (feature class) (which may be a nationwide table in some embodiments) that is stored on a database 125 (e.g., a LAN database) and accessed by SDI 511 (referred to herein as the "SDI clone"). Inside the final PGDB the SDI clone may be created by accessing the master database table through SDI 511 and creating a standalone feature class using the master database table as a template. The features generated by using the script to process the temporary PGDB feature class may be appended to this SDI clone feature class in the final PGDB. This may facilitate loading the SDI clone features and attributes to the master database table using the SDI interface.

Figure 4A:
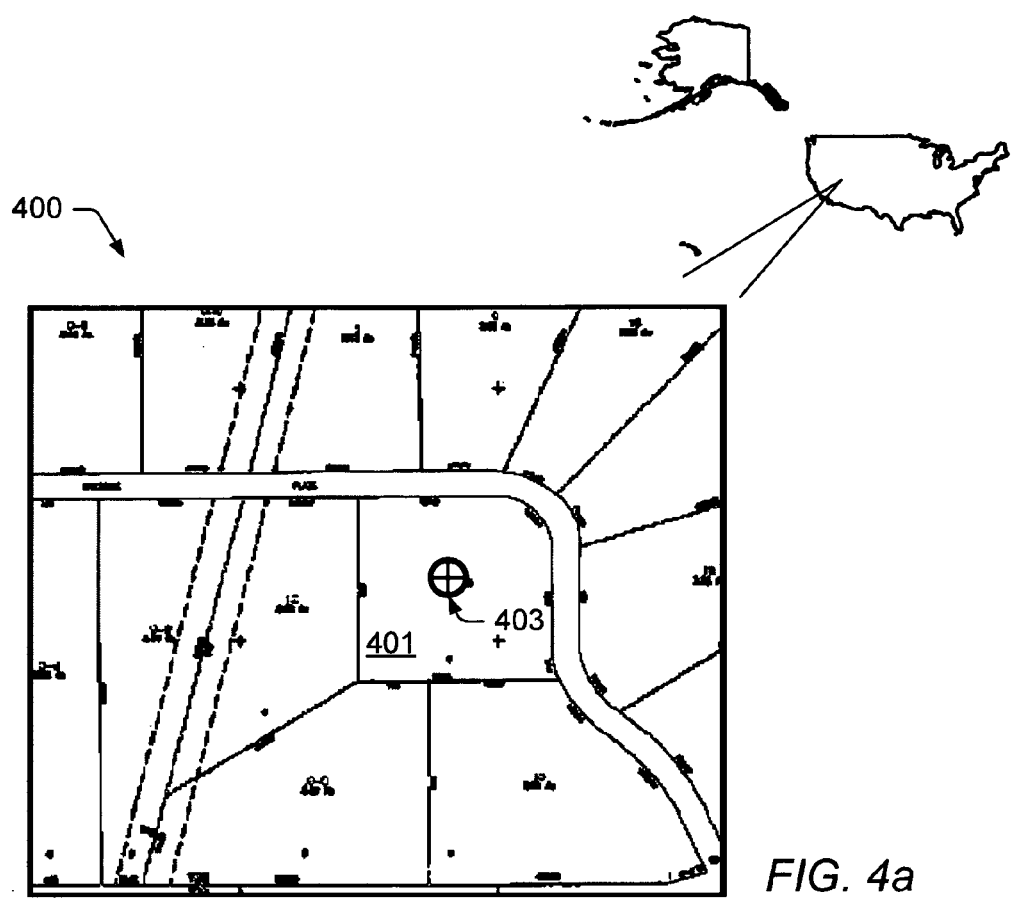
FIGS. 4a-b illustrate parcel maps, according to an embodiment.
Figure 4B:
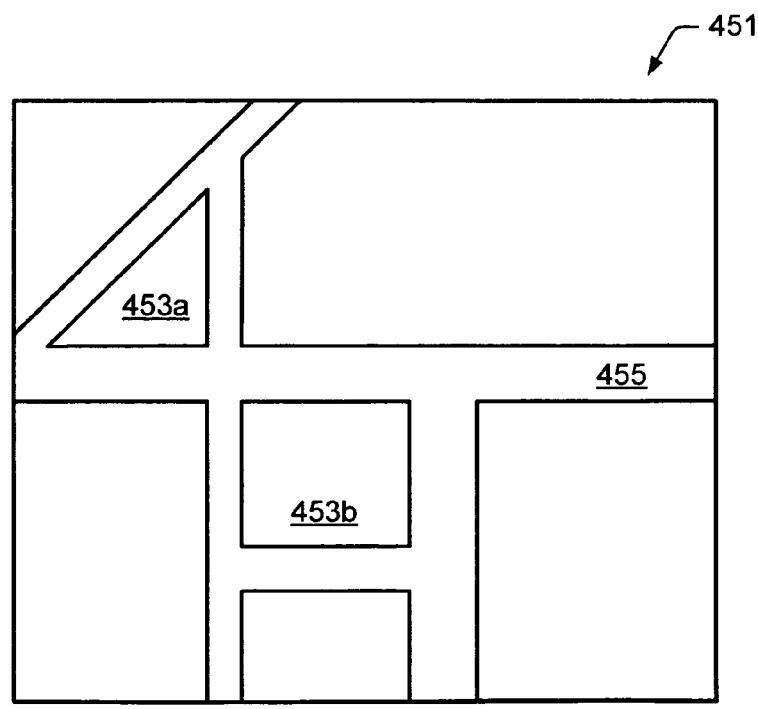

FIGS. 4a-b illustrates a parcel map 400 creatable with parcel data 300, according to an embodiment. In some embodiments, the resources identified and detailed in FIGS. 13-24 may provide data describing parcels (e.g., parcel 401) from parcel maps (e.g., parcel map 400). The parcel map 400 may be in raster form or vector form. Other forms are also possible. For example, other digital formats of data may be received and converted into a standard format for the common format database 125. As another example, the data may include a parcel map 400 which may be a paper map. The paper map may be scanned into the system for conversion and placed into a common format database 125.

As seen in FIG. 5, in some embodiments, geographic data may be stored in PGDBs 501. Multiuser geodatabases may also be used. The common format PGDBs 501 may be accessed/modified by an SDI interpreter. The PGDB 501 may be stored using Structured Query Language (SQL). Other languages and interpreters may also be used.

Figure 6A:
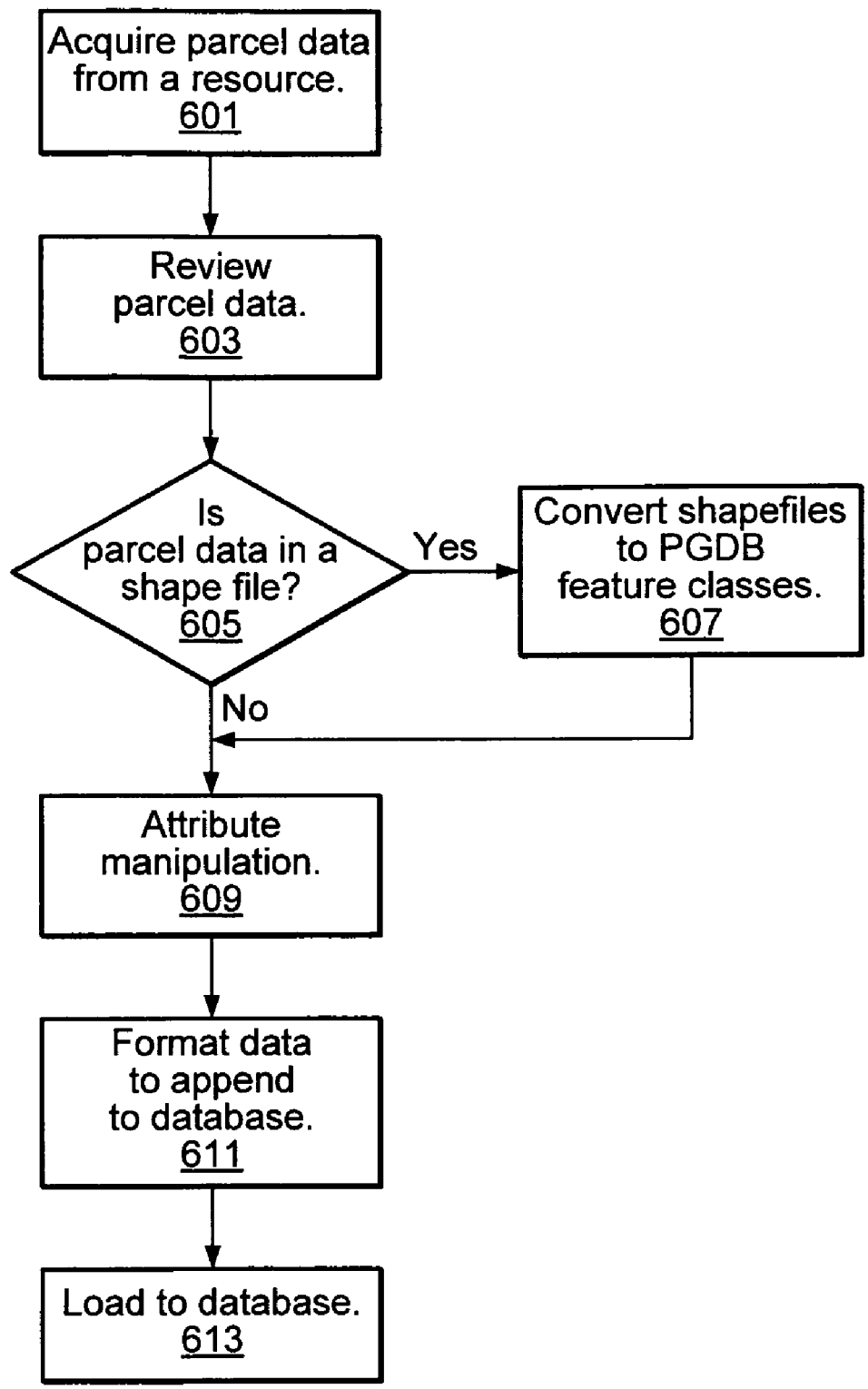
FIG. 6a illustrates a flowchart for executing scripts to create personal geodatabases (PGDBs), according to an embodiment.

FIG. 6a illustrates a flowchart for processing acquired parcel data 300 to place into a common format database 125, according to an embodiment. It should be noted that in various embodiments of the methods described below, one or more of the elements described may be performed concurrently, in a different order than shown, or may be omitted entirely. Other additional elements may also be performed as desired. Parts or all of the process shown in the flowchart of FIG. 6a may be automated (e.g., performed by a computer system).

At 601, parcel data 300 may be acquired. Parcel data 300 may be acquired from several different sources including communities (e.g., from a Geographic Information System (GIS) department, recorder's office, or tax assessor's office) and private corporations.

At 603, the parcel data 300 may be reviewed. The parcel data 300 may be reviewed by a computer system or by a system user (e.g., visually). In some embodiments, the data may be projected (e.g., over a coordinate map), to align and determine the data's correct coordinates. Points on the parcel data 300 may then be associated with the determined coordinates. The data may also be reviewed for spatial accuracy. Attribute data associated with the parcel data 300 may also be reviewed.

In some embodiments, determining spatial accuracy and projecting the parcel data 300 may include visual and/or automated review. In some embodiments, visual review (or automated review) of data may include projection of the data to confirm projection exists and that the data is aligned with projected data in the SDI 511. Confirming the projection exists may include examining metadata of a shape-file 703 or PGDB 501 of the original data. If there is no projection, the data may be projected (e.g., using a project tool from Arc-Catalog™) according to coordinates (e.g., projected onto state plane coordinates appropriate for the data's state and location in the state). If a projection is not applicable from a state plane, a custom projection may be used. For example, a county/city/township may be contacted to acquire projection information or actual projection files (which may have a .prj extension) to use in the projection. In some embodiments, data lines (such as parcel boundaries and street centerline data (e.g., by a third party such as Global Descriptor Table (GDT) Teleatlas) (other sources of street centerline data are also contemplated) may be checked to determine whether they line up with SDI 511. For example, parcels boundaries on each side of a street may be an equal distance from the street centerlines that may trace the middle of the street. The data may be checked after the data has been projected or the file has been received with proper projection metadata or a .prj file associated with the shape-files 703 or PGDB. In some embodiments, spatial accuracy may be checked by visually comparing a border of a map (e.g., a state map) with the border of the parcel data 300 to determine if the parcel data 300 matches existing data (e.g., by comparing street centerline data and Digital Orthophoto Quarter-Quadrangle (DOQQ) aerials). In some embodiments, attribute characteristics may be verified. For example, the APN, address, and owner names stored with the data may be checked for usability (e.g., to make sure they exist and are in an appropriate format). Other methods for reviewing the data may also be used.

In some embodiments, at 605, a determination may be made whether the received parcel data 300 is in the form of a shape-file 703 (e.g., in an .shp format).

At 607, if the received data is in the form of a shape-file 703, a script may be used to convert the shape-file feature class into a PGDB feature class.

At 609, attributes of the parcel data 300 may be manipulated. For example, attribute values associated with the parcel data 300 may be formatted and/or concatenated to be loaded. For example, the attributes may be formatted using Microsoft Access™ database software if the feature class is contained in a PGDB. In some embodiments, a shape-file feature class may be converted to a PGDB feature class to facilitate use of Microsoft Access™ database software (or a different format to facilitate use of a different database software). In some embodiments, attribute manipulation may include manipulating data by creating additional fields, if needed, for data from separate databases (e.g., from other sources), concatenating data that is separated into many fields, cleaning data with database queries (e.g., eliminating extra 0's, spaces, etc.), and confirming address attributes using street feature class (e.g., including street centerline data) as well as using a database's address values for corresponding locations. For example, street names (e.g., included in the street centerline data) may be compared to addresses in the parcel data 300.

At 611, the parcel data 300 may be formatted to append into the common format database 125 (e.g., the parcel data 300 may be arranged into the same format (e.g., to match formats used for the other feature classes, rows, columns, etc.) used in the common format database 125). For example, as described herein, parcel data 300 from shape files 703 may be converted from raster format to vector format (if vector format is the common format used in the common format database 125) and vice-versa. Other formats may also be used. In some embodiments, spatial indices may be created (e.g., manually by a system user or automatically by a computer system) for the parcel data 300 (e.g., through scripts) (which may also have been converted, for example, from raster format to vector format for the database 125) that may then be used to append the parcel data 300 into existing spatial data files (e.g., using the scripts described herein).

In some embodiments, the new parcel data may be compared to data already in the common format database 125. An analyzing script may determine which data is different and may determine a footprint (e.g., with location information) for the new data. The data in the spatially-enabled database 125 may be updated/replaced with respective new data according to the footprint. The data may also be updated/replaced without developing a footprint. In some embodiments, the script may selectively analyze and update the common format database 125 with data as needed. In some embodiments, updates may be divided and a portion of the update may be applied to the database 125. For example, if subscribing to a county database, an update from the county may be divided (e.g., to include/remove specified parts of the data) and a portion of the county update may be applied to the database 125.

In some embodiments, the SDI 511 may be used to create the spatial indices (e.g., manually by a system user or automatically, for example, by an application that analyzes the data to determine the corresponding spatial indices) for the data in the file. The indices may indicate which rows in the spatially enabled database 125 should be appended with the data from the file. For example, an "append" function may be used to put the new data in the spatially enabled database 125 (e.g., using the indices).

In some embodiments, a script may create a PGDB 501 with a feature class 503 (within a feature dataset 505), using SDI 511 and existing parcel data as a template, to load into a common format database 125. For example, a new PGDB 501 may be created with new data (e.g., the script may use new parcel data 300, received from a resource, in the feature class 503) or an existing PGDB 501 may be updated by creating a new PGDB 501 with updated feature class information. The new PGDB 501 may be modeled after the PGDB 501 it will replace (e.g., with similar fields 507, etc.). The script may then process the acquired parcel data 300. In various embodiments, processing data for appending into the common format database 125 may include preparing the data for placing into PGDBs 501. For example, processing may include exploding (breaking apart) multi-part features (e.g., a shape with multiple parcels) and eliminating duplicate polygons of parcels in the PGDBs 501. Processing may also include other methods of preparing the data.

In some embodiments, processing may include creating and calculating fields 507 to contain relevant/available data for the feature class 503 and appending the features with the new populated fields 507 into an SDI clone (e.g., a feature class emulating a master database table structure stored on a database 125 (e.g., a LAN database) and accessed by SDI 511). In some embodiments, processing may also include repairing geometry, integrating the geometry, and eliminating duplicate polygons. Field entries for the PGDBs 501 may remain empty if there is no real data to place in the field 507. The resulting SDI clone feature class 503 may have field names that match master database table column structures and fields populated with relevant/available data. In some embodiments, the SDI clone may be created, and the feature integrity may be insured. Trim fields may be loaded, and the features may be appended to PGDB. The SDI clone feature class may also be created.

In some embodiments, inputs to the scripts (e.g., for formatting the data) may include a filename/path for a file/folder containing reviewed parcel data, an indicator whether to repair geometry of the new data (e.g., Boolean value of true or false returned when a system user checks or unchecks a graphical checkbox), an indicator whether to integrate (e.g., Boolean value of true or false returned when a system user checks or unchecks a graphical checkbox), an indicator whether to eliminate duplicate polygons (e.g., Boolean value of true or false returned when a system user checks or unchecks a graphical checkbox), a text filename for a processing log(e.g., to store processing information such as a feature count at critical processing times), and a filename/path for output PGDBs 501 with the SDI clone. Other inputs are also contemplated. For example, other inputs may include an employee record ID (RID) that identifies the employee executing the script (may be used to populate a CREATE_ID field), a creation date (may be used to populate a CREATE_DT field), and a resource identifier (which may be used to populate a SOURCE field). In some embodiments, the script may output the new PGDB 501 name and an SDI feature class name.

In some embodiments, the script may create a corresponding PGDB 501 in the designated folder (e.g., with an address provided by the inputs). The script may create an SDI clone feature class 503 in the PGDB 501 using the parcel feature class from the master database table as a template. Using the parcel feature class from the master database table may ensure that the settings and table structure including field names in the SDI clone will match the parcel feature class stored on a database 125 (e.g., a LAN database). If the SDI clone feature class 503 already exists in a PGDB 501, the script may proceed to update the next PGDB 501. This may prevent accidental stacking of objects within a PGDB 501.

In some embodiments, multi-part features on polygons of the new data may be eliminated. The script for converting multi-part to single part geometries may output a resulting feature class 503 to a temporary PGDB 501 (e.g., to minimize space requirements). In some embodiments, the majority of processing may be performed on this temporary feature class. A PGDB 501 may be created prior to executing the script.

In some embodiments, a script may be executed to repair geometries of the temporary feature class (e.g., see FIG. 3 and above discussion). The script may be executed in conjunction with a check geometry tool (e.g., used in ESRI) (which, in some embodiments, may create a table containing entries for the features that have invalid geometries). Invalid geometry examples may include improper ring ordering, short segments, self-intersecting polygons, etc. (which may be defined by a tool in ESRI). Check geometry may work with the repair geometries script to indicate which parcel geometries (e.g., polygons) need repairing. In addition, in some embodiments, a script may be executed to integrate the temporary feature class.

As seen in FIG. 4b, in some embodiments, a street finder script may be executed to count voids 453a,b (e.g., holes in the polygons) to remove street features 455 and complex polygons from parcel map 451. In some embodiments, the voids 453a,b in a polygon may be counted and an indicator may be provided for polygons with void counts above a threshold. A high void count may indicate a street feature 455 (e.g., a polygon surrounding a street feature may have multiple voids). Other polygons may also have a high void counts (e.g., other polygons with complex/auxiliary features). For example, these polygons may have a spider web like appearance. The complex features and/or polygons may be manually (e.g., by a system user) or automatically removed. For example, if the polygon has a void count greater than a threshold, the polygon may be automatically removed by the system. In some embodiments, other criteria may be analyzed when determining whether to remove a polygon. For example, the larger the polygon is, the greater the chance it is assigned to one or more streets. For example, if the polygon has an overall perimeter greater than 1800 feet, with greater than 10 voids, the polygon may be assumed to be a street polygon. Other perimeters and other void counts are also contemplated. For example, if the area is a rural area, a smaller number of voids may indicate a street polygon (e.g., 5 voids for an 1800 foot perimeter). Other criteria may also be used in determining a void/perimeter ratio that indicates the polygon should be removed. In some embodiments, smaller perimeters with smaller void counts or larger perimeters with larger void counts may be indicative of a street polygon. In some embodiments, the void count and or perimeter may be displayed to a system user who may then decide whether to remove the polygon.

In some embodiments, the script may populate the fields (e.g., which may be associated with attribute data for the parcel data 300) of the feature class 503. In some embodiments, the script may determine if fields 507 of the temporary feature class already exist (e.g., in the previous PGDB 501). If so, the existing fields 507 may be reused. The fields 507 may also be recalculated. For example, a user identifier (CREATE_USER), a creation date (CREATE_DT), a resource identifier (SOURCE), and a status of the data (D_STATUS) fields 507 may be deleted and recalculated. These may be calculated based on the new data. An APN, DUPES, and DUPENUM (DUPES and DUPENUM may be intermediate fields used by a script if the eliminate duplicates graphical checkbox is checked) fields 507 may also be recalculated if they exist for the new data.

In some embodiments, APN, APN2, ADDRESS, PLSSFIRSTDIVISION, PLSSSECONDDIVISION, PLSSTHIRDDIVISION, and OWNER fields (which may be data fields that hold variables from or calculated from acquired data) may be used. Other data fields may also be used. In some embodiments, scripts may return an error if fields with similar or the same names already exist and data within them needs to be verified. These may include the field names used by the parcels feature class from the master database table. In some embodiments, any data that exists in these columns may be transferred to the SDI clone feature class. In some embodiments, a script user may be warned that fields exist and data needs to be verified prior to appending into the SDI clone. If these fields exist in the original acquired data, then the fields may have to be renamed or data within the fields may need to be verified before trimming and appending to the SDI CLONE. For example, if original acquired data contains a field named OWNER and the data does not reflect parcel OWNER information, then this field may need to be renamed so data (which may not be relevant) is not improperly appended to the SDI clone.

In some embodiments, fields 507 may be added and recalculated for the temporary feature class with data to append. For example, an APN may be created. CREATE_USER (e.g., a variable to store an employee RID) may be determined by data entered in a textbox (e.g., a graphical panel presented to the system user). Other fields 507 that may be populated may include a state identifier (STATE_CODE), a county identifier (COUNTY_CODE), an assessor's parcel number (APN), alternate reference id (APN2), a user identifier (CREATE_USER), a creation date (CREATE_DT), a resource identifier (SOURCE), and a status of the data (D_STATUS) fields 507. Additional fields may include a situs address (ADDRESS), a statement of the parcel data's relative spatial accuracy (ACCURACY), the Public Land Survey System (PLSS) designation, (e.g., PLSSFIRSTDIVISION, PLSSECONDDIVISION, PLSSTHIRDDIVISION), and a property owner (OWNER). A load date (CREATE_DT) and the original source of the data (SOURCE) may also be calculated from inputs, for example, provided to a textbox. The status of the parcel data (D_STATUS) may be calculated from external data to reflect data currency (e.g., Current, Archived, etc.). DUPES and DUPENUM may be used in duplicate elimination (and may not be created if the indicator whether to perform eliminate duplicates is false).

In some embodiments, the script may further trim and calculate relevant fields in the temporary feature class. The trimming and calculation may be used to produce data that is both relevant and compatible with corresponding fields in the parcels feature class from the master database table stored on a database 125 (e.g., a LAN database) and accessed through SDI 511. The original APN field 507 may be calculated by creating a row cursor that loops through the features and performs actions on the individual features within the feature class. If the original APN field has data (e.g., is not empty/NULL), the new APN may equal the original APN field (which in some embodiments, may have a maximum of 100 characters). In some embodiments, NULL entries (e.g., empty entries) may be ignored and passed to the SDI clone as NULL. In some embodiments, the trimming and creating cursor action may be repeated on the fields to be appended. Trimming data may include trimming data according to a maximum number of characters allowed by a corresponding field in the SDI clone feature class and coincidentally the parcel feature class from the master database table stored on a database 125 (e.g., a LAN database) and accessed by SDI 511. Trimming may prevent loading failures caused by trying to put data with more than the maximum allowed character length into fields with maximum allowed character settings defined by the parcel feature class from the master database table field parameters. For example if an original acquired APN value has 110 characters and the maximum allowed is 100, then, in some embodiments, only the first 100 characters of the data may be transferred into the corresponding field in the SDI clone feature class.

In some embodiments, if the original APN field has data (not empty), the APN of the new data may be set equal to the original APN. Empty entries may be ignored and passed on to the new PGDB 501 as empty. In some embodiments, fields 507 for these and other variables may be initially created and calculated at a different time in the processing.

In some embodiments, the script may check for duplicate polygons in the temporary feature class. In some embodiments, the DUPES and DUPENUM fields may be created in the temporary feature class. The geometries of the polygons may be compared with a row cursor that loops through the features and may perform actions on the individual features within the feature class As the script row cursor loops through the rows it may read the geometries into a list (e.g., in memory), first checking to see if the geometry already exists in the list. If a geometry does exist already in the list (e.g., as determined by comparing a geometry identifier (such as an APN) and/or coordinates), then the script may apply the same value (ID) in the DUPES field 507. The IDs may be read into a list, and if an ID is already in the list then the ID may be added to the DUPENUM field 507 for that polygon or else DUPENUM=0. This DUPENUM field may be used to apply a series of logical selections to determine which one of the duplicate geometries to keep and which ones can be deleted. In some embodiments, the logical sequence may include selecting features with DUPENUM>0. Within this selection, if the APN is empty or if the APNs are equal, DUPES may be deleted. For example, if we have several equal geometries (duplicate polygons) and they have the same data, the script may keep one of them and delete the rest. However, in some embodiments, if the APNs are not equal, the script may not delete the duplicates and a visual review may be used to determine which duplicate polygons actually have the relevant APN. The other polygons may be deleted. Further, the PGDB 501 may be compacted to delete unnecessary information stored internally by the PGDB file format. Compacting may significantly decrease file size and may be used to ensure that there are no failures due to size limitations.

In some embodiments, the temporary feature class 503 with the new fields added, calculated and trimmed, may be appended into the SDI clone. In some embodiments, appending data processing may use a "NO TEST" rule that uses a parameter defined by a script (e.g., executing in ESRI) to ensure that fields 507 in the temporary processing feature class that match will be transferred to the SDI clone. The other fields 507 that do not have a corresponding match in the SDI clone may remain empty (NULL). In some embodiments, after appending the features to the SDI clone, the temporary feature class may be deleted and the temporary PGDB may be compacted and refreshed to delete unnecessary information and prevent failures due to size limitations. In some embodiments, the SDI clone feature class may be integrated. In some embodiments, the SDI clone feature class may have its geometry repaired with a geometry repairing script. The geometry repairing script may be used in conjunction with the check geometry script. In some embodiments, the script may continue to check geometry and repair geometry until the check geometry function yields 0 features that need repairing (or, for example, a value below a threshold). In some embodiments, the output PGDB may be compacted with the new features appended to the SDI clone to delete unnecessary information and prevent failures due to size limitations. In some embodiments, a compact disc (CD) may be created with the PGDB 501 with the new features appended.

At 613, the formatted parcel data 300 may be loaded into the common format database 125. In some embodiments, after conversion, parcel data 300 from different sources may be loaded into a spatially enabled database 125. In some embodiments, the parcel data file may be "dropped" into the application. For example, an icon 201 representing the parcel data 300 may be moved (e.g., using a mouse pointer) over an icon 203 representing the common format database 125. Other processes for loading the data are also contemplated. For example, the automated loading may be controlled by a script that points to the file (e.g., through a path/filename) to connect the file to an SDI 511. In some embodiments, the filename of the file to be loaded may be entered by a system user into a graphical user interface. The SDI 511 may then append the new information (which may now be in the same format as the format used for the other data already stored in the spatial data files of the database 125) from the file into the spatially enabled database 125. If the load fails, the log file 701 may be accessed to determine the error. The error may be corrected and the load may be attempted again. Other methods of determining the error are also contemplated (e.g., an error message may be displayed to a system user).

In some embodiments, loading/appending the new data may include the original feature class 503 being replaced with the temporary feature class 503 that has multi-part features eliminated. The original feature class 503 from the PGDB 501 may be appended with new fields 507 added, calculated, and trimmed into the PGDB feature class 503 in the other PGDB 501. In some embodiments, the data may be loaded to the SDI 511. Feature classes may be loaded to the SDI 511. In some embodiments, the APN, tax identification (ID) number, situs information, mailing address, state, zip code, owner's name, flood zone, elevation of insurable property, zoning codes, land use codes, property value, square footage, previous owner's name, utilities, and easements may be stored with associated parcel data. Attributes may also include a GEO code with latitude/longitude (e.g., at a centroid of a parcel). Attributes can also be linked to other types of data. For example, the APN may be stored with a parcel description and be used to separately access additional data for the parcel (e.g., from a different database). In some embodiments, data such as the APN may be accessed from third party databases (e.g., as provided by a county).

In some embodiments, for the scripts used in 605-613, if the parcel data fails to pass a stage of the process, the data may be reviewed again (e.g., see 603). If the problem persists, the parcel data acquisition may be reported as incomplete.

In some embodiments, the scripts may be executed in a predetermined manner to increase efficiency and, for example, prevent executing a script multiple times during conversion. For example, the explode script may be executed before the eliminate duplicate geometries script to avoid duplicate geometries that may be created as a result of the explode script. As another example, the eliminate duplicate parcel geometries may be performed prior to the repair geometries script which may be performed prior to the integrate parcel geometries script.

Figure 7A:
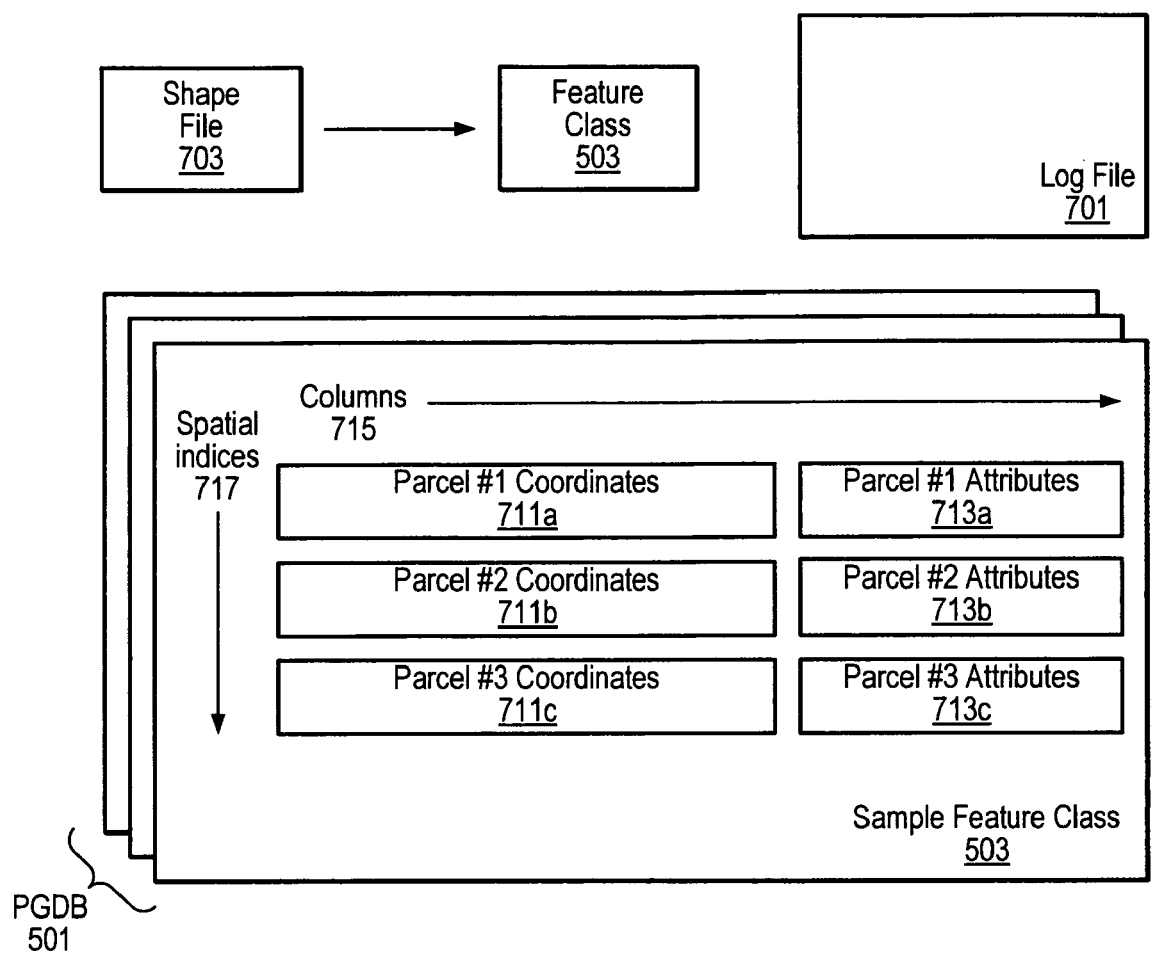
FIGS. 7a-b illustrate parcel data and updated parcel data, according to an embodiment.

In some embodiments, the sequence of the scripts may follow a progression of spatial data organization. For example, as seen in FIG. 7*a*, a feature class 503 may contain features that contain polygons that include geometries (e.g., which may be described in parcel coordinates 711). The polygons may also have associated attributes 713. The logical order for the scripts may start with individual geometries. For example, an initial script may make one or more geometries (e.g., polygons) independent (e.g., the individual geometry (polygon) may now be a separate feature with its own attributes). In some embodiments, this may be done by eliminating multi-part features to give each geometry (e.g., in the database 125) an independent feature with its own attributes. For example, multi-part polygons may be converted into single part polygons. A subsequent script may examine the geometries of these independent features to determine if problems exist. The problems may then be repaired using additional subsequent scripts. It may be more efficient to repair the geometries after multipart geometries have been corrected (e.g., to prevent needing to run the repair script again after the eliminate multipart script if the eliminate multipart script is run after the initial repair script). An integrate script may analyze the feature class to determine if nodes of the feature class are within the cluster tolerance (and then may be removed). In some embodiments, it may be more efficient to execute the integrate script (which looks at the interaction between polygons) after the repair script to avoid needing to run the repair script and then integrate script again if an error is found while executing the initial integrate script. Trimming scripts and data loading scripts may then be used on the integrated data. In some embodiments, it may be more efficient to execute format and/or concatenate relevant/available attribute data after integrate script and/or repair script in case a polygon feature needed to be eliminated or fixed prior to formatting (e.g., to enable the polygon to be fixed prior to being associated with attributes). In some embodiments, columns 715 and spatial indices 717 may also be used to organize the data in the feature class. Spatial indices 717 may be row identifiers or other identifiers (e.g., created by the database software for use by the database software) to organize the parcel data in the feature class 503. In some embodiments, it may be more efficient to append parcel data after extraneous polygons are eliminated.

Figure 6B:
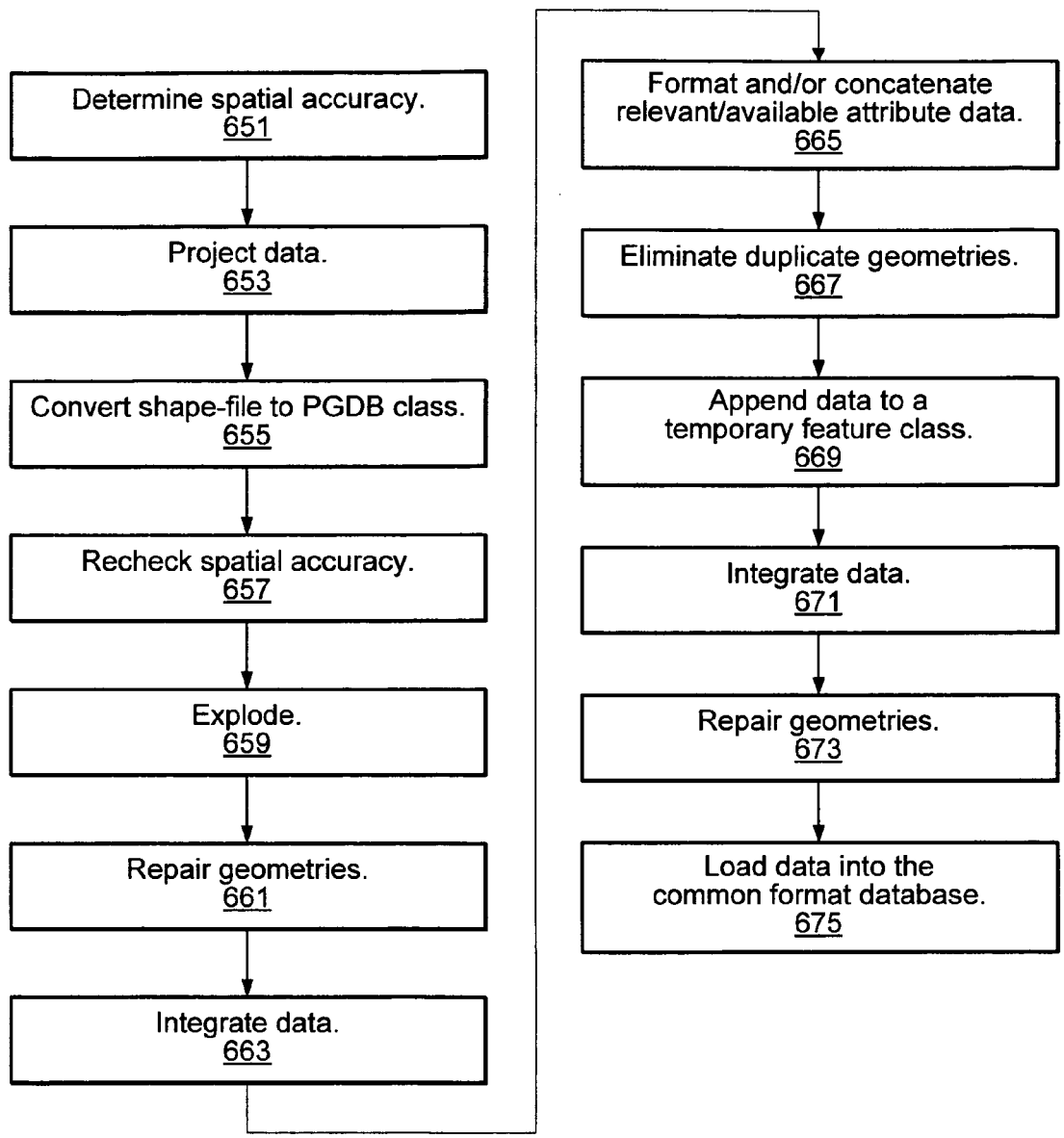
FIG. 6b illustrates a flowchart of a script order, according to an embodiment.

As seen in FIG. 6b, in one embodiment, the ordering of scripts may include scripts executing to:

At 651, determine spatial accuracy,

At 653, project data,

At 655, convert shape-file 703 to PGDB class (if needed),

At 657, recheck spatial accuracy,

At 659, explode,

At 661, repair geometries,

At 663, integrate data,

At 665, format and/or concatenate relevant/available attribute data,

At 667, eliminate duplicate geometries,

At 669, append data to a temporary feature class,

At 671, integrate data,

At 673, repair geometries, and

At 675, load data into the common format database 125 (e.g., a spatially enabled database). In some embodiments, repair geometries may be performed prior to loading the data to prevent failures to load due to invalid geometries. Other scripts and orders for the scripts are also possible. In some embodiments, it should be noted that in various embodiments of the methods described in FIG. 6b, one or more of the elements described may be performed concurrently, in a different order than shown, or may be omitted entirely. Other additional elements may also be performed as desired. Parts or all of the process shown in the flowchart of FIG. 6b may be automated (e.g., performed by a computer system).

In some embodiments, multiple scripts may be performed at approximately the same time. For example, a system executing the scripts may multi-thread the scripts. In some embodiments, the scripts may be recursive scripts. In some embodiments, a script may be used to link multiple scripts in the predetermined manner. For example, one script linking other scripts may automate the scripts used to clean-up parcel data 300.

Figure 7B:
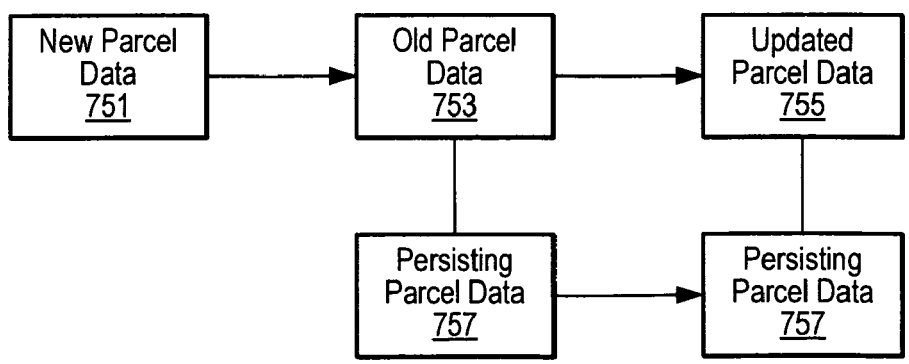

As seen in FIG. 7b, in some embodiments, parcel data 753 may be updated in the database 125 by replacing parcel data 753 in the database 125 with new parcel data 751. In some embodiments, data associated with the parcel data (e.g., persisting parcel data 757) may be retained even when the parcel data 753 is updated. For example, the parcel data for one or more parcels may be subdivided and the subdivided parcels may receive names, indicators, etc. For example, a parcel of a shopping mall may be subdivided into the various store lots included in the shopping mall. These subdivisions may receive names or indicators of the associated stores. As another example, a parcel for a set of condominiums may be subdivided to indicate the location of specific condominiums and an owner name, etc. may be associated with respective subdivided parcels. The subdivisions and names/indicators may persist in the database 125 when the overarching parcel data 753 is updated. In some embodiments, the subdivisions may be adjusted to fit updated parcel data 755. The subdivisions, etc. and the adjustments may be provided manually (e.g., by a system user) and/or automatically by a computer system.

Other data 757 may also be persisted during updates (e.g., parcel names, research points, flood zone change detections (e.g., noted detected differences between a previous flood zone status for a parcel and a current flood zone status), and other data associated with the parcel that may still correspond to the parcel even after an update). As another example, parcel data 753 may be edited (e.g., by a system user or computer system) and the edits may be persisted. For example, a parcel geometry that was removed prior to the update may be removed from the updated parcel data 755. Other edits to persist are also contemplated. In some embodiments, the data to be persisted may be stored in a separate database 125 and/or may be marked or tracked (e.g., through a log file 701) in the parcel database 125. The data to persist may then be preserved when the new parcel data 751 is used to replace the previous parcel data 753.

In some embodiments, a tracking application may be used to track the status of data sources for the parcel data 300. For example, the status may include an availability (e.g., to indicate the data is already in-house (i.e., currently available), the data can be acquired from a source at low cost, the data can be acquired from a source at high cost, and the data is not available). The tracking application may be used to keep track of the changing status of the data sources (e.g., data sources that become newly available). The tracking application can also track the type and quality of the data available and/or being added to the common format database 125 (e.g., whether the data from a particular source will require a lot of work to repair, etc.). Quality may include no correction needed, minor correction needed, moderate corrections needed, and unusable. Other qualities are also contemplated. In some embodiments, the quality may be represented by a quantitative "accuracy" factor (e.g., assigned according to a set of criteria). Type may include raster data or vector data. Other types are also contemplated. Tracking the data sources may also include receiving an indication that a status of the data source has changed (e.g., from available at low cost changed to available at a high cost). Tracking the state of the data may allow the common format database 125 to be updated when needed. For example, if the state of a portion of data indicates the portion is out of date (because of a new data revision), the portion of data may be replaced with the updated portion. In addition, tracking the state of the data may allow an entity to determine where to access data that is not already in the common format database 125. For example, the state may indicate the data is available through company X.

Figure 8:
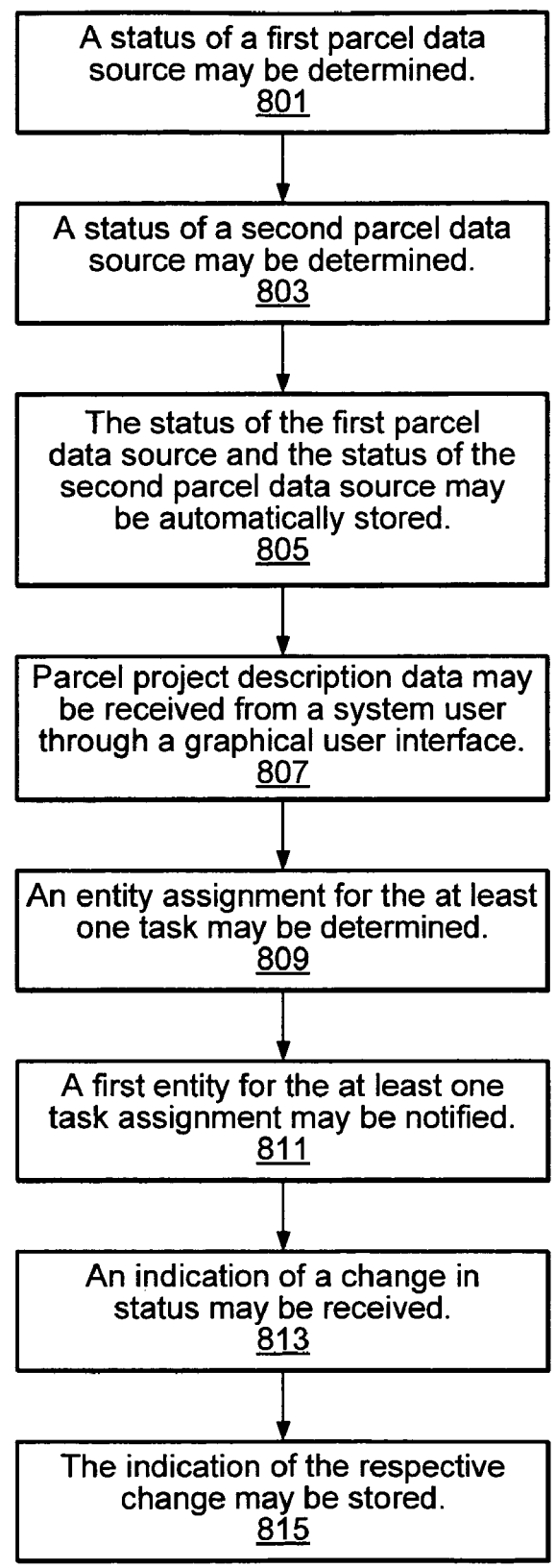
FIG. 8 illustrates a flowchart for a method of tracking the status of the data sources, according to an embodiment.

FIG. 8 illustrates a flowchart for a method of tracking the status of the data sources, according to an embodiment. In some embodiments, it should be noted that in various embodiments of the methods described below, one or more of the elements described may be performed concurrently, in a different order than shown, or may be omitted entirely. Other additional elements may also be performed as desired. Parts or all of the process shown in the flowchart of FIG. 8 may be automated (e.g., performed by a computer system).

At 801, a status of a first parcel data source may be determined. In some embodiments, the status of the first parcel data source may indicate at least an availability of data access (e.g., availability may include currently available, low cost acquisition, high cost acquisition, or not available) from the first parcel data source. In some embodiments, the status of the first parcel data source may indicate a type of data (e.g., raster or vector) of the first parcel data source. The status may also indicate a quality of the data (e.g., no correction needed, minor correction needed, moderate corrections needed, or unusable) from the first parcel data source.

In some embodiments, the status may be received from the first parcel data source (e.g., in data from the first parcel data source), determined from other information associated with data from the first parcel data source (e.g., data included in metadata with the data from the first parcel data source), or entered manually. For example, a graphical user interface may be provided for entry of the status of the first parcel data source (e.g., to be entered by a system user). Other methods of determining the status of the first parcel data source are also contemplated.

At 803, a status of a second parcel data source may be determined.

At 805, the status of the first parcel data source and the status of the second parcel data source may be automatically stored (e.g., in the common format database). For example, the status of the first parcel data source may be stored as a relationship associated with the first parcel data source. Additional relationships may also be determined and/or stored. For example, relationships may include a type of resource associated with the data source, a media type of the data source, or a system user associated with the data source (e.g., assigned to process the data source). In some embodiments, storing the status of the first parcel data source may include storing the status of the first parcel data source in a resource inventory. Storing the status of the first parcel data in the resource inventory may include storing information on a source of the first parcel data and a cost associated with the first parcel data. Other information may also be stored in the resource inventory (e.g., legal restrictions associated with the use of the data, associated website address, property access legal information, and other information on the data source).

At 807, parcel project description data may be received from a system user through a graphical user interface. The parcel project description data may include at least one task. The task may include, for example, acquire the parcel data, update the parcel data, clean-up the parcel data, etc.

At 809, an entity assignment for the at least one task may be determined.

At 811, a first entity for the at least one task assignment may be notified (e.g., through an electronic mail message). Other notifications are also contemplated.

At 813, an indication of a change in status of the first parcel data source or a change in status of the second parcel data source may be received (e.g., through a data transmission or from a system user). For example, the change in status may include a change in availability, quality, or type.

At 815, the indication of the respective change may be stored (e.g., in the resource inventory).

In some embodiments, the tracking application may track the legal aspects surrounding data in the common format database 125 and from external sources. For example, the tracking application may track whether data is copyrighted, protected under a non-disclosure agreement, or free for general use. The tracking application may track which portions of data can be made available to the public and which portions are protected. For example, a general plat map of a parcel may be available to the public but a flood risk assessment may be protected. In some embodiments, the common format database 125 may be made available over the Internet (e.g., unrestricted portions may be made available). In some embodiments, a web interface may be provided to allow different entities to access the data (e.g., on a subscription basis). In some embodiments, the database 125 may be stored on a storage medium (e.g., a Compact Disc) and the storage medium may be offered for sale or lease.

In some embodiments, a tracking application may be used to track which system users are assigned to specific tasks. For example, the tracking application may be used to assign a data conversion/loading processing task to a system user, view the current assignments, change/edit assignments, etc. Data conversion/loading processing tasks may include, for example, order data from a source, review data, prepare data, put data in a Geographic Information System (GIS), etc. Other types of projects and tasks are also contemplated. For example, projects may include a flood risk assessment. The tracking application may receive parcel project description data (e.g., including at least one task to perform on the data) from a system user through a graphical user interface, determine an entity assignment for the at least one task, and notify a first entity (e.g., a system user) of the task assignment. In some embodiments, the tracking application may include one or more cooperating applications. For example, one application may track data acquisition (including nationwide contacts for the data, GIS processing, etc.) and one application may manage the workflow for the data acquisition (e.g., assigning tasks to specific system users). In some embodiments, tracking data acquisition and managing the workflow may be performed by the same application.

In some embodiments, tracking data (e.g., including information on the source, availability, contact list, legal aspects, workflow characteristics, etc.) may be stored as metadata associated with the data. For example, a series of numbers may be used in the metadata to represent different characteristics associated with the data. Other information may also be stored in the metadata (e.g., information on how to manage data from sources smaller than a county, etc.).

Figure 9A:
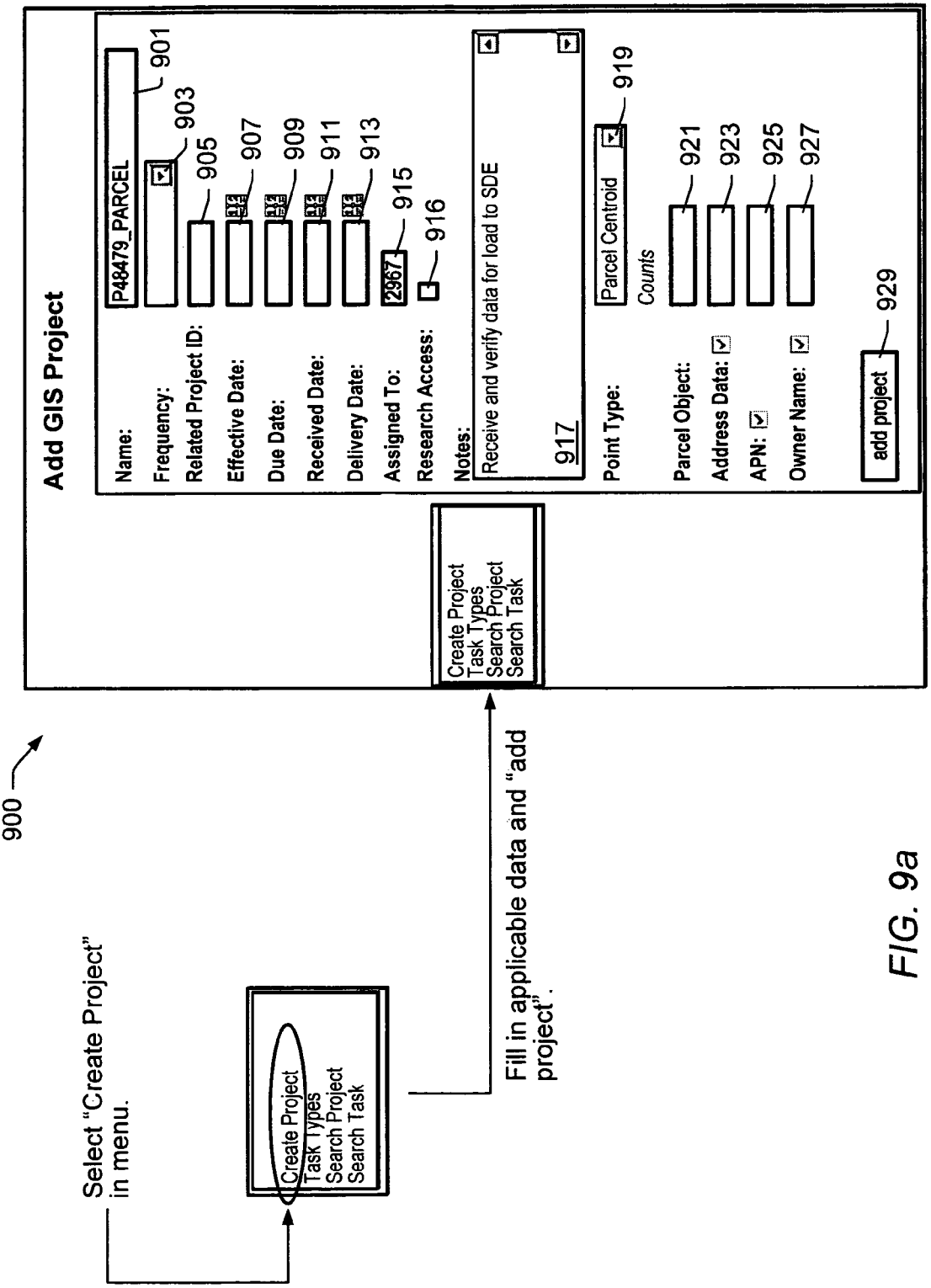
FIG. 9a illustrates a panel for creating a project to be assigned, according to an embodiment.

FIG. 9a illustrates a panel 900 for creating a project to be assigned, according to an embodiment. In some embodiments, the project may be created and managed by a tracking application. Information about the project may be entered into the tracking application. For example, project name 901, frequency of the project 903, related project identification (ID) 905, effective date 907, due date 909, received date 911, delivery date 913, assigned to entity 915 (e.g., an employee number of the employee assigned to the project), research access identifier 916, notes 917, point type 919, parcel object count 921 (e.g., a number of objects associated with a particular data set), address data count 923, APN count 925, owner name count 927, and indicators for address data, APN, and owner name (e.g., which may indicate whether the information is available). For example, for a county parcel layer, each parcel polygon within the county may include an object. The APN count 925 may include a number of the objects that have an assigned APN. The address data count may include a number of objects with addresses assigned. Owner name count 927 may include a number of objects with owner names assigned. In some embodiments, the due date 909 may include a date the task is due, effective date 907 may include a date assigned to the data, received date 911 may include a date the data was received (e.g., into the system), and delivery date 913 may include a date the task was completed. Other date are also contemplated.

An icon 929 on the screen may be clicked to add the project once the data (or part of the data) is entered. Frequency of the project 903 may be, for example, how often data from a particular resource is updated. The research access identifier may indicate whether the data was created by research or from an external source.

FIG. 9b illustrates a panel 951 for adding tasks to the project, according to an embodiment. A drop down menu 953 may be accessed to indicate project options. For example, "Add Task" may be selected to bring up a data entry panel for adding date respective to a task to be added to the project. Other selection tools may also be used to indicate project options (e.g., clicking on an icon). Data fields may be populated by a system user to indicate information about the task to be added. In some embodiments, some of the data fields may be pre-populated with data entered for the project (see FIG. 9a). Information about a task to be added may also be provided (e.g., by entering a task identifier into a data entry panel) in a panel (e.g., similar to the panel in FIG. 11). Other information may also be entered about the tasks (e.g., a deadline, task type, etc.).

FIG. 9c illustrates a panel 970 for viewing tasks of the project, according to an embodiment. For example, "View tasks" may be selected from the drop down menu 971.

Figure 10:
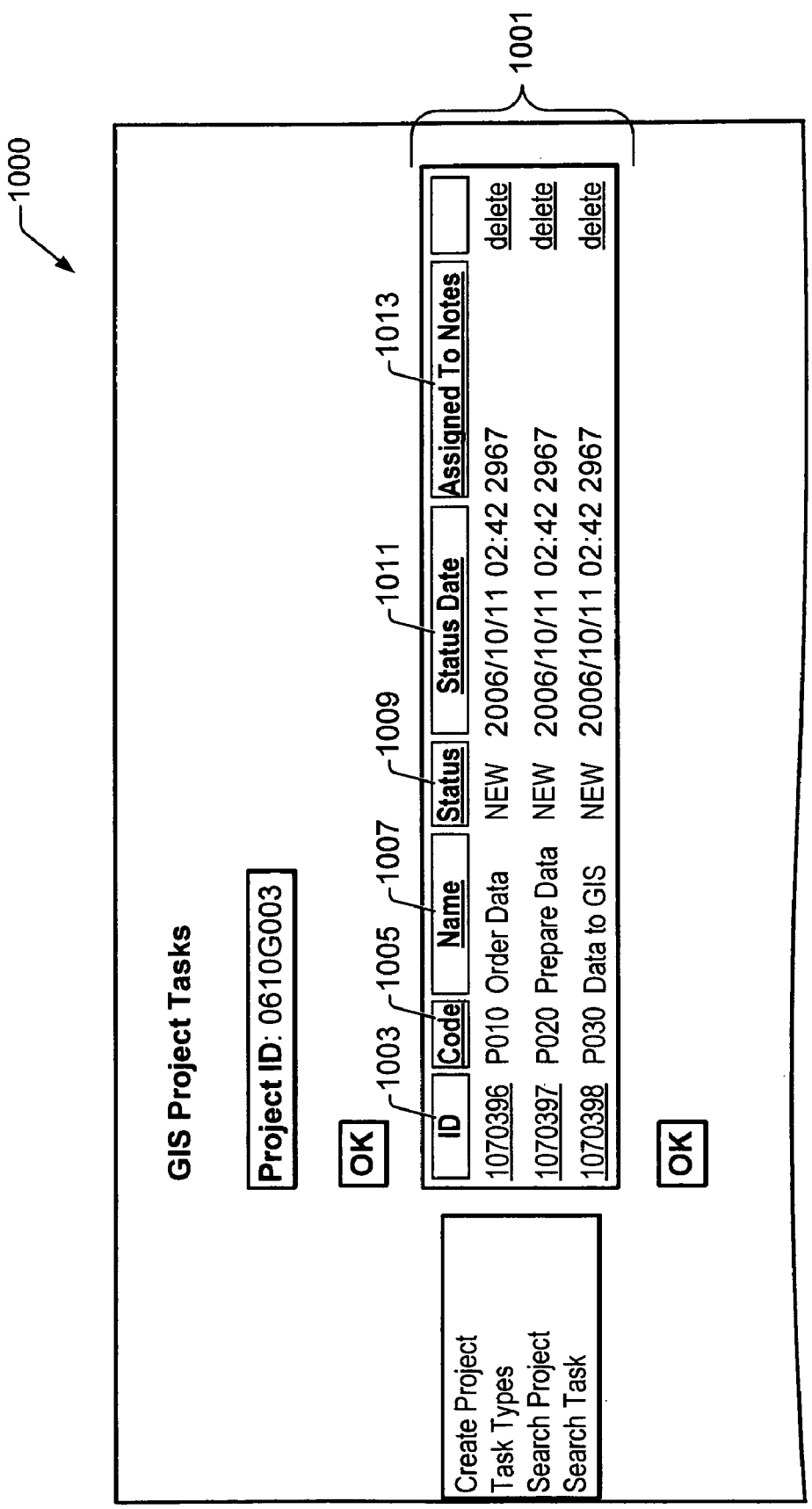
FIG. 10 illustrates a resulting panel listing tasks of the project, according to an embodiment.

FIG. 10 illustrates a resulting panel 1000 listing tasks 1001 of the project, according to an embodiment. For example, three tasks are listed with task identifiers 1003 (e.g., "1070396"). The task information may also include a task code 1005, task name 1007, task status 1009, status date 1011, and assigned to notes 1013.

FIGS. 11 and 12 illustrate panels for editing details for a task, according to an embodiment. The status of the tasks 1101 may also be updated using the data entry screen shown in FIG. 11. For example, a drop down menu 1103 may, for example, be used to select "In Progress" or "New". In some embodiments, a system user may open tasks at drop down menu 1103 to change status and add notes as the project progresses. The Task status data entry panel 1100 may be provided by the tracking application after, for example, double clicking the task name in the "View tasks" data entry panel 1000. Other information may also be edited. For example, the task type 1105, the assigned to entity information 1107, notes 1111, special instructions 1109, etc. Changing the assigned to entity information 1107 may result in an electronic mail message 151 being sent to the new entity responsible for the task as well as an electronic mail message 151 to the previous entity assigned to the task. In some embodiments, the entity may be an employee or may be a computer system.

FIG. 13 illustrates a panel 1300 for adding a resource (e.g., a possible source of parcel data), according to an embodiment. In some embodiments, information may be maintained about acquired data. For example, the source of the data, the cost of the data, the state of the data, restrictions on data usage, etc. The panel may show several dropdown menus (e.g., for application view 1301, extent type 1303, and media format 1305) (other selection mechanisms are also contemplated). In some embodiments, a parcel inventory application and a resource inventory application may both access the same data tables in the database 125. For example, application view may be used to indicate which application (parcel inventory, resource inventory 513, or both) should have access to and display the associated data when searched (e.g., see FIGS. 20-24). In some embodiments, parcel inventory and resource inventory 513 may be separate databases and application view may be used to indicate which database 125 should receive the parcel data 300.

In some embodiments, parcel data 300 that exists, but has not yet been acquired (e.g., through purchase or lease) or parcel data 300 that has been obtained but has not yet been loaded into the common format database 125, may be viewable in a parcel inventory through a parcel inventory application (i.e., "Parcel" 1301) (e.g., see the parcel inventory search and results panel in FIGS. 20-21). Once parcel data 300 is loaded, it may remain in the parcel inventory ("Parcel") and be may also be viewable in the resource inventory 513 (i.e., "Research" 1301) (e.g., see the resource inventory search and results panel in FIGS. 23-24). Some parcel data 300 may exist but not have a relationship to the parcel inventory. This data may be viewable in the resource inventory 513. For example, data viewable in the parcel inventory may include parcel data 300 that can be purchased or leased. Items viewable in resource inventory 513 may include website addresses for parcel viewing (which may not allow downloads), property access legal information, and contact info for counties or communities. Other data is also contemplated. The resource inventory 513 may include data useful for performing flood zone determinations. In some embodiments, the parcel inventory may combined with the resource inventory.

In some embodiments, a Uniform Resource Locator (URL) field 1307 and company label field 1309 (e.g., URLs or company sources of data) may be provided for respective information. There may also be a list of resource or data types. For example, parcel 1311, legal 1313, aerial 1315 (e.g., aerial maps), street 1317 (e.g., street maps), and contact 1319 may be used to indicate the type of data entered into the panel. The data may be entered manually or may be captured from the data or data source (e.g., read from an incoming file to be appended to a common format database 125). An "Add Resource" icon 1321 may be selected to submit the entered information.

FIGS. 14-15 illustrate panels (e.g., empty panel 1400 and partially populated panel 1500) for editing the resource, according to an embodiment. Information may be added and edited for a resource. For example, view type 1401, extent type 1403, media format 1405, whether concealed 1409, data types (such as parcel 1419, legal 1411, aerial 1413, street 1415, contact 1417), URL 1421 (Uniform Resource Locator), URL secure 1423, leased 1425, concealed 1409, subscription costs 1427, frequency 1429, received date 1431, company/office/department label 1432, phone numbers 1433 and 1435, fax number 1437, email 1439, address lines 1441 and 1443, city 1445, state 1447, zip code 1449, supply information 1451, provided information 1453, availability information 1455, created date 1461, created by field 1463, edit date 1465, edit by field 1467 and comments 1457. In some embodiments, this screen may appear after the add a resource screen (shown in FIG. 13). In some embodiments, the whether concealed box 1409 may be checked (or otherwise receive an indication) to prevent the resource from being displayed in certain applications (e.g., the resource inventory 513 and parcel inventory). The data may then be concealed from general view but made available if needed. This option may be used, for example, if a resource becomes outdated, has a problem, or is incorrect.

In some embodiments, hyperlinks 1407 (e.g., "Rel #: 0") may be included to add detail on other screens. For example, data for particular county data sets may be captured on other screens by clicking the hyperlink to display the other screens. Data for a resource may be entered manually or captured from the data or data source (e.g., from a file with the resource). A save resource icon 1459 may be clicked to save the updated information.

FIGS. 16a-b illustrates panels 1601 and 1603 for county resource relationships, according to an embodiment. Relationships may include resources, processing system users, and/or other information linked to parcel data. For example, a relationship may be defined in the system for parcel data to show information on the source of the parcel data. A relationship may also be set up for the parcel data to show information on an employee or other entity assigned to process the parcel data.

In some embodiments, county relationships may be entered into the system through county resource relationship data entry panels 1601 and 1603. Relationships may also exist at other levels (e.g., community, city, state, national, etc.). Relationships may also be assigned to resources. In some embodiments, resources may have more than one relationship. Resources may include information on sources of parcel data 300, legal data, aerial data, street data and vendor contact data. Other resources are also contemplated. As an example, vendor contact data may be entered as a resource and the counties (data sets) for which the vendor has data may be entered as relationships to that resource. In some embodiments, common attributes for the data sets (e.g., relating to contact information for the vendor who provided the data sets) may be assigned to these data sets. In some embodiments, the resource and relationship data may be maintained as two separate tables in the common format database 125. In some embodiments, the resource and relationship data may be maintained in the common format database 125.

In some embodiments, the county relationships may be entered after the resource is edited (e.g., as seen in FIGS. 14-15). The panels 1601 and 1603 may include resource ID 1605, media format 1607, extent type 1609, relationship number 1611, state 1615, county 1617, and information about the data from that county 1619 (e.g., data already in the common format database 125). Relationship number 1611 may represent the number of relationships associated with a particular resource (e.g., with "Resource ID: 16419" 1605).

In some embodiments, the state 1615 may be entered first and then a county dropdown menu 1617 may be provided for the system user to select a county. Other dropdown menus or graphical inputs are also possible. For example, if the Extent Type 1303 (shown as extent type 1609) is selected as "Community", the dropdown menu 1617 may provide FEMA community names for selection. In some embodiment, selection of a FEMA community may result in storing the associated FEMA number to the FEMA community in the common format database 125.

In some embodiments, existing relationships may be listed at the bottom of the data entry panels 1601 and 1603. As seen in FIG. 16b, once the county is selected, a hyperlink "Add Relationship" 1621 may appear to link to the next screen.

FIGS. 17-18 illustrate panels 1700 and 1800 for adding a county relationship, according to an embodiment. In some embodiments, information about a county relationship may be added. Pre-populated information may include resource ID 1701, FIPS (Federal Information Processing Standard) code 1703, media/format 1705, and extent 1707. Other information may also be pre-populated. Information may also be editable. For example, priority indicator 1709, access type 1711 (e.g., indication of one or more databases (such as research or parcel) to provide access of the parcel data to), search by field 1713, year 1715, research notes 1717, data availability status 1719, GIS project ID 1721, purchase cost 1723, lease cost 1725, setup cost 1727, and update cost 1729. Restrictions may also be included. For example, indicator boxes for can modify 1731, known agreement 1733, and can resale 1735 may be used. Additional information may include has address 1737, has owner name 1739, held from research 1741. Notes 1742 may also be added. A "Submit" icon 1743 may be selected when the system user is finished entering known information into the fields. For example, panel 1800 shows some of the fields have been populated. A "Cancel" icon 1745 may also be used to cancel the panel 1700/1800. The data may be entered manually or captured from the data or data source. The entered data may be linked to a resource (e.g., a resource with information entered in the panel of FIG. 13).

FIG. 19 illustrates a panel 1900 for listing a county resource relationship, according to an embodiment. The panel from FIG. 16b is shown with the added relationship 1901. The information may be edited or removed by clicking the respective indicator. Additional counties and associated information may also be added (and may correspondingly be displayed on the listing).

FIGS. 20a-b illustrate panels 2000 and 2002 for parcel inventory searches, according to an embodiment. Data may be entered (or otherwise indicated) in a parcel inventory search panel 2000. For example, state 2001, county 2003, media format 2009, and data status 2011 may be entered to search a common format database 125 for the respective information. In some embodiments, a county 2003 dropdown menu may be populated when the state 2001 is selected (e.g., on the state 2001 dropdown menu). In some embodiments, the search may be focused on data status such as not available, available, pending load to GIS (e.g., for processing), or loaded to GIS. "Address" 2005 and "Owner" 2007 boxes may be provided to limit the search to records that have an address or owner's name. Other types of data entry are also possible (e.g., entry fields, icons, etc.). A "Submit" 2013 icon may be used to submit the data when the fields have been populated. A "Reset" 2015 icon may be selected to reset the fields (e.g., blank the fields).

FIG. 21 illustrates a panel 2100 for parcel inventory search results, according to an embodiment. Inventory results may be returned after searching the entered criteria. For example, parcel data 2101 for a county in a state may have been located.

FIG. 22 illustrates a panel 2200 of parcel resource detail, according to an embodiment. Information about a parcel resource may be displayed. For example, the search result from FIG. 21 may be selected by clicking the respective ID number 2103 (which may be a hyperlink to the relevant data shown in panel 2200). The data for the parcel data may be displayed. The displayed data may have been entered through the data entry panels shown, for example, in FIGS. 13-18.

FIG. 23 illustrates a resource inventory search panel 2300, according to an embodiment. In some embodiments, data may be entered (or otherwise indicated) in the resource inventory search panel 2300. For example, state 2301, county 2303, keyword 2321, nationwide data search indicator 2305, contact data search 2307, and off site data search 2309. A search icon 2323 for searching may also be provided to indicate a search based on the entered criteria. A load resources icon 2311 may also be provided to load resources for searching. An information bar 2313 may be provided with codes used in the search results. Box 2315 may indicate no results have been found (this may be the default when search criteria is first entered).

FIG. 24 illustrates a resource inventory results panel 2400, according to an embodiment. In some embodiments, research results 2315 may include results from a search based on information entered in the top search fields (e.g., 2301, 2321, 2303, 2417 ("Community" field), 2305, 2307, and 2309). The results may include a type of resource (e.g., parcel, legal, aerial, street, free site, and contact), media type, coverage indicator, panel links, company name, year, search by criteria, notes, and ID. Other results may also be provided.

FIGS. 25a-b illustrate a workflow interface 2501a,b for management of parcel data 300, according to an embodiment. For example, the workflow interface 2501a,b may be used to manage raw parcel data 300 in the system. The workflow interface 2501 may track a status of datasets received (e.g., a dataset may include a collection of parcel data 300 from counties, communities, and vendors) as the datasets are processed through data collection and processing. For example, the workflow interface 2501 may be used to provide information on the datasets prior to being received into the system until the processed data is loaded into the spatially enabled database 125. In some embodiments, the column headers (e.g., column headers 2503a,b, etc.) on the SDI Status Monitor interface 2501 may represent a status (e.g., unknown, unavailable, available, ordered, received, validated, in progress, staged, loaded, etc.) that a relationship (for the parcel data 300) can be assigned (e.g., by the system or by a system user interfacing with the system). In some embodiments, the data may be viewed by selecting an extent type (e.g., state, county, city, community, etc.) from a drop down menu 2505. Other selection mechanisms are also contemplated. In some embodiments, the workflow interface 2501 may provide information on how many datasets of certain types are assigned to an employee 2507 (or other individual/entity). For example, "Employee 9" (which may be replaced by an actual name) may be assigned 1 received dataset and 2 in progress datasets. In some embodiments, clicking on the actual number under the column header 2503 may provide information on the datasets included in the number (e.g., see FIG. 29). In some embodiments, the system user assigned to process the dataset may be stored in the system as a relationship (e.g., an employee identifier may be stored as a relationship associated with the dataset).

FIG. 25b illustrates a community portion (see drop down menu 2505) of a workflow interface 2501b. In some embodiments, data may be managed on a county level, community level, etc. within the spatially enabled database 125 (other levels are also contemplated). For example, parcel data 300 may be received from smaller "communities" within a county. Therefore, a larger "county" dataset may include numerous smaller datasets. The smaller communities may be assigned independent relationships and managed and tracked by the workflow interface 2501 as separate units within the county. Similarly, data may be tracked as separate county units within a state or residential units within a block. Other units of management are also contemplated. In some embodiments, the parcel data 300 for the smaller communities may thus be assigned relationships associated with the smaller communities.

FIG. 26 illustrates a resource summary interface 2601, according to an embodiment. In some embodiments, the resource summary interface 2601 may provide information (e.g., from information stored on a database 125) about the source of data for a dataset. For example, the resource summary interface 2601 may include a provider information section 2603 with contact information for ordering and/or updating a data set (e.g., company 2605) and an identity of a source of additional information about these datasets (e.g., the contact name 2607 of a person/entity who can be contacted for additional information). In some embodiments, multiple relationships (e.g., dataset sources, update sources, etc.) may be assigned to a resource. The relationships may include information on the actual dataset received (or, for example, a dataset that is available) from a source (e.g., the county). In some embodiments, information may be stored and/or provided for resources that tracks changes made to the resource, when the changes were made, and by what system user. Other information may also be stored/provided for a resource. Resources may be given a unique resource identifier (e.g., "Rsrc ID: 16634") as shown in FIG. 26. Other resource identifiers and resource identifier formats are also contemplated. In some embodiments, information may be maintained about creation and edit dates/entities for the dataset and/or resource (e.g., created date/time 2609 and creation entity 2611 (e.g., an employee number)).

In some embodiments, other actions for the resource summary interface 2601 may be selected from a drop down menu 2613 (or other selection mechanism). For example, a system user may choose to view other information about the dataset, to modify information about the dataset, and/or to modify the dataset. Other actions are also contemplated. Hyperlinks (e.g., resource results 2615 and search again 2617) may also be provided to link to other information and/or actions for the dataset (e.g., to search for another dataset).

FIG. 27 illustrates a resource relationship summary 2701 for a county, according to an embodiment. The resource relationship summary 2701 may provide a summary for relationships that exist for a county (e.g., "AnyCounty" (which may be a county in the United States or other part of the world)) or other geographical descriptor (e.g., community, city, state, etc.). In some embodiments, the resource identifiers (e.g., resource identifier 2703) may be provided. For example, in the embodiment illustrated in FIG. 27, two of the relationships for the county belong to "Resource 16634", which may be, for example, the County Assessor's Office (as seen in FIG. 26). Also, as seen in this embodiment, another relationship for the county may include a third company that is also a source of parcel data 300 for this county. Other information may also be provided (e.g., relationship identifier 2705, state 2707, FIPS 2709, coverage 2711 (e.g., county name), company 2713 (or other source), status 2715, owner 2717, media 2719 (e.g., file type), extent 2721, WF 2723 (Workflow priority), Hsng# 2725 (Housing units for the county as reported by the US Census), Vol# 2727, Man# 2729, year 2731, and location 2733). In some embodiments, Vol# and Man# may include numbers that are generated to represent the total order volume (e.g., flood risk assessment orders for a company processing the parcel data 300) and manual volume experienced in these counties in the past 365 days. Other units (e.g., city, state, etc.) and other time periods (e.g., month, week, etc.) are also contemplated. Vol# and Man# may be calculated continuously by the system to remain current.

In some embodiments, the status field 2715 may indicate which data set is active within a workflow (e.g., with an identifier of "Loaded"). A status identifier of "Obsolete" may indicate datasets that are no longer in the workflow and either represent an "old" dataset, or a dataset that was never acquired due to cost, legal restriction, or other variables evaluated by management. Other status identifiers are also contemplated.

The resource relationship summary 2701 may enable a system user (e.g., management) to track received datasets and sources of data update (e.g., for a particular county). In some embodiments, parcels (e.g., processed through GIS scripting) from these datasets may include a link to the parcel's respective relationship identifier 2703. The link for each parcel may thus provide information on the source for the parcel (e.g., the dataset the parcel was derived from and/or the source of the dataset).

FIG. 28 illustrates an edit relationship summary interface 2801 for a resource (e.g., for a relationship assigned to the resource 16634), according to an embodiment. In some embodiments, information about a particular dataset may be stored as a relationship with the dataset. In some embodiments, the information for these datasets may include status 2805, cost to acquire 2807, vintage date 2809 (or current as of date), and legal notes 2811, combined with other legal information field. Status 2805 may include a dropdown menu that reflects the various column headers on the SDI Status Monitor 2501 (e.g., FIGS. 25*a-b*). Other selection mechanisms are also contemplated. In some embodiments, credit statement 2899 may be used to include a citation for the source of the data (e.g., if a citation is required by the county). The credit statement 2899 may be included within metadata that follows the relevant dataset. As seen in the interface 2801, other information may be edited and/or derived from the dataset or source of data for the dataset. For example, main information 2813 may include relationship identifier, county, price (e.g., purchase price, leased price, setup price, update price), date (e.g., available date, ordered date, received date, loaded date), frequency (e.g., frequency of updates), vintage date 2809 (e.g., the date associated with the dataset), amount paid, WF priority, status, and employee identifier. Parcel information 2815 may include availability indicators (e.g., address, owner name, APN, etc.), presence of an easement, housing unit, order volume, manual volume, data projection, and notes. GIS information 2817 may include object number, APN number, address number, owner number, and notes. Research information 2819 may include URL extension, location, priority, search by terms, and notes. Legal information 2821 may include indicators for has agreement, can modify, can resale, can use, review, verbal confirmation, and notes and credit statement 2899. Other information may also be included. For example, other information 2823 may include created date, edit date, created by identifier, and edited by identifier.

FIG. 29 illustrates a resource relationship summary 2901 for an individual (e.g., an employee), according to an embodiment. In some embodiments, the summary 2901 may be displayed, for example, by clicking a linked number on the SDI Status Monitor 2501 (FIGS. 25*a-b*). Clicking (or in some other way accessing the number) may result in a display of the relationships for a particular status that are assigned to an individual. These items may be sorted by any of the column headers listed above. A sorting mechanism for the relationships may include increasing Workflow Priority and decreasing housing number (e.g., housing units for the county as reported by the US Census). Other sorting mechanisms are also contemplated. The resource relationship summary 2901 for the individual may include resource identifier, relationship identifier, state, FIPS, coverage, company, status, owner, media, extent, workflow priority, housing number, volume number, and manual volume. Other information may also be included. In some embodiments, the relationships may represent an item within a workflow for the parcel data 300 from the creation of the parcel data 300. The project status of the parcel data integration may be determined by the status of the relationship. In some embodiments, available relationships may be evaluated by a system user to determine what parcel data 300 should be acquired and when. In some embodiments, evaluating the relationships to determine what parcel data 300 should be acquired and when may be automated.

FIG. 30 illustrates a resource inventory search interface 3001, according to an embodiment. In some embodiments, a search category may be included for the resource inventory 513. While the "Parcel Inventory" may be used to document and track Vector (GIS) parcel resources, the parcel inventory may be a component of a larger Resource inventory 513. In some embodiments, the parcel inventory and the resource inventory 513 may be one inventory. The search interface 3001 may include several options. For example, a system user may enter the resource identifier or relationship identifier if known. In some embodiments, a dropdown menu 3003 for media type may be used to differentiate Vector from other types of resources. Dropdown menu 3003 may be used to search for a particular media type of resource. An extent dropdown menu 3005 may include county or community (or another extent identifier). State drop down menu 3007 may include options for the state. In some embodiments, check boxes 3009*a-e* may be used to search Vector parcel data (among other types of parcel data 300). Location drop down menu 3011 may include a physical location of a hardcopy resource (or, for example, the location of a stored copy of the resource). URL 3013 and Company 3015 search fields may be used to search URLs and companies associated with the datasets. The status drop down menu 3017 may allow searches for resources with a specified status.

Figure 31:
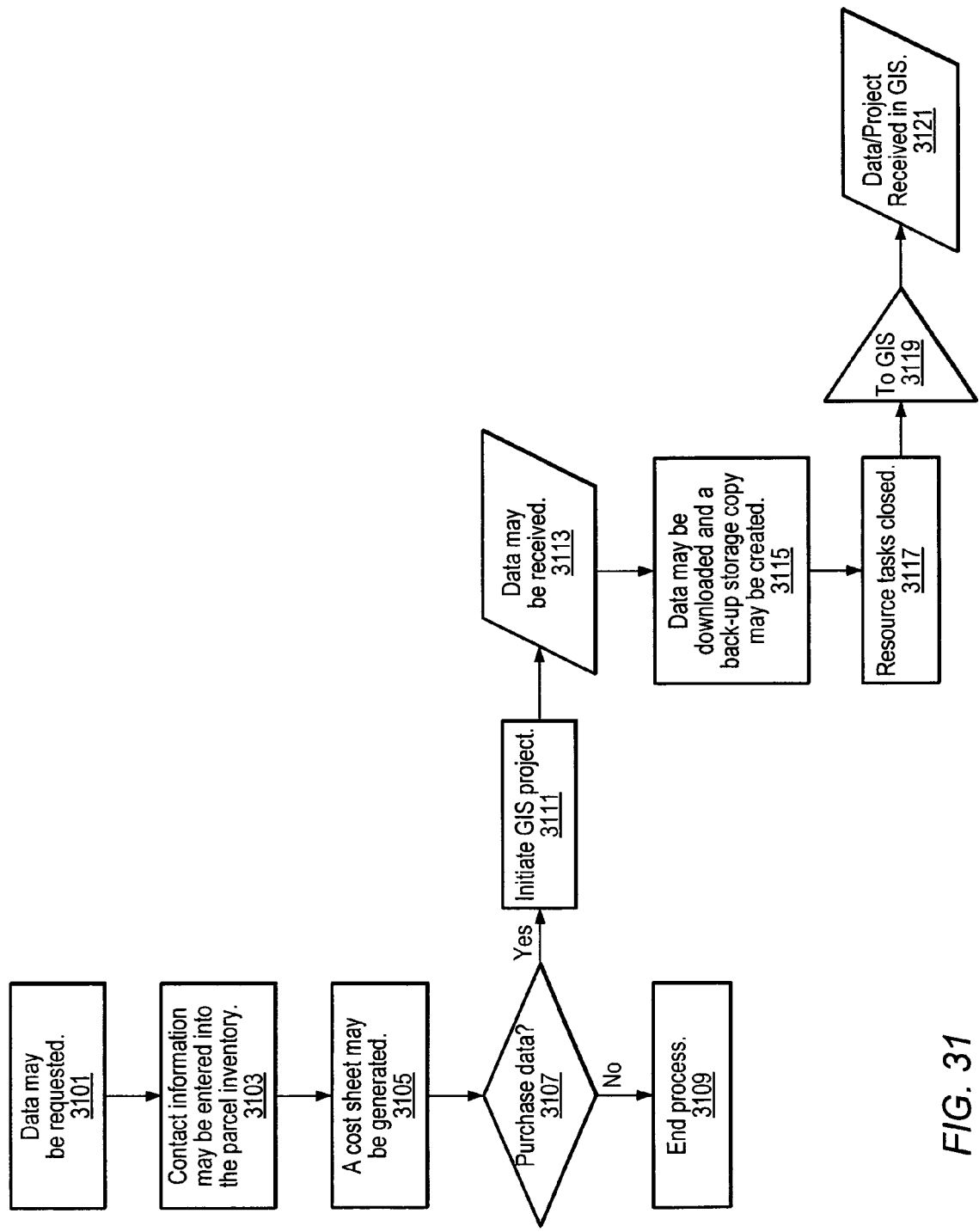
FIG. 31 illustrates a flowchart for purchasing and incorporating data, according to an embodiment.
Figure 32A:
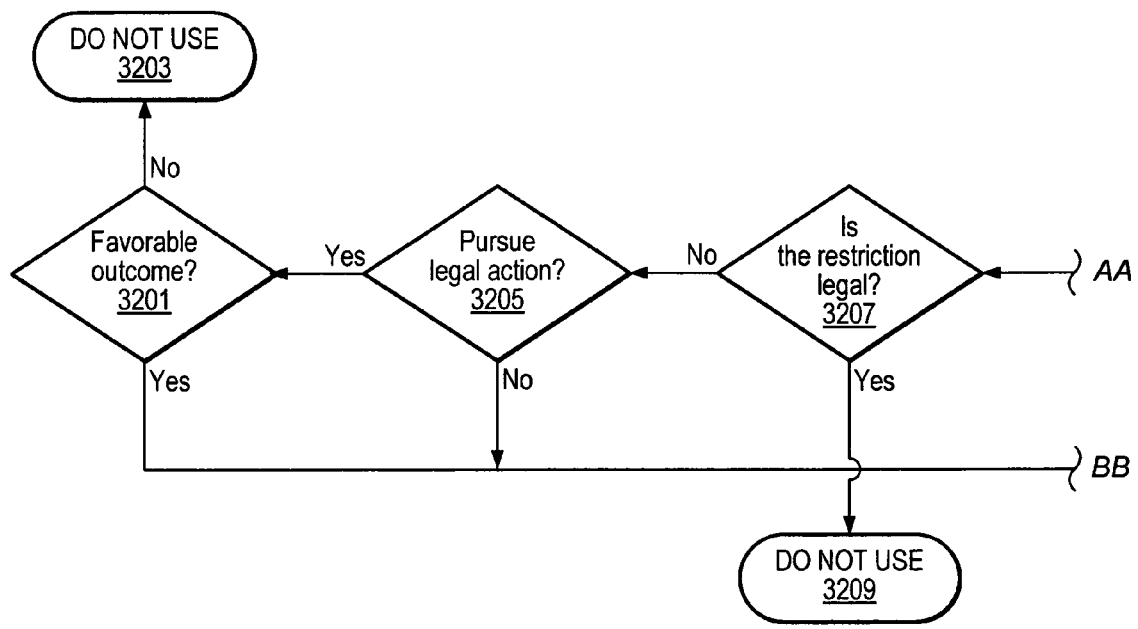
FIGS. 32a-d illustrate a flowchart for assessing a legal status of acquired data, according to an embodiment.
Figure 32B:
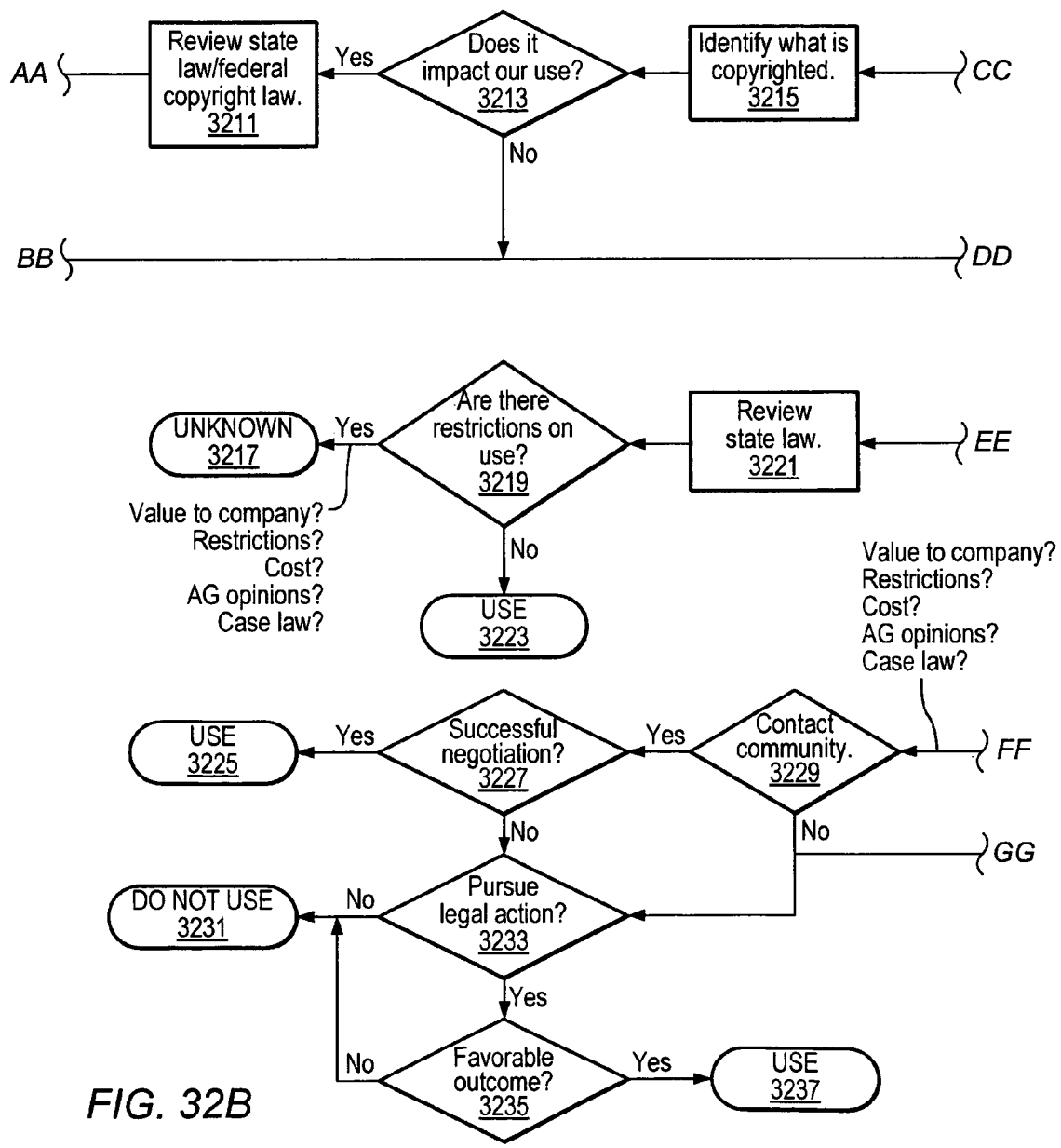
Figure 32C:
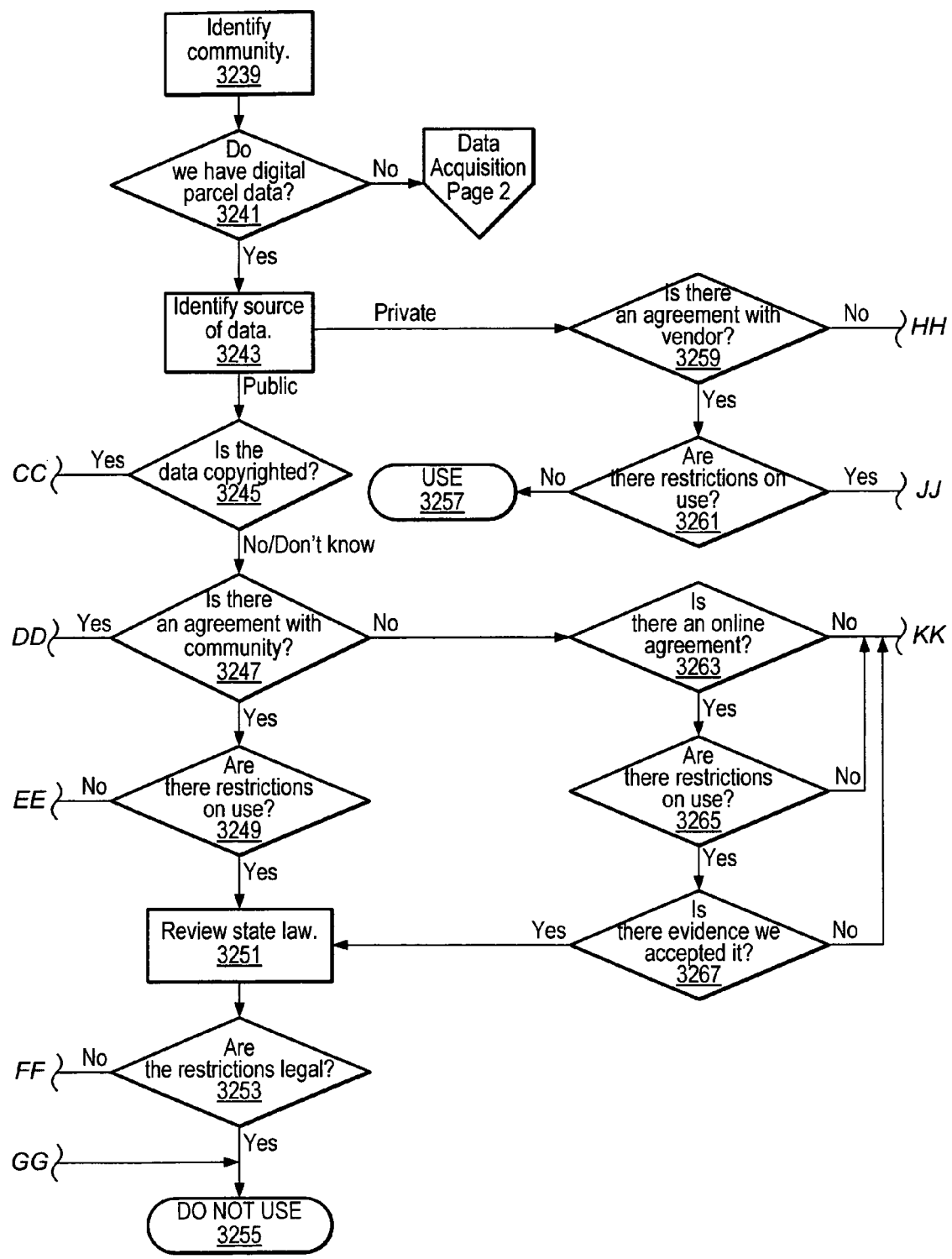
Figure 32D:
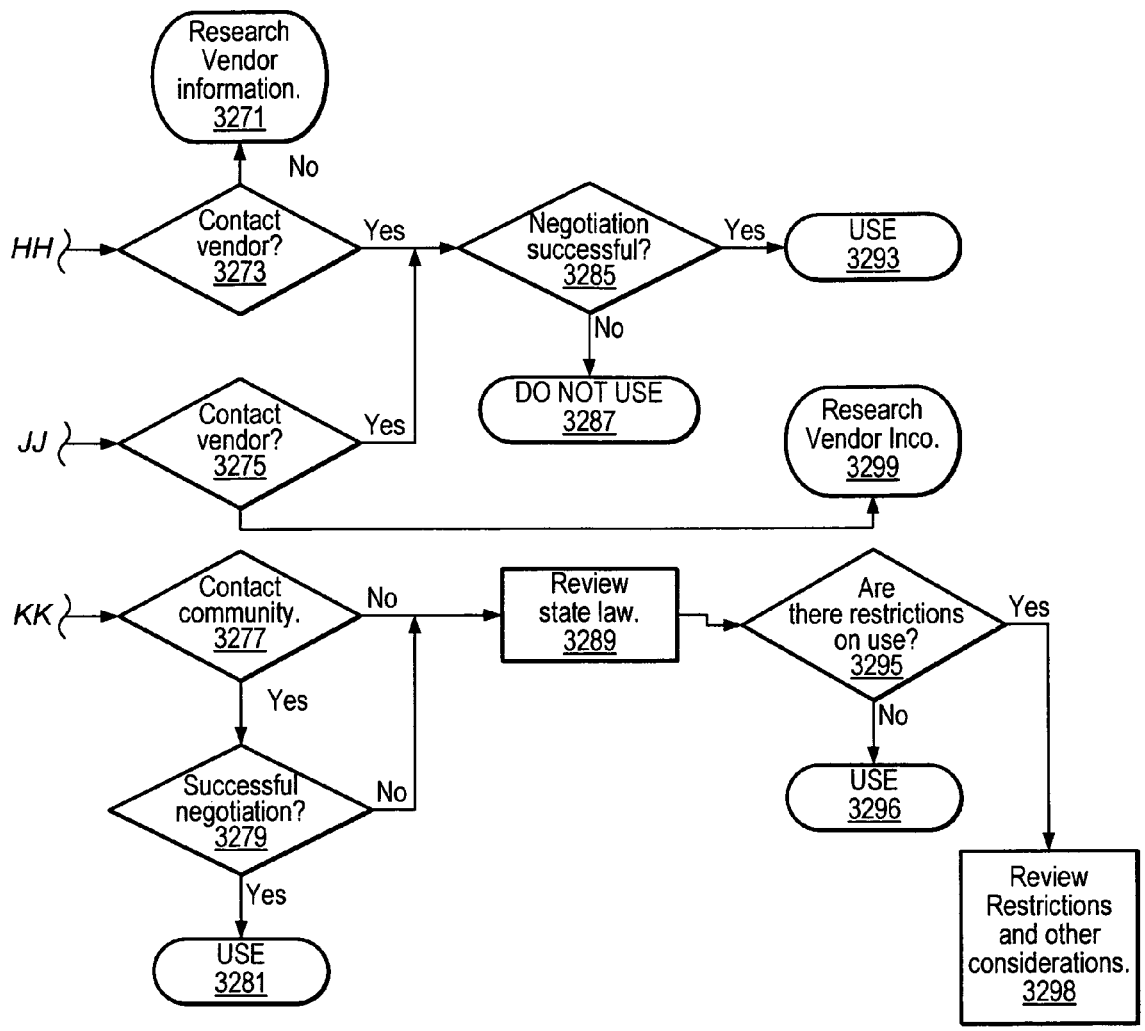

FIG. 31 illustrates a flowchart for purchasing and incorporating data, according to an embodiment. In some embodiments, it should be noted that in various embodiments of the methods described below, one or more of the elements described may be performed concurrently, in a different order than shown, or may be omitted entirely. Other additional elements may also be performed as desired. Parts or all of the process shown in the flowchart of FIG. 31 may be automated (e.g., performed by a computer system).

At 3101, data may be requested.

At 3103, contact information may be entered into a parcel inventory (e.g., see FIG. 13).

At 3105, a cost sheet may be generated (e.g., with costs associated with the requested data).

At 3107, a determination may be made whether to purchase the data.

At 3109, if the data is not to be purchased, the process may end.

At 3111, if the data is to be purchased, a GIS project may be initiated.

At 3113, the data may be received.

At 3115, the data may be downloaded and a back-up copy of the data may be made (e.g., on a compact disc (CD)).

At 3117, resource tasks may be closed.

At 3119 control may be transferred to GIS.

At 3121, the data/project may be received in GIS for processing (e.g., according to the scripts described herein).

FIGS. 32*a-d* illustrate a flowchart for assessing a legal status of acquired data, according to an embodiment. In some embodiments, it should be noted that in various embodiments of the methods described below, one or more of the elements described may be performed concurrently, in a different order than shown, or may be omitted entirely. Other additional elements may also be performed as desired. Parts or all of the process shown in the flowchart of FIGS. 32*a-d* may be automated (e.g., performed by a computer system).

At 3239, a community may be identified for potentially acquiring parcel data 300.

At 3241, a determination may be made whether digital parcel data 300 is currently in the common format database 125. If the data is not currently in the common format database 125, flow may proceed at FIG. 33.

At 3243, the source of the data may be identified. If the data is from a private source, a determination may be made at 3259 whether there is an agreement with the vendor that provided the data. If there is an agreement with the vendor, a determination may be made at 3261 whether there are any restrictions on the use of the data. If there are not any restrictions on use, at 3257, the data may be used. If there are restrictions on use, at 3275, a determination may be made whether the vendor can be contacted. If the vendor cannot be contacted, at 3299, vendor contact information can be researched.

From 3259, if there is not an agreement with the vendor, at 3273, determination may be made whether the vendor can be contacted. If the vendor cannot be contacted, at 3271, vendor contact information can be researched.

From 3275 and 3273, if the vendor can be contacted, at 3285, a determination may be made whether a negotiation with the vendor on using the data (either to discuss a potential agreement or the restrictions of an existing agreement) was successful. If not, at 3287, the data may not be used. At 3293, if the negotiation is successful (e.g., a favorable agreement is reached), the data may be used.

At 3245, if the data is public (see 3243), a determination may be made whether the data is copyrighted. If the data is copyrighted, at 3215, a determination may be made as to what part of the data is copyrighted. At 3213, a determination may be made whether the copyright affects the use of the data in the database 125. At 3211, if the copyright affects the use of the data in the database 125, applicable copyright laws (state/federal) may be reviewed for a possible solution.

At 3247, a determination may be made whether there is an agreement with the community regarding the data (if the data is not copyrighted or copyright status is unknown). If there is an agreement with the community, at 3249, a determination may be made whether there are any restrictions on the use of the data. If there are restrictions on the use of the data, at 3251, applicable state laws may be reviewed.

At 3263, if there is not an agreement with the community (see 3247), a determination may be made whether there is an online agreement (e.g., for data originating from an Internet source). If there is an online agreement, at 3265, a determination may be made whether there are any restrictions on use. If there are no restrictions on use, a determination may be made whether to contact the community, at 3277, to confirm the ability to use that data. If there are restrictions on use, at 3267, a determination may be made as to whether the online agreement was accepted. If it appears the online agreement was accepted, the flow may return to 3251 to review state law applicable to the agreement. If there is no evidence the online agreement was accepted, at 3269, a determination may be made whether to contact the community at 3277. If the online agreement was not accepted, or there is no evidence to indicate that it was accepted, then a determination may be made whether to contact the community at 3277.

At 3253 (from 3251), a determination may be made whether the restrictions placed on the data are legal. If the restrictions are legal, at 3255, the data may not be used. If the restrictions do not appear legal, at 3229, the relevant community may be contacted. If the community is contacted, at 3227, negotiations may take place with the community. At 3225, if the negotiations are successful, (e.g., the community agrees to the usage of the data), the data may be used. At 3233, if the negotiations are not successful, a determination may be made whether to pursue legal action (e.g., against the community). If it is decided not to pursue legal action, at 3231, the data may not be used. At 3235, if legal action is pursued and is successful, the data may be used 3237. If not successful, at 3231, the data may not be used.

At 3221, (from 3249) if there are no restrictions on use, applicable state laws may be reviewed. At 3219, a determination may be made whether there are restrictions on use. At 3223, if there are no restrictions on use, the data may be used. If there are some potential restrictions on use at 3217 then a determination may be made whether or not the data is to be used based upon the potential restrictions on use, the data's value, its costs, any existing state attorney general opinions and case law opinions.

At 3207, (from 3211) a determination may be made whether the restriction is legal. If the restriction is legal, at 3209, the data may not be used. At 3205, if the restriction does not look legal, a determination may be made whether to pursue legal action. At 3201, a determination may be made whether the legal action was successful. If the legal action was not successful, at 3203, the data may not be used. If the legal action was successful, flow may return to 3247.

At 3277 (from 3263, 3265, or 3269), if there is not an online agreement, a determination may be made whether the community can be contacted. If contacted and the negotiations are successful at 3279 then the data may be used. If negotiations are not successful at 3279 then the state law may be reviewed at 3289. If the community is not contacted, at 3289, applicable state law may be reviewed. At 3295, a determination may be made whether there are restrictions on use. If there are some potential restrictions on use at 3295 then, at 3298, a determination may be made whether or not the data is to be used based upon the potential restrictions on use, the data's value, its costs, any existing state attorney general opinions and case law opinions. If there are no restrictions, at 3296, the data may be used. At 3279, if the community was contacted, a determination may be made whether negotiation with the community was successful. If negotiations with the community were successful, at 3281, the data may be used. If the negotiations with the community were not successful, then the state law may be reviewed at 3289.

Figure 33:
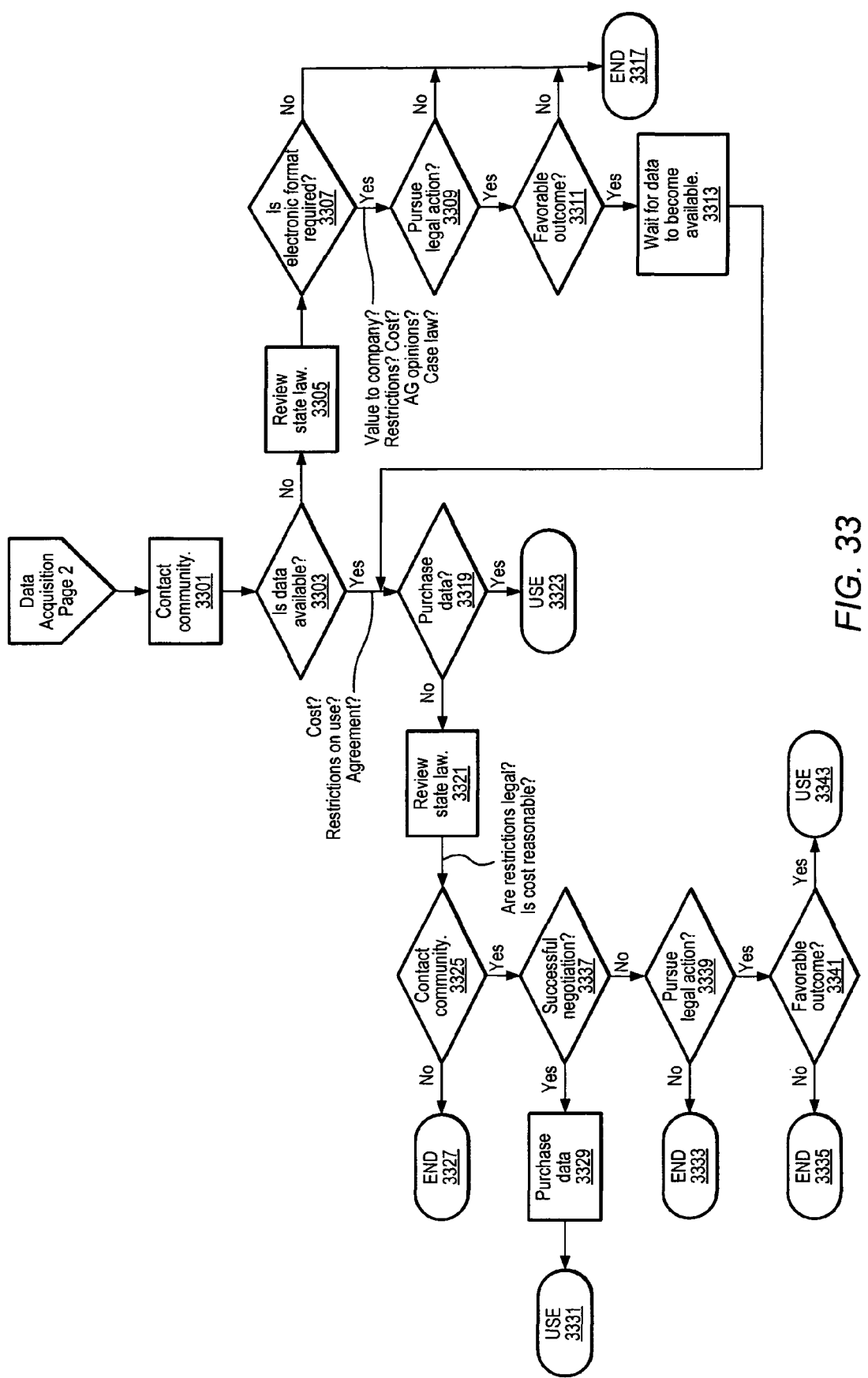
FIG. 33 illustrates a flowchart for data acquisition, according to an embodiment.

FIG. 33 illustrates a flowchart for data acquisition, according to an embodiment. In some embodiments, it should be noted that in various embodiments of the methods described below, one or more of the elements described may be performed concurrently, in a different order than shown, or may be omitted entirely. Other additional elements may also be performed as desired. Parts or all of the process shown in the flowchart of FIG. 33 may be automated (e.g., performed by a computer system).

At 3301, (from 3241 of FIG. 32c) if the digital parcel data is not in the database 125, the relevant community may be contacted. At 3303, a determination may be made whether the data is available from the community. At 3305, if the data is not available from the community, relevant state laws may be reviewed. At 3307, a determination may be made whether electronic format is required. If not, the process may end at 3317. If electronic format is required, at 3309, a determination may be made whether to pursue legal action. If not, the process may end at 3317. At 3311, a determination may be made whether the legal action had a favorable outcome. If there was not a favorable outcome, the process may end at 3317. If there was a favorable outcome, at 3313, the system may wait for the data to become available, and, once available at 3313, the flow may return to 3319 to determine whether or not to purchase the data.

At 3319 (from 3303), if the data is available, a determination may be made whether to purchase the data based upon the costs, the restrictions on use, if any, and the terms of the agreement with the community, if any. If the data is purchased, at 3323, the data may be used. At 3321, if the data is not purchased, relevant state laws may be reviewed to consider the legality of the costs, restrictions on use, or terms of the agreement as required by the community. At 3325, a determination may be made whether to contact the community based upon consideration of the costs, restrictions on use, or terms of the agreement as required by the community within the context of the state's laws. If not, the process may end at 3327. If the community is contacted, at 3337, a determination may be made whether the negotiation with the community was successful. If the negotiation was not successful, at 3339, a determination may be made whether to pursue legal action. If not, the process may end at 3333. If legal action is pursued, at 3341, a determination may be made whether the outcome was favorable. If the outcome was not favorable, the process may end at 3335. If the outcome was favorable, at 3343, the data may be used.

At 3329 (from 3337) if the negotiation was successful, the data may be purchased. At 3331, the data may then be used.

Figure 34:
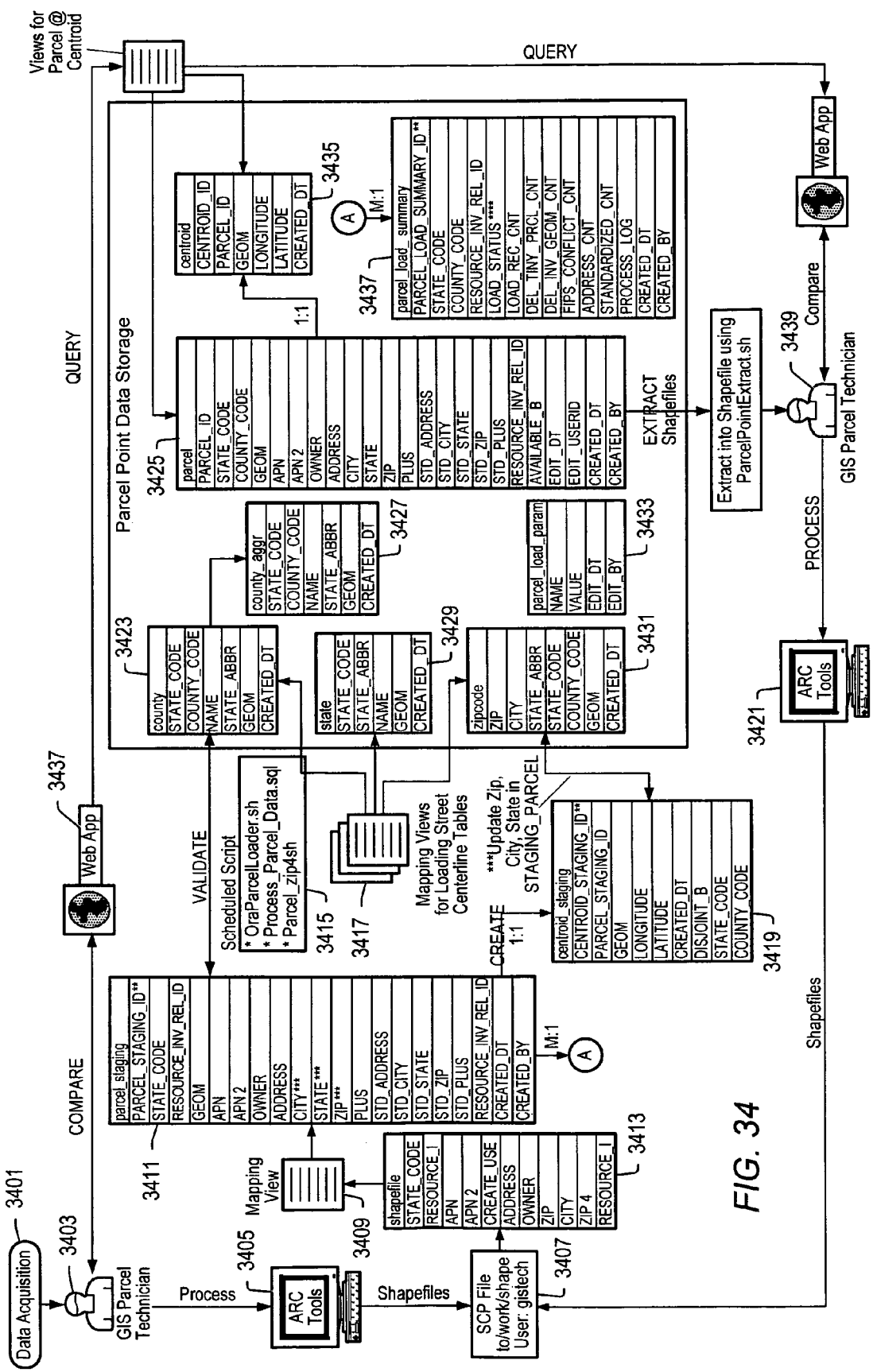
FIG. 34 illustrates the table structures for database processing/acquisition, according to an embodiment.

FIG. 34 illustrates the table structures for database processing/acquisition (e.g., for an Oracle™ database), according to an embodiment. In some embodiments, the parcel data may be corrected, modified, etc., for example, according to the scripts described above, during the data acquisition 3401 by the technician 3403 (e.g., using a computer system). In some embodiments, ArcTools/ESRI 3405 may be used during a portion of the processing. After processing, the parcel data may be put into an intermediate format (e.g., through a third party program such as WinSCP (Windows secure copy) application). The intermediate format may have fields as represented in shape-file format 3413. Other formats are also contemplated. A mapping view program may be used to provide an interface between the intermediate shape-file 3413 and a parcel_staging_table 3411. In some embodiments, the mapping view program 3409 may have the form of a relational table. The mapping view program 3409 may include links between fields in the shape-file 3413 (e.g., field "RESOURCE_I") and fields in the parcel_staging_table 3411 (e.g., field "RESOURCE_INV_REL_ID"). In some embodiments, a link may be necessary because fields in the shape-file 3413 may be limited in size. Other reasons for using links are also contemplated. The mapping view program 3409 may thus route attributes between the shape-file and the parcel_staging_table (e.g., to use in storing the parcel data in the common format database 125). In some embodiments, the parcel_staging_table 3411 may be used to create centroid staging data (e.g., create one or more centroids for the parcels in the shape-file 3413) and/or populate additional data in the parcel_staging_table 3411 (e.g., the city, state, zip code, etc.).

In some embodiments, after the parcel data has been transferred to the database, additional data may be supplied to the database by using a spatial query to a third party feature class (e.g., GDT Teleatlas™ postal boundaries) for use by a USPS standardization engine. The USPS standardization engine may find an address match for one or more addresses of the parcels in the shape file 3413/parcel_staging_table 3411. The additional data may be filled into the parcel_staging_table 3411. In some embodiments, other mapping view programs 3417 may further map the parcel_staging_table 3411 to one or more tables (e.g., county_table 3423, state_table 3429, and zip_code_table 3431). Other tables are also contemplated. In some embodiments, the county_table 3423 may be used to verify the centroid address match. In some embodiments, the zip_code_table 3431 may be used to populate city, state, and/or zip code in the parcel_staging_table 3411. Other tables may include county_aggr table 3427, parcel_load_param table 3433, parcel_table 3425, centroid_table 3435, and parcel_load_summary table 3437. In some embodiments, the parcel_load_summary_table 3437 may provide feedback on the data loading process (e.g., as log file 701).

Figure 35:
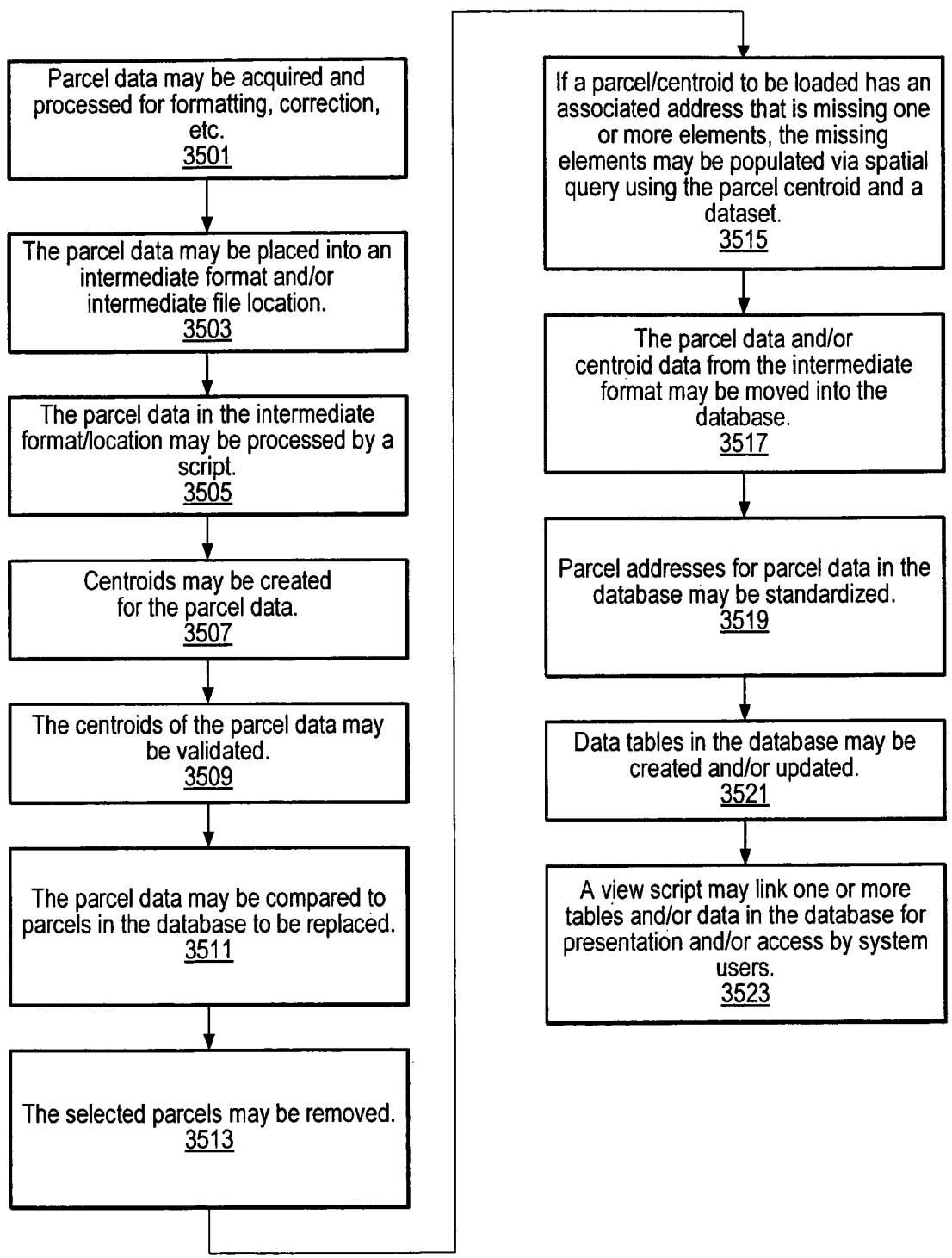
FIG. 35 illustrates a flowchart for database acquisition, according to an embodiment.

FIG. 35 illustrates a flowchart for database acquisition (e.g., for an Oracle™ database), according to an embodiment. It should be noted that in various embodiments of the methods described below, one or more of the elements described may be performed concurrently, in a different order than shown, or may be omitted entirely. Other additional elements may also be performed as desired. Parts or all of the process shown in the flowchart of FIG. 35 may be automated (e.g., performed by a computer system).

At 3501, parcel data may be acquired and processed (e.g., as seen in FIG. 6a) for formatting, correction, etc. (see blocks 3401, 3403, and 3405 in FIG. 34). In some embodiments, the result of the processing may include a shape file 703. In some embodiments, the shape file 703 may include a plurality of files (e.g., 5-6 files of various types with the parcel data in duplicate). Other file formats are also contemplated. At 3503, the parcel data (e.g., in script file format) may be placed into an intermediate format (e.g., by WinSCP) and/or an intermediate file location. Other applications are also contemplated. In some embodiments, the shape file may be stored in an archive location and an intermediate file may hold the parcel data for further processing.

At 3505, the parcel data in the intermediate format/location may be processed by a script (e.g., a schedule script). The schedule script may process the parcel data in the intermediate location and transform the parcel data (e.g., using an OraParcelLoader.sh tool (e.g., OGR2OGR)) into a dataset that can be loaded into a database (e.g., an Oracle™ database). Processing the parcel data may include filtering the data (e.g., by removing extraneous data not applicable to the database) and/or inserting the attribute data associated with the parcel data into a parcel_staging_table 3411 for entry into a database (e.g., an Oracle™ database).

At 3506, the geometries of the parcel data may be validated. A script may examine the polygons defined by the parcel data to insure, for example, the polygons are closed (i.e., complete). Other geometry validations are also contemplated. For example, extremely small parcels (e.g., less than 2 square inches of land) may be removed. Other dimensions of parcels may also be removed.

At 3507, centroids (e.g., see centroid 403 in FIG. 4a) may be created (i.e., calculated) for the parcel data. For example, a script ("Process_Parcel_Data.sql" in FIG. 34) may create centroids (e.g., which may be represented by latitude, longitude coordinates corresponding to a spatial centroid of the parcel) for one or more parcels in the parcel data and may load this centroid data into a structure (e.g., centroid_staging_table 3419). The script may also clean the address data associated with the parcels (e.g., by removing extraneous characters, etc.), trim the address data (e.g., remove extra spaces), and/or find an associated zip code, city, state, etc. for the address data. In some embodiments, a script (e.g., "Parcel_zip4sh") may query a US Postal Service (USPS) library to standardize (std) one or more addresses associated with the parcels. For example, "street" in an address may be converted to "St." Other conventions are also contemplated.

At 3509, the centroids for the parcel data may be validated (e.g., with a spatial query). For example, the system or system user may determine if the calculated centroid (e.g., as represented by coordinates) is within a FIPS boundary corresponding to the FIPS code for the corresponding parcel. In some embodiments, the FIPS boundary (which may be represented by polygon coordinates) may be returned by querying a data set (e.g., from a third party dataset such as a county dataset from GDT Teleatlas™ or other dataset source) using the corresponding FIPS code. In some embodiments, the corresponding FIPS code may be determined from the attribute data for the parcel. If the centroid coordinates are spatially within the returned FIPS boundary corresponding to the FIPS code, the centroid may be determined to be valid. In some embodiments, the invalid centroids (e.g., which fall outside of their corresponding FIPS boundary) may be counted. In some embodiments, if the count exceeds a threshold (e.g., if >10 percent of the parcels (for the shape file) are not valid), then the parcel data may not be loaded to the database at 3517. Other thresholds are also contemplated. In some embodiments, an electronic mail notification may be sent to a system user (e.g., a technician). In some embodiments, if the count is less than a threshold, the loading process may continue.

At 3511, the parcel data may be compared to parcels in the database to be replaced. In some embodiments, parcels may be replaced according to FIPS code (e.g., during an update, the parcels in the database with a designated FIPS code may be replaced with the parcel data from a shape file corresponding to the designated FIPS code). In some embodiments, the parcels to be removed/updated may be selected using a tabular query on the database using the corresponding FIPS code (which may select the parcels in the database with that FIPS code.) Selecting may include highlighting, flagging, etc. In some embodiments, the comparison may include a footprint validation with a spatial query to compare the calculated centroids (for the parcel data to be loaded) to the non-selected parcels and parcels to be removed (i.e., selected parcels) in the database. In some embodiments, the footprint validation may include two comparisons (other comparisons are also contemplated). According to a first comparison, if greater than a threshold (e.g., if greater than approximately 10 percent) of the calculated centroids are spatially found in existing parcels in the database that are not selected (i.e., parcels that would normally not be removed with this update) then the load may be aborted. Other thresholds are also contemplated. In some embodiments, shape files and/or other file formats for the parcel data may correspond to one FIPS code. If greater than a threshold of parcels to be loaded are outside the FIPS code designated for their shape file, the load may be aborted.

In the second comparison, if greater than a threshold (e.g., if greater than approximately 10 percent) of the selected parcels are going to be removed without a corresponding update/replacement parcel in the parcel data to be loaded, then the load may be aborted (other thresholds are also contemplated). For example, if the shape file with the parcel data covers a designated FIPS code that currently has 100 corresponding parcels in the database, and the shape file only has parcel data for 80 parcels, 20 parcels in the database may be removed without replacement if the load is allowed to proceed. In some embodiments, the load may thus be aborted and a notification may be sent to a system user.

At 3513, the selected parcels may be removed. In some embodiments, the parcels (e.g., corresponding to a FIPS code) may be removed through a tabular query. Other parcel selections are also contemplated (e.g., the parcels in a state may be selected and removed).

At 3515, if a parcel/centroid to be loaded has an associated address that is missing one or more elements (e.g., missing a city or zip code), then the missing elements may be populated via spatial query using the parcel centroid and a dataset (e.g., a third party postal boundary data set from the US Postal Service (USPS)). In some embodiments, a look up on the dataset may be performed to determine an address corresponding to a boundary of the dataset that a corresponding centroid is spatially in, and the missing elements (e.g., city or zip code) corresponding to the boundary for that centroid may be returned and populated into a table for the corresponding parcel (e.g., placed in the parcel staging table 3411 and/or other location). Other datasets are also contemplated.

At 3517, the parcel data and/or centroid data from the intermediate format may be moved/committed into the database (e.g., an Oracle™ database). In some embodiments, the parcel data may include the coordinates of the parcel, the coordinates of the centroid, and attribute data (e.g., from parcel_staging_table 3411, centroid_staging_table 3419, county_table 3423, state_table 3429, zip_code_table 3431, county_aggr_table 3427, parcel_load_summary_table 3433, parcel_table 3425, centroid_table 3435, parcel_load_summary_table 3437, etc.) In some embodiments, the data may be loaded according to a predetermined footprint (e.g., of existing data) and/or moved into a new location of the database. Data to be loaded may be compared with data already in the database, and, if a correlation exists (e.g., if data already in the database has an address that matches the address of parcel data to be loaded, and the data has not already been removed), a footprint may be developed to update the existing data without duplicating the data. In some embodiments, statistics regarding the correlation may be stored in the load summary table (e.g., parcel_load_summary 3437). Sequence IDs may be developed for the data in the database to assist in locating the data in the database for later retrieval (e.g., sequence IDs may be assigned to parcel_staging_ID, parcel_load_summary_ID, centroid_staging_ID, etc. to be loaded). Other access mechanisms are also contemplated.

At 3519, parcel addresses for parcel data in the database may be standardized (e.g., using a standardization engine based on USPS datasets). The parcel data in the database may be compared to USPS lookup tables/library (which may be provided by the USPS (e.g., monthly)). Standardization may include finding a match for a parcel in the USPS lookup tables/library using a spatial query (e.g., using the parcel or centroid coordinates). In some embodiments, if the data in the USPS lookup tables/library is different than the data in the database, the database may be updated with the data from the USPS lookup tables/library. In some embodiments, the database may include the original address for a parcel and a standardized (STD_) address for the parcel (e.g., in the parcel_table 3425). The standardized address may include a standardized city, state, zip code, etc. from the USPS lookup tables/library. For example, "801 Main Street" may have a standardized counterpart of "801 Main St.". Other standardizations are also contemplated. In some embodiments, if the standardized address in the USPS lookup tables/library is different than the standardized address in the database, the standardized address in the database may be replaced with the new data from the USPS lookup tables/library. In some embodiments, if the data is different and/or removed, the data may be flagged for a technician to review. In some embodiments, the technician may be notified of the flagged data through an electronic mail (other notifications are also contemplated). In some embodiments, the technician may make changes to the changed/removed data. In some embodiments, standardization may be done periodically (e.g., monthly). Other time periods are also contemplated.

At 3521, data tables in the database may be created and/or updated. For example, data tables for county information 3423, county aggregate information 3427, zip code information 3431, parcel load parameters 3433, parcel data 3425, centroid data 3435, and parcel_load_summary 3437 may be created and/or updated. The data may be updated if the parcel data to be loaded into the database will replace previous parcel data already in the database. Other data tables are also contemplated.

At 3523, a view script may link one or more tables and/or data in the database for presentation and/or access by system users (e.g., customers). For example, information from the parcel table 3425 and information from the centroid table 3435 may be linked such that a system user viewing information on a parcel in the parcel table may also view associated information in the centroid table 3435. Other tables and links are also contemplated. In some embodiments, the data may be presented through a web application 3437 (e.g., a web map services (WMS) or web feature service (WFS) application). Other web applications are also contemplated. The web application 3437 may allow a customer to access parcel data through a data specific URL. For example, the customer may access the data to view through a graphical map view. In some embodiments, the data may be extracted (e.g., by a GIS parcel technician 3439). For example, the technician may extract data associated with a specific FIPS. In some embodiments, the technician 3439 may also load data into the system for loading into the database. For example, the technician 3439 may receive data from a subset of a county to merge with other data from the county for upload to the database.

In some embodiments, parcel polygons for storage in the database may represent administrative boundaries as defined by local authorities for a region. In some embodiments, polygons may fall in general categories, such as state or federal land, parks, right-of-way, or water bodies. These general category polygons may be included in the polygon boundary data. In some embodiments, polygons may not include separate data attributes in the data. For example, polygons may represent new construction without attribute assignments or may have attribute data that is missing, incomplete, or unavailable. In some embodiments, polygons may share the same attribution. These polygons may have the same attribute information as at least one other polygon and may be referred to as multi-part polygons. In some embodiments, there may be overlaps and other topological issues between polygons (Individual polygon geometries may be validated, and spatial relationships between the individual polygons may not be created).

In some embodiments, centroids may include a set of a coordinates corresponding to the center of gravity of a polygon. Centroids may be calculated for polygons regardless of size or shape. For the calculated centroids that fall outside of the polygon that it represents, an alternative placement inside the polygon may be used for the centroid. In some embodiments, centroids may be the result of filtering criteria that can produce inaccurate results for location representation. Three criteria that may indicate a need for locational problem correction for additional centroid adjustment: (a) A lack of address data (e.g., the address data may be incomplete, missing, or unavailable for a polygon); (b) multi-part parcel status (attributes may not be unique and address attributes may exist in more than one polygon); and (c) centroids representing parcels that have a large parcel area. In some embodiments, data may include polygon centroids that have unique address attributes. The centroids may represent any size or shape of polygon.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a CD-ROM, floppy disks, or tape device; a computer system memory or random access memory such as DRAM, Double Data Rate Random Access Memory (DDR RAM), SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of incorporating parcel data into a database, comprising:

receiving parcel data from a first source, said parcel data including boundary coordinates;

converting the parcel data from the first source into a format for storage in a common format database;

receiving parcel data from a second source;

converting the parcel data from the second source into the format for storage in the common format database, including determining spatial accuracy of the parcel data, projecting the parcel data into a common projection, rechecking spatial accuracy of the projected parcel data, repairing geometries of the parcel data, integrating the repaired parcel data, formatting available attribute data for the parcel data, appending the parcel data to a temporary feature class, integrating the appended parcel data, and repairing geometries of the second integrated parcel data;

storing the converted parcel data from the first source and the converted parcel data from the second source in the common format database;

removing, by a processor, redundant parcel data between the parcel data from the first and second source; and retrieving parcel data from the common format database in response to a user request, wherein storing the converted parcel data from the first source and the second source in the common format database includes
receiving an indication to add the converted parcel data from the first source and the second source to the common format database, and
loading the converted parcel data from the first source and the second source into the common format database using a spatial database interface.

2. A method of incorporating parcel data into a database, comprising:
receiving parcel data from a first source, said parcel data including boundary coordinates;
converting the parcel data from the first source into a format for storage in a common format database;
receiving parcel data from a second source;
converting the parcel data from the second source into the format for storage in the common format database, wherein converting the parcel data includes converting parcel data from a raster format into a vector format, including
determining spatial accuracy of the parcel data,
projecting the parcel data into a common projection,
rechecking spatial accuracy of the projected parcel data,
repairing geometries of the parcel data,
integrating the repaired parcel data,
formatting available attribute data for the parcel data,
appending the parcel data to a temporary feature class,
integrating the appended parcel data, and
repairing geometries of the second integrated parcel data;
storing the converted parcel data from the first source and the converted parcel data from the second source in the common format database;
removing, by a processor, redundant parcel data between the parcel data from the first and second source; and
retrieving parcel data from the common format database in response to a user request,
wherein the common format database includes a national parcel layer having parcel data from a plurality of sources.

3. A method of incorporating parcel data into a database, comprising:
receiving parcel data from a first source, said parcel data including boundary coordinates;
converting the parcel data from the first source into a format for storage in the common format database;
receiving parcel data from a second source;
converting the parcel data from the second source into the format for storage in the common format database, including determining spatial accuracy of the parcel data
rechecking spatial accuracy of the projected parcel data,
repairing geometries of the parcel data,
integrating the repaired parcel data,
appending the parcel data to a temporary feature class,
integrating the appended parcel data, and
repairing geometries of the second integrated parcel data;
wherein converting the parcel data includes converting parcel data from a raster format into a vector format and converting the parcel data from at least the first source or the second source into the format for storage in the common format database includes
projecting the parcel data into a common projection, and
formatting available attribute data for the parcel data;
storing the converted parcel data from the first source and the converted parcel data from the second source in the common format database;
removing, by a processor, redundant parcel data between the parcel data from the first and second source; and
retrieving parcel data from the common format database in response to a user request,
wherein the common format database includes a national parcel layer having the parcel data from a plurality of sources,
wherein storing the converted parcel data from the first source and the second source in the common format database includes
receiving an indication to add the converted parcel data from the first source and the second source to the common format database, and
loading the converted parcel data from the first source and the second source into the common format database using a spatial database interface.

4. A method of incorporating parcel data into a database, comprising:
receiving parcel data from a first source, said parcel data including boundary coordinates;
converting the parcel data from the first source into a format for storage in a common format database;
receiving parcel data from a second source;
converting the parcel data from the second source into the format for storage in the common format database;
storing the converted parcel data from the first source and the converted parcel data from the second source in the common format database;
removing, by a processor, redundant parcel data between the parcel data from the first and second source; and
retrieving parcel data from the common format database in response to a user request,
wherein converting the parcel data from at least the first source or the second source into the format for storage in the common format database includes
determining spatial accuracy of the parcel data,
projecting the parcel data into a common projection,
rechecking spatial accuracy of the projected parcel data,
repairing geometries of the parcel data,
integrating the repaired parcel data,
formatting available attribute data for the parcel data,
appending the parcel data to a temporary feature class,
integrating the appended parcel data, and
repairing geometries of the second integrated parcel data,
wherein storing the converted parcel data includes loading the converted parcel data into the common format database.

5. The method of claim 4, wherein converting the parcel data from at least the first source or the second source into the format for storage in the common format database further comprises:
integrating the parcel data that has been projected into the common projection; and
repairing geometries of the integrated parcel data.

6. The method of claim 4,
wherein converting the parcel data from the first source into a format for storage in the common format database includes automatically converting the parcel data from the first source into a format for storage in the common format database;
wherein converting the parcel data from the second source into the format for storage in the common format database includes automatically converting the parcel data from the second source into the format for storage in the common format database; and wherein storing the converted parcel data from the first source and the converted parcel data from the second source in the common format database includes automatically storing the converted parcel data from the first source and the converted parcel data from the second source in the common format database.

7. The method of claim 6, wherein automatically converting parcel data from the first source and from the second source into the format for storage in the common format database includes executing at least two scripts in a predetermined order.

8. The method of claim 7, wherein a first script of the at least two scripts includes converting multi-part parcel geometries into single part parcel geometries in the parcel data and a second script of the at least two scripts includes eliminating duplicate geometries in the parcel data.

9. The method of claim 4, wherein the format includes at least one personal geodatabase format with at least one feature class.

10. The method of claim 4, wherein the parcel data from the first source and the parcel data from the second source include data points for at least one polygon defining a parcel.

11. The method of claim 4,
wherein converting the parcel data from at least the first source or the second source includes
converting multi-part parcel geometries into single part parcel geometries in the parcel data, and
eliminating duplicate geometries in the parcel data.

12. The method of claim 4, wherein the common format database includes a national parcel layer having parcel data from a plurality of sources.

13. The method of claim 4, further comprising generating a log file, wherein the log file includes at least one detail regarding an execution of the converting of the parcel data from the first source and the converting of the parcel data from the second source.

14. The method of claim 13, wherein the at least one detail includes an exception, an error, or a value outside established parameters.

15. The method of claim 4, further comprising:
receiving new parcel data;
storing data associated with the parcel data to persist through an update;
updating the parcel data from at least the first source or the second source with the new parcel data; and
maintaining storage of the data to persist through the update.

16. The method of claim 4,
wherein converting the parcel data from at least the first source or the second source into the format for storage in the common format database includes executing scripts in the following order:
determining spatial accuracy of the parcel data;
projecting the parcel data into a common projection;
rechecking spatial accuracy of the projected parcel data;
exploding the projected parcel data;
repairing geometries of the exploded parcel data;
integrating the repaired parcel data;
formatting and concatenating available attribute data for the parcel data;
eliminating duplicate geometries of the first integrated parcel data;
appending the parcel data with eliminated duplicated geometries to a temporary feature class;
integrating the appended parcel data;
repairing geometries of the second integrated parcel data; and
wherein storing the converted parcel data includes loading the converted parcel data into the common format database.

17. The method of claim 4, wherein converting parcel data from at least the first source or the second source into a format for storage in the common format database includes
counting voids in one or more parcels of the parcel data,
removing the parcel when a void count of a parcel of the one or more parcels is above a threshold, remove the parcel, and
keeping the parcel when a void count of a parcel of the one or more parcels is not above a threshold, keep the parcel.

18. The method of claim 4, wherein converting the parcel data from at least the first source or the second source includes converting parcel data from a raster format into a vector format.

19. The method of claim 4, wherein converting the parcel data from at least the first source or the second source includes repairing incorrect geometries in the parcel data.

20. The method of claim 4, wherein converting the parcel data from at least the first source or the second source includes converting multi-part parcel geometries into single part parcel geometries in the parcel data.

21. The method of claim 4, wherein converting the parcel data from at least the first source or the second source includes eliminating duplicate geometries in the parcel data.

22. The method of claim 4, wherein the converted parcel data in the common format database is used for navigation systems, online mapping, telematics, cell phone services, or risk assessment tasks.

23. The method of claim 4, wherein the parcel data from the first source is in a different format than the parcel data from the second source.

24. The method of claim 4, wherein receiving parcel data from at least the first source or the second source includes receiving at least one shape-file from the at least the first source or the second source.

25. The method of claim 4, further comprising storing the attribute data.

26. The method of claim 4, wherein converting the parcel data from at least the first source or the second source into the format for storage in the common format database further includes appending the attribute data to the parcel data.

27. The method of claim 4, wherein converting the parcel data from at least the first source or the second source into the format for storage in the common format database further includes manipulating the attribute data.

28. A system, comprising:
a processor;
a memory coupled to the processor and configured to store program instructions executable by the processor to:
receive parcel data from a first source, said parcel data including boundary coordinates;
convert the parcel data from the first source into a format for storage in a common format database;
receive parcel data from a second source;
convert the parcel data from the second source into the format for storage in the common format database, including
determining spatial accuracy of the parcel data,
projecting the parcel data into a common projection,
rechecking spatial accuracy of the projected parcel data,
repairing geometries of the parcel data,
integrating the repaired parcel data, formatting available attribute data for the parcel data,
appending the parcel data to a temporary feature class,
integrating the appended parcel data, and
repairing geometries of the second integrated parcel data;
store the converted parcel data from the first source and the converted parcel data from the second source in the common format database;
remove redundant parcel data between the parcel data from the first and second source; and
retrieve parcel data from the common format database in response to a user request,
wherein converting the parcel data from at least the first source or the second source into the format for storage in the common format database includes
projecting the parcel data into a common projection, and
formatting available attribute data for the parcel data,
wherein storing the converted parcel data includes loading the converted parcel data into the common format database.

29. A non-transitory computer readable medium storing computer-readable instructions thereon that when executed by a computer cause the computer to perform a method comprising:
receiving parcel data from a first source, said parcel data including boundary coordinates;
converting the parcel data from the first source into a format for storage in a common format database;
receiving parcel data from a second source;
converting the parcel data from the second source into the format for storage in the common format database, including
determining spatial accuracy of the parcel data,
projecting the parcel data into a common projection,
rechecking spatial accuracy of the projected parcel data,
repairing geometries of the parcel data,
integrating the repaired parcel data,
formatting available attribute data for the parcel data,
appending the parcel data to a temporary feature class,
integrating the appended parcel data, and
repairing geometries of the second integrated parcel data;
storing the converted parcel data from the first source and the converted parcel data from the second source in the common format database;
removing redundant parcel data between the parcel data from the first and second source; and
retrieving parcel data from the common format database in response to a user request,
wherein converting the parcel data from at least the first source or the second source into the format for storage in the common format database includes
projecting the parcel data into a common projection, and
formatting available attribute data for the parcel data,
wherein storing the converted parcel data includes loading the converted parcel data into the common format database.

\* \* \* \* \*